US011780685B2

(12) United States Patent
Seo

(10) Patent No.: US 11,780,685 B2
(45) Date of Patent: Oct. 10, 2023

(54) VARIABLE PITCH DEVICE

(71) Applicant: SMC CORPORATION, Tokyo (JP)

(72) Inventor: Takeshi Seo, Nagareyama (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/125,170

(22) Filed: Dec. 17, 2020

(65) Prior Publication Data

US 2021/0190183 A1 Jun. 24, 2021

(30) Foreign Application Priority Data

Dec. 19, 2019 (JP) ................................. 2019-229621

(51) Int. Cl.
*B65G 47/90* (2006.01)
*B23Q 1/44* (2006.01)
*B65G 35/06* (2006.01)
*B65G 47/91* (2006.01)

(52) U.S. Cl.
CPC ............. *B65G 47/907* (2013.01); *B23Q 1/44* (2013.01); *B65G 35/06* (2013.01); *B65G 47/918* (2013.01)

(58) Field of Classification Search
CPC .... B65G 47/907; B65G 47/918; B65G 47/26; B65G 47/94; B65G 35/06; B23Q 1/44; G16H 25/183; H02K 7/06; H02K 7/10; B25J 15/0691; F16H 25/183
See application file for complete search history.

(56) References Cited

U.S. PATENT DOCUMENTS

| | | | | | |
|---|---|---|---|---|---|
| 2,903,290 | A | * | 9/1959 | Morris | .................. A01K 43/00 53/247 |
| 4,861,085 | A | * | 8/1989 | Lock | ................. H01L 21/67138 221/93 |
| 5,778,525 | A | * | 7/1998 | Hata | .................. H05K 13/0411 414/737 |

(Continued)

FOREIGN PATENT DOCUMENTS

| CN | 206764398 U | 12/2017 |
|---|---|---|
| CN | 208086776 U | 11/2018 |

(Continued)

OTHER PUBLICATIONS

Extended European Search Report dated Apr. 29, 2021 in European Patent Application No. 2021 4933.2, 8 pages.

(Continued)

*Primary Examiner* — Stephen A Vu
(74) *Attorney, Agent, or Firm* — Oblon, McClelland, Maier & Neustadt, L.L.P.

(57) ABSTRACT

A variable pitch device includes a body, a drive unit fixed to the body, a plurality of movable fingers disposed movably along a longitudinal direction of the body, and a driving force transmission mechanism that transmits a driving force of the drive unit to the movable fingers. The driving force transmission mechanism is formed of a connecting block connected to an end block driven in a vertical direction, a cam plate accommodated in the body and connected to the connecting block, and four finger pins inserted through first to fourth cam grooves of the cam plate. The finger pins are disposed movably in the longitudinal direction along guide holes of the body and connected to the movable fingers.

13 Claims, 48 Drawing Sheets

(56) References Cited

U.S. PATENT DOCUMENTS

| | | | | |
|---|---|---|---|---|
| 5,931,279 A | * | 8/1999 | Pedrotto | B65G 47/918 198/468.3 |
| 5,943,842 A | * | 8/1999 | de Koning | B65B 35/38 53/247 |
| 2012/0104782 A1 | | 5/2012 | Weaver et al. | |

FOREIGN PATENT DOCUMENTS

| | | |
|---|---|---|
| CN | 208979193 U | 6/2019 |
| EP | 2 942 298 A1 | 11/2015 |
| JP | S64-000522 U | 1/1989 |
| JP | 2002-164413 A | 6/2002 |
| JP | 2006-162590 A | 6/2006 |
| JP | 2007-105857 A | 4/2007 |
| JP | 2008-13282 A | 1/2008 |
| JP | 2010-254363 A | 11/2010 |
| JP | 2014-18935 A | 2/2014 |
| JP | 2017-87223 A | 5/2017 |
| KR | 20-0197283 Y1 | 9/2000 |

OTHER PUBLICATIONS

Korean Office Action dated Mar. 13, 2022 in Korean Patent Application No. 10-2020-0178464 (with English translation), 10 pages.
Combined Chinese Office Action and Search Report dated Apr. 19, 2022 in Patent Application No. 202011509440.1 (with English machine translation and English translation of Category of Cited Documents) 17 pages.
Office Action dated Oct. 18, 2022, in Japanese Patent Application No. 2019-229621 w/English Machine Translation.
Office Action dated Jan. 17, 2023, issued in corresponding Japanese Patent Application No. 2019-229621 (with English translation), 12 pages.

\* cited by examiner

VARIABLE PITCH DEVICE

CROSS-REFERENCE TO RELATED APPLICATION

This application is based upon and claims the benefit of priority from Japanese Patent Application No. 2019-229621 filed on Dec. 19, 2019, the contents of which are incorporated herein by reference.

BACKGROUND OF THE INVENTION

Field of the Invention

The present invention relates to a variable pitch device for, in a process of transporting a plurality of workpieces, changing an interval separation between workpieces arranged in parallel from an interval separation at a supply source to an interval separation corresponding to a supply destination and then supplying the workpieces to the supply destination.

Description of the Related Art

Conventionally, for example, on a factory production line or the like, a workpiece, which is placed on a table, is gripped by a transport device provided with a suction pad at a distal end thereof, and the workpiece is transported to a predetermined position. In recent years, a variable pitch device has been known, which is capable of simultaneously grasping a plurality of workpieces which are arranged in parallel on a table, adjusting the plurality of workpieces to a predetermined interval spacing in accordance with an arrangement condition of a supply destination, and supplying the workpieces to the supply destination.

In such a variable pitch device, for example, as disclosed in Japanese Laid-Open Patent Publication No. 2007-105857, a motor is attached to a rear surface of a base plate, and a plate cam which is formed in a disk-like shape, two levers, and a slide shaft are provided on a front surface of the base plate. Additionally, a cam groove is formed in the plate cam, and the plate cam is disposed to be capable of rotating under a driving action of the motor via a rotating shaft provided in the center of the cam groove. The cam groove is formed in an annular shape centered about the rotating shaft.

Further, the two levers are disposed so as to be capable of swinging about fulcrums supported on the base plate in the vicinity of upper and lower sides of the plate cam, follower rollers which are inserted into the cam groove of the plate cam are provided on the front surface thereof, and a plurality of roller pins are disposed on the rear surface thereof.

Furthermore, the slide shaft extends along a widthwise direction of the base plate, and eight slide blocks are movably retained thereby. In addition, the slide blocks are capable of sliding substantially in parallel with each other, and grooves are formed on the rear surface thereof. Respective roller pins provided on the levers are rotatably engaged with the grooves.

In addition, the plate cam is rotated under a driving action of the motor, and by the levers being made to swing about the fulcrums by the respective follower rollers which are coupled to the cam groove, the slide blocks which are connected via the roller pins move in parallel along the slide shaft. Since movement of the slide blocks is symmetrical in the longitudinal direction of the slide shaft, the respective slide blocks undergo movement while always keeping the interval spacing therebetween constant.

SUMMARY OF THE INVENTION

In the variable pitch device described above, a configuration is provided in which the slide blocks are made to slide by transmitting a rotational driving force of the motor to the plate cam, causing the plate cam to undergo rotation, and causing the levers to swing. Therefore, the configuration for transmitting the rotational driving force from the motor to the slide blocks is complex, and there is a concern of bringing about an increase in the size of the variable pitch device, as well as leading to a steep rise in manufacturing costs.

A general object of the present invention is to provide a variable pitch device, which with a simple configuration, is capable of reducing manufacturing costs and decreasing the size of the variable pitch device.

An aspect of the present invention is characterized by a variable pitch device comprising a body, a drive unit connected to the body, a plurality of movable fingers disposed movably along a longitudinal direction of the body, and a driving force transmission mechanism configured to transmit a driving force of the drive unit to the movable fingers, the variable pitch device moving the plurality of movable fingers in a manner so that an interval separation between the movable fingers becomes even along the longitudinal direction under a driving action of the drive unit, wherein the driving force transmission mechanism includes a cam plate provided on the body, and configured to be movable in a direction perpendicular to a direction of movement of the movable fingers, and a plurality of cam grooves, which are inclined with respect to the direction of movement, are formed in the cam plate, and portions of the movable fingers are inserted through the cam grooves.

According to the present invention, the body constituting the variable pitch device is equipped with the plurality of movable fingers that are capable of being moved along the longitudinal direction, together with the cam plate that is capable of moving in a direction perpendicular to the direction of movement of the movable fingers, and the plurality of cam grooves, which are inclined with respect to the direction of movement, are formed in the cam plate, and portions of the movable fingers are inserted through the cam grooves.

In addition, the driving force of the drive unit is transmitted to the cam plate that constitutes the driving force transmission mechanism, and the cam plate is moved in a direction perpendicular to the direction of movement of the movable fingers, whereby the plurality of movable fingers which are inserted respectively through the cam grooves undergo movement in a manner so that the interval separation between the movable fingers becomes even along the longitudinal direction of the body.

Accordingly, by providing the cam plate including the cam grooves as a driving force transmission mechanism that transmits the driving force of the drive unit to the plurality of movable fingers, the configuration can be simplified in comparison with a conventional variable pitch device in which the rotational driving force of a motor is transmitted to slide blocks via a plate cam and two levers, and along therewith, it is possible to make the variable pitch device smaller in size and to reduce manufacturing costs.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

Figure 1:
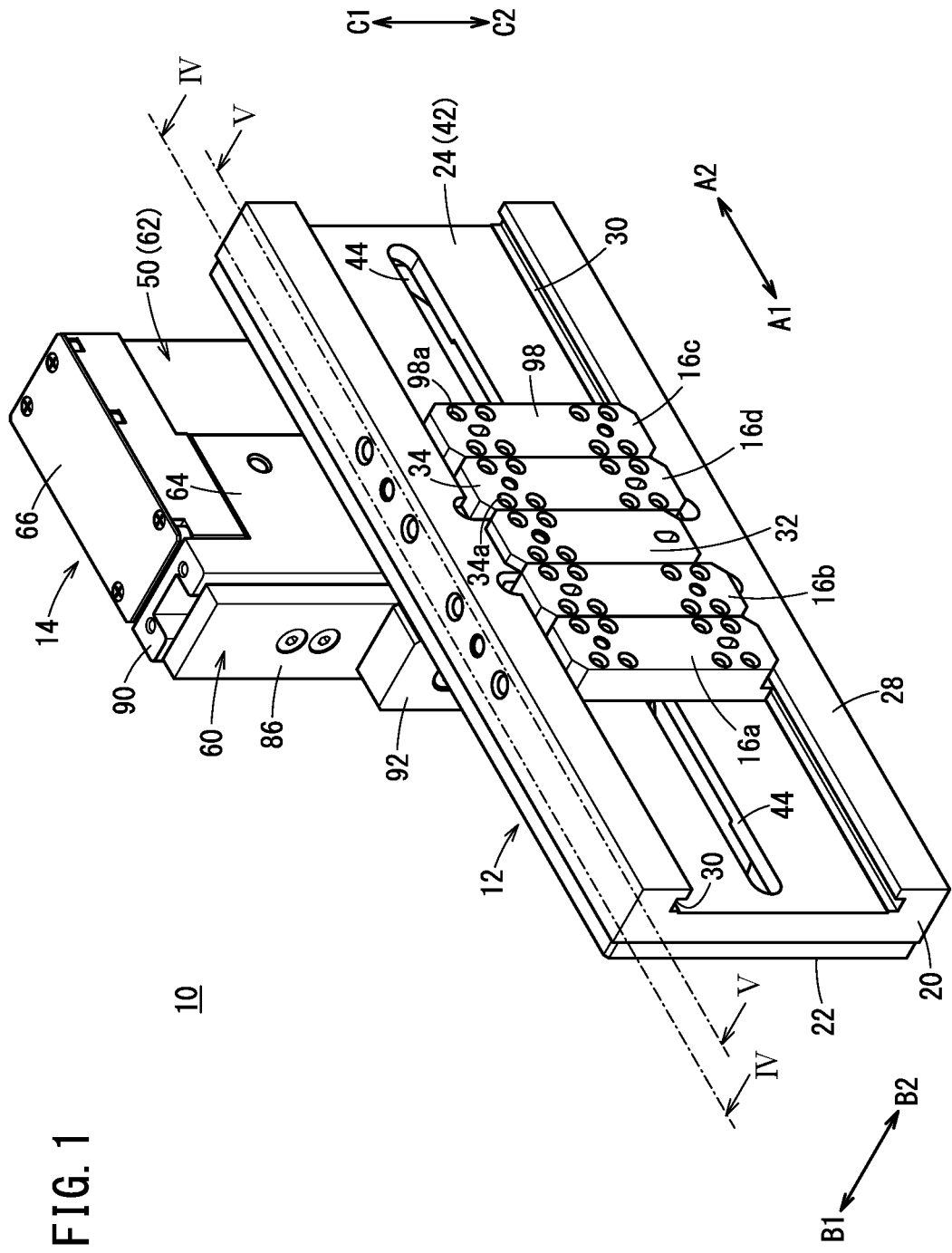
FIG. 1 is an external perspective view of a variable pitch device according to a first embodiment of the present invention.

As shown in FIGS. 1 to 8, a variable pitch device 10 according to a first embodiment of the present invention includes a body 12, a drive unit 14 mounted on a rear surface of the body 12, a plurality of movable fingers 16a to 16d which are disposed so as to be capable of moving along a longitudinal direction (the direction of arrows A1 and A2) of the body 12, and a driving force transmission mechanism 18 that transmits a driving force of the drive unit 14 to the movable fingers 16a to 16d. In this instance, a description will be given concerning a case in which four movable fingers 16a to 16d are provided. In addition, the above-described variable pitch device 10 is attached, for example, to the distal end of an arm in a non-illustrated transport device, and suction units P (see FIGS. 6 to 8) are mounted and used respectively on the movable fingers 16a to 16d.

The body 12 is formed in an elongate shape along the longitudinal direction (the direction of arrows A1 and A2), and is equipped with a main body portion 20 that retains the movable fingers 16a to 16d in a movable manner, and a cover member 22 that is mounted on a rear side (in the direction of the arrow B1) of the main body portion 20.

The main body portion 20 includes a finger accommodating section 24 which is formed on the front side (in the direction of the arrow B2) perpendicular to the longitudinal direction of the body 12 and in which the movable fingers 16a to 16d are accommodated, and an accommodation chamber 26 formed on the rear side (in the direction of the arrow B1) opposite to the front side.

Figure 8:
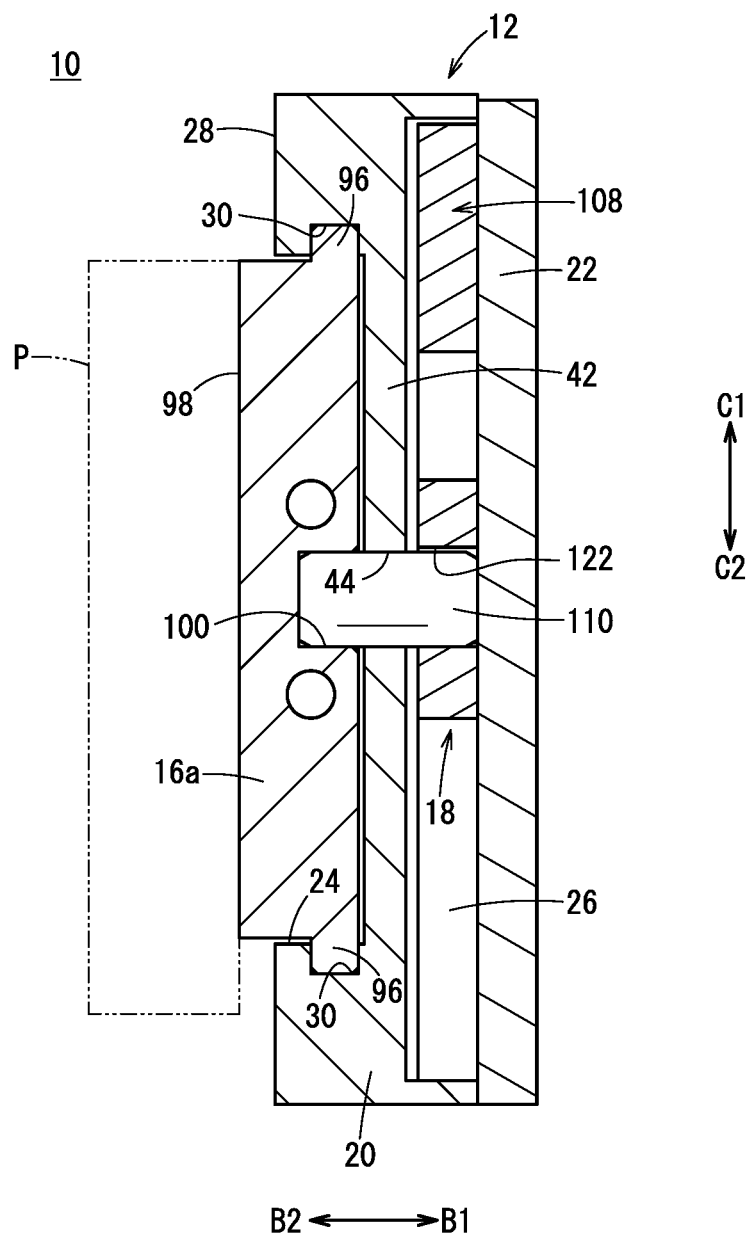
FIG. 8 is a cross-sectional view taken along line VIII-VIII of FIG. 5.

The finger accommodating section 24 is recessed at a predetermined depth from first end surfaces 28 on the front side and is formed substantially in parallel with the first end surfaces 28, and a pair of engagement grooves 30 (see FIG. 8) recessed in a vertical direction (height direction) are formed at a position on the rear side (in the direction of the arrow B1) with respect to the side of the first end surfaces 28. Stated otherwise, as shown in FIG. 8, the finger accommodating section 24 is formed so as to be wider in the height direction (in the direction of arrows C1 and C2) on the rear side (in the direction of the arrow B1) thereof. Additionally, the engagement grooves 30, in the same manner as the finger accommodating section 24, extend from a later-described fixed finger 32 to both ends in the longitudinal direction along the longitudinal direction of the body 12.

Further, the fixed finger 32 is formed at the center in the longitudinal direction of the main body portion 20. The fixed finger 32 is elongated in the vertical direction (the direction of arrows C1 and C2) with a substantially rectangular cross section, is disposed in a manner so as to divide the finger accommodating section 24 into two parts in the longitudinal direction (the direction of arrows A1 and A2), and is formed so as to connect the upper first end surface 28 (in the direction of the arrow C1) and the lower first end surface 28 (in the direction of the arrow C2) that are divided by the finger accommodating section 24.

In addition, the fixed finger 32 protrudes slightly more outward (in the direction of the arrow B2) than the first end surfaces 28 (see FIG. 6), while in addition, the protruding portion thereof includes a first mounting surface 34 substantially in parallel with the first end surfaces 28. For example, a suction unit P for attracting a workpiece is attached to the first mounting surface 34 via mounting holes 34a.

Figure 4:
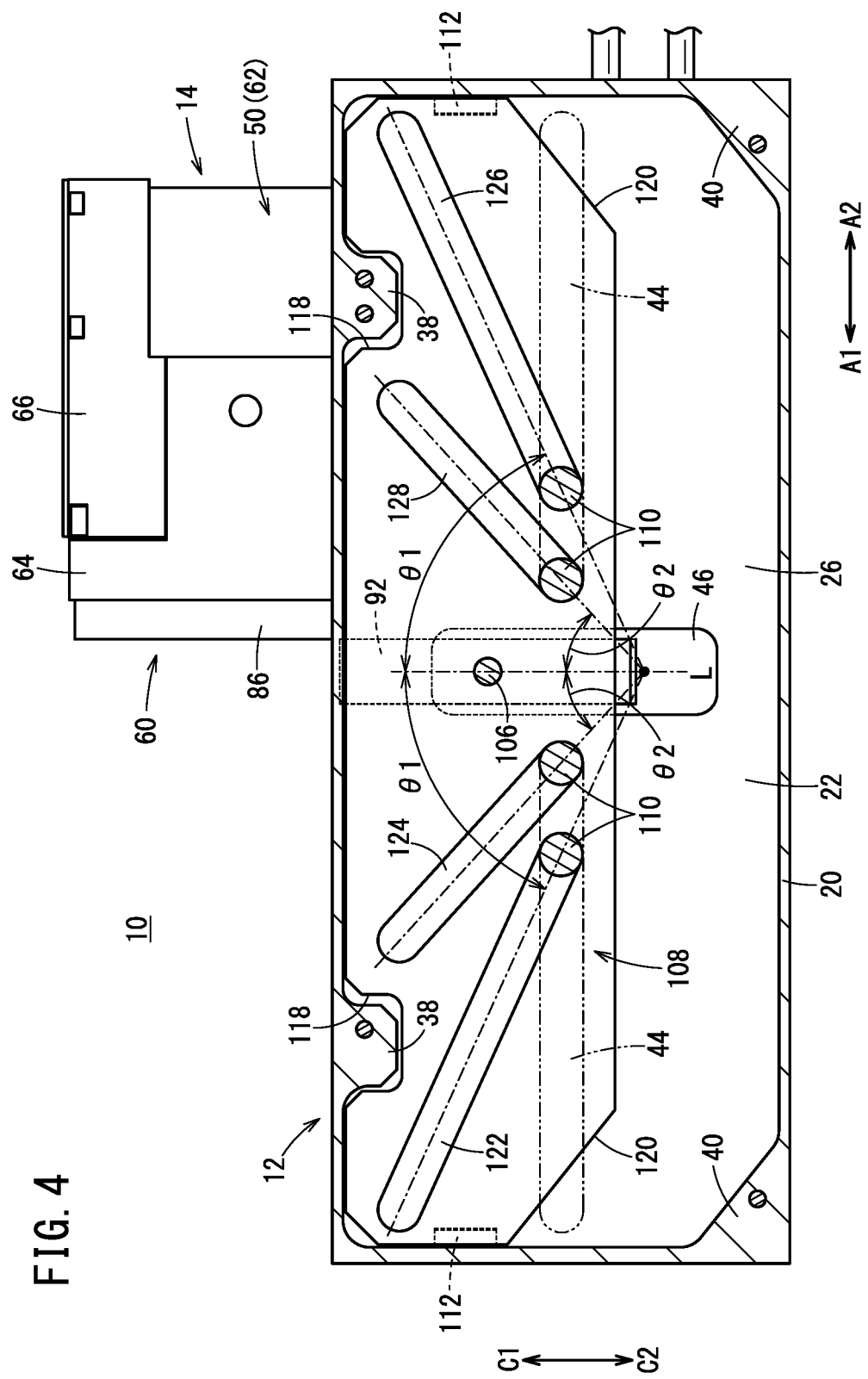
FIG. 4 is a cross-sectional view taken along line IV-IV of FIG. 1.

As shown in FIG. 4 and FIGS. 6 to 8, the accommodation chamber 26 is recessed at a predetermined depth with respect to a second end surface 36 on the rear side of the main body portion 20, is formed substantially in parallel with the second end surface 36, and is formed at a constant depth along the longitudinal direction (the direction of arrows A1 and A2) of the main body portion 20. Further, as shown in FIG. 4, the outer edge of the accommodation chamber 26 is covered by an outer wall of the main body portion 20 on the rear side, and a set of convex portions 38 having a rectangular cross section are disposed in a downwardly protruding manner on the outer wall above the accommodation chamber 26 (in the direction of the arrow C1). On the other hand, on the outer wall below the accommodation chamber 26 (in the direction of the arrow C2), corner portions 40 that bulge outward in a tapered shape are formed at the corners thereof.

Further, as shown in FIGS. 1 to 8, the main body portion 20 includes a separating wall 42 that separates the finger accommodating section 24 and the accommodation chamber 26, and a pair of guide holes 44 are formed in the separating wall 42 at substantially central positions in the height direction. The guide holes 44 are formed in straight line shapes with the fixed finger 32 being at the center along the longitudinal direction (the direction of arrows A1 and A2) of the main body portion 20, extend from the fixed finger 32 to the vicinity of both ends of the main body portion 20 in the longitudinal direction, and are formed to penetrate through the separation wall 42 so as to provide communication between the finger accommodating section 24 and the accommodation chamber 26.

As shown in FIGS. 1 to 4 and FIGS. 6 to 8, the cover member 22 is formed in a plate-like shape that entirely covers the rear side (in the direction of the arrow B1) of the main body portion 20, and a hole 46 extending in the height direction (in the direction of arrows C1 and C2) perpendicular to the longitudinal direction is formed in the center of the cover member 22 in the longitudinal direction. The hole 46 is formed in an elongate and linear shape in the height direction of the cover member 22, and due to being formed so as to penetrate through the cover member 22, provides communication between the accommodation chamber 26 of the main body portion 20 and the exterior.

In addition, the accommodation chamber 26 is placed in a covered state by the cover member 22 being fixed by a plurality of mounting bolts 48 in a state of being mounted on the rear side of the main body portion 20.

Figure 9:
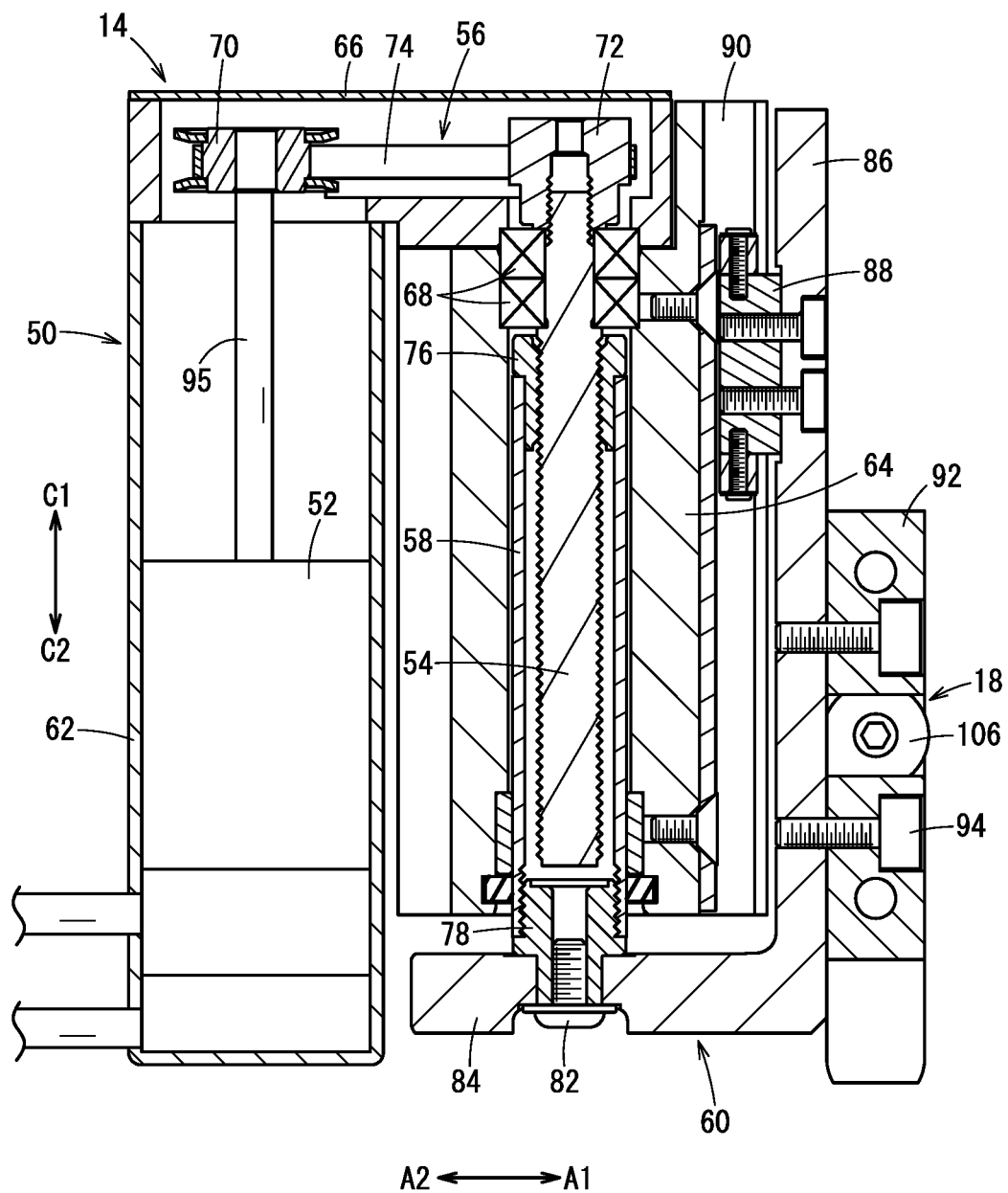
FIG. 9 is an overall cross-sectional view showing a drive unit that constitutes the variable pitch device shown in FIG. 1.

As shown in FIGS. 1 to 5 and FIG. 9, the drive unit 14 is made up from, for example, an electric actuator which is capable of moving a rod (output shaft) 58 forward and rearward in the axial direction (the direction of arrows C1 and C2) under an energizing action. As shown in FIG. 9, the drive unit 14 includes a housing 50, a motor 52 accommodated in the interior of the housing 50, a feed screw 54 rotatably provided in the interior of the housing 50, a transmission mechanism 56 that transmits a driving force of the motor 52 to the feed screw 54, the rod 58 that moves forward and rearward along the housing 50 under a rotating action of the feed screw 54, and an end block 60 connected to a distal end of the rod 58.

Figure 2:
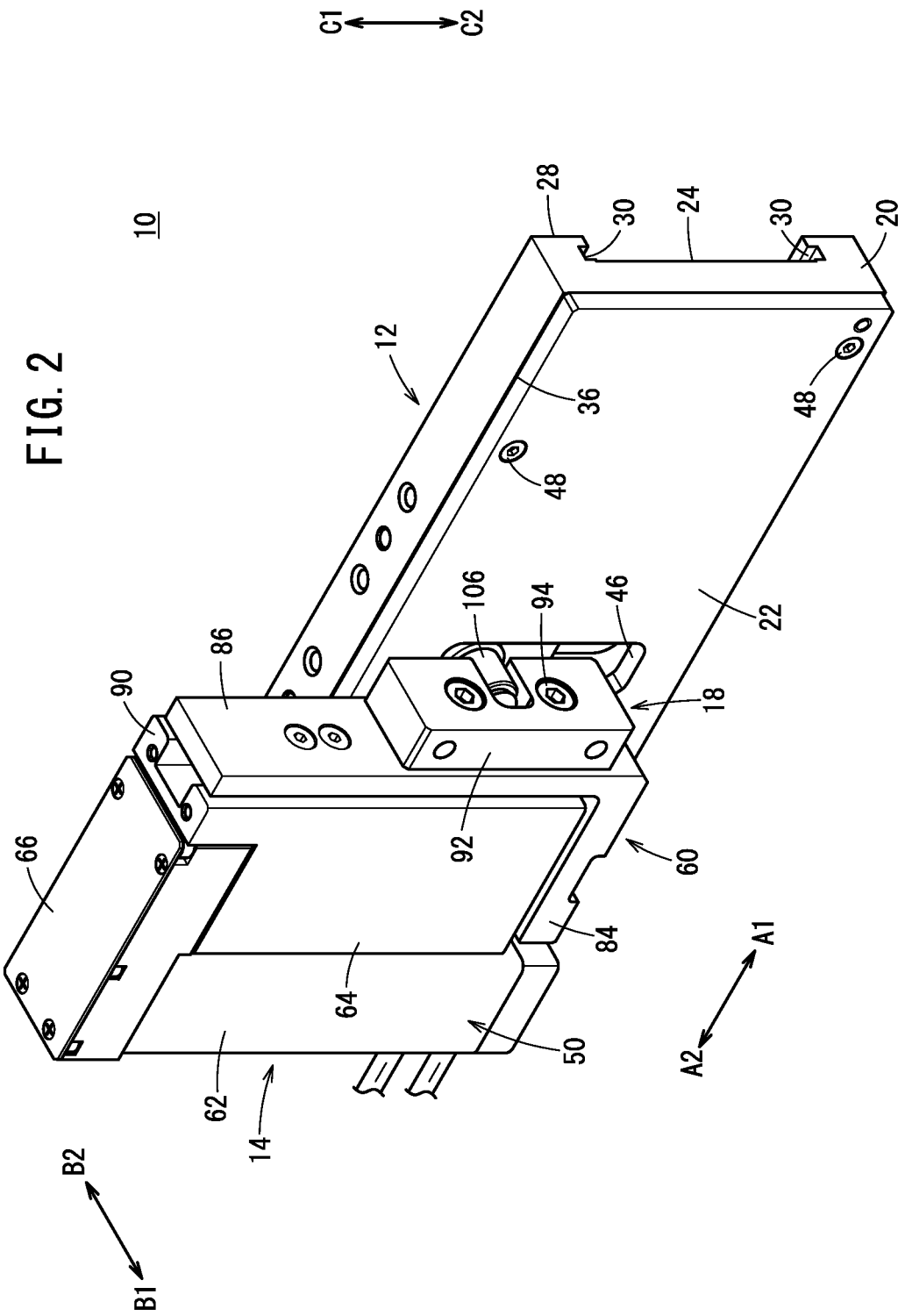
FIG. 2 is an external perspective view of the variable pitch device of FIG. 1 as viewed from another (rear side) direction.

Additionally, as shown in FIG. 2, on the rear side (in the direction of the arrow B1) of the body 12, the drive unit 14 is arranged in a manner so as to be perpendicular to the longitudinal direction (in the direction of arrows A1 and A2) of the body 12, and is connected to the cover member 22 by non-illustrated bolts or the like.

As shown in FIG. 9, the housing 50 includes first and second bore portions 62 and 64 formed in a hollow shape, and the first bore portion 62 and the second bore portion 64 are disposed respectively along the height direction (in the direction of arrows C1 and C2) perpendicular to the longitudinal direction (the direction of arrows A1 and A2) of the body 12 and are disposed adjacently in the longitudinal direction. In addition, the motor 52 is accommodated in the interior of the first bore portion 62, and the feed screw 54, a slider 76, and the rod 58 are accommodated in the interior of the second bore portion 64.

Further, a pulley cover 66 is connected to upper end portions of the first and second bore portions 62 and 64, and connects and closes the first bore portion 62 and the second bore portion 64, and a portion of the transmission mechanism 56 is accommodated in the interior thereof.

The feed screw 54 is made up from a shaft body having a predetermined length along the axial direction (the direction of arrows C1 and C2), and a screw thread is formed on the outer circumferential surface thereof, the feed screw 54 being accommodated inside the second bore portion 64 so as to extend in the height direction, and being rotatably supported via bearings 68.

The transmission mechanism 56 includes a drive pulley 70 connected to a drive shaft 95 of the motor 52, a driven pulley 72 connected to one end portion of the feed screw 54, a timing belt 74 placed between the drive pulley 70 and the driven pulley 72, and the slider 76 that is screw-engaged on the outer circumference of the feed screw 54.

The slider 76 is made up from a cylindrical body having a female screw thread formed on an inner circumferential surface thereof, and is screw-engaged with the male screw thread of the feed screw 54 that is inserted in the interior thereof, and the rod 58 formed in an annular shape is connected to the other end thereof. The rod 58 is made up from a tubular body in which the feed screw 54 can be accommodated, and is provided in a manner so that the other end thereof is exposed to the exterior with respect to a lower end portion of the second bore portion 64, the other end being covered and closed by a socket 78.

The end block 60 is formed in an L-shaped cross section and is disposed on the exterior of the second bore portion 64. A short end portion 84 thereof is connected to the other end portion of the rod 58 by the socket 78 and a fixing bolt 82 substantially perpendicular to the rod 58, and a side portion 86 thereof extending in a substantially perpendicular manner from one end of the end portion 84 extends in the vertical direction (the direction of arrows C1 and C2) laterally of the second bore portion 64.

Further, a guide block 88 is provided on the side portion 86 on a side surface thereof facing toward the second bore portion 64, and the guide block 88 engages with a concave guide rail 90 formed on the side wall of the second bore portion 64. Consequently, the end block 60 which includes the side portion 86 is movably guided along the height direction (in the direction of arrows C1 and C2) of the second bore portion 64.

Furthermore, on the side portion 86, a connecting block (connecting member) 92 that constitutes a later-described driving force transmission mechanism 18 is connected by two bolts 94 to a side surface opposite to the side surface on which the guide block 88 is provided.

In addition, when the drive shaft 95 is rotated under an energizing action of the motor 52, the rotational drive force thereof is transmitted to the feed screw 54 via the drive pulley 70, the timing belt 74, and the driven pulley 72, and the feed screw 54 is rotated in a state of being supported by the bearings 68. Consequently, the slider 76, which is screwed-engaged by rotation with the feed screw 54, moves forward and rearward in the axial direction (the direction of arrows C1 and C2) along the second bore portion 64 together with the rod 58, and the end block 60 moves in the height direction along the guide rail 90.

As shown in FIGS. 1, 3, and 5 to 8, the movable fingers 16a to 16d are formed, for example, with rectangular shapes in cross section, which are substantially the same shape as the fixed finger 32, and are arranged so that elongated directions thereof are in the height direction (the direction of arrows C1 and C2). The movable fingers 16a to 16d each include, at both ends in the height direction, pairs of flange portions 96 (see FIGS. 3 and 8) protruding in the height direction.

In addition, the movable fingers 16a to 16d are accommodated in the finger accommodating section 24 of the body 12, and the flange portions 96 thereof are arranged so as to be located in the vertical direction (the direction of arrows C1 and C2), and inserted and placed in engagement, respectively, with the engagement grooves 30. Consequently, the movable fingers 16a to 16d are retained movably in the longitudinal direction (the direction of arrows A1 and A2) along the finger accommodating section 24 of the body 12.

Further, on the body 12, two movable fingers 16a and 16b from among the four movable fingers 16a to 16d are arranged on one side in the longitudinal direction (the direction of the arrow A1) with respect to the fixed finger 32, whereas the remaining two movable fingers 16c and 16d are arranged on the other side in the longitudinal direction (the direction of the arrow A2) with respect to the fixed finger 32. More specifically, the four movable fingers 16a to 16d are arranged so as to have the same number on one side in the longitudinal direction (the direction of the arrow A1) and on the other side in the longitudinal direction (the direction of the arrow A2) with the fixed finger 32 being sandwiched therebetween.

Furthermore, in a state of being accommodated in the finger accommodating section 24, the front sides of the movable fingers 16a to 16d protrude slightly more outward (in the direction of the arrow B2) than the first end surfaces 28 of the body 12, and second mounting surfaces 98 substantially in parallel with the first end surfaces 28 are provided on the protruding portions thereof. The second mounting surfaces 98 are formed so as to lie flush with the first mounting surface 34 of the fixed finger 32, and for example, in the same manner as the fixed finger 32, suction units P for attracting workpieces are attached thereto via mounting holes 98a.

Figure 3:
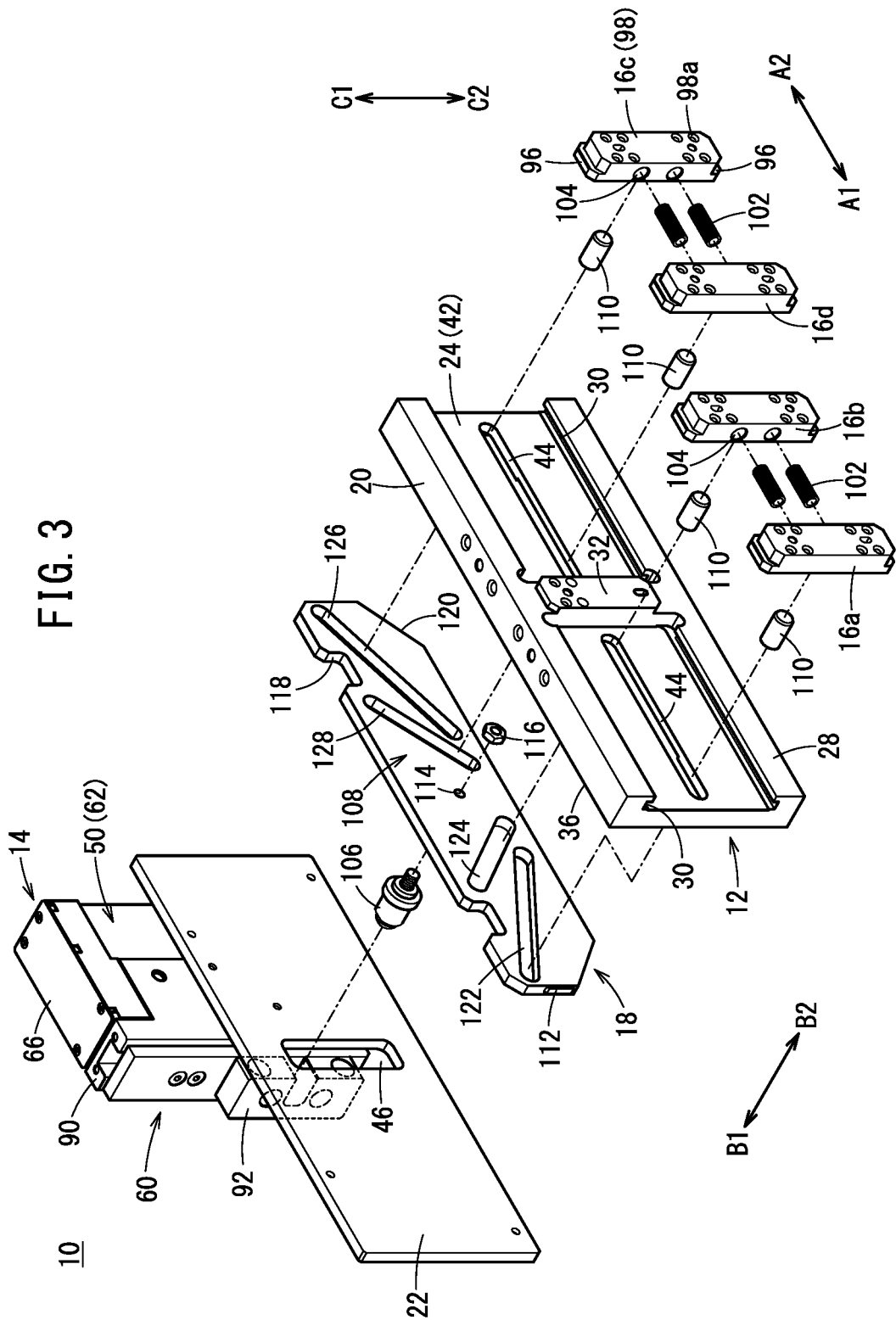
FIG. 3 is an exploded perspective view of the variable pitch device shown in FIG. 1.
Figure 5:
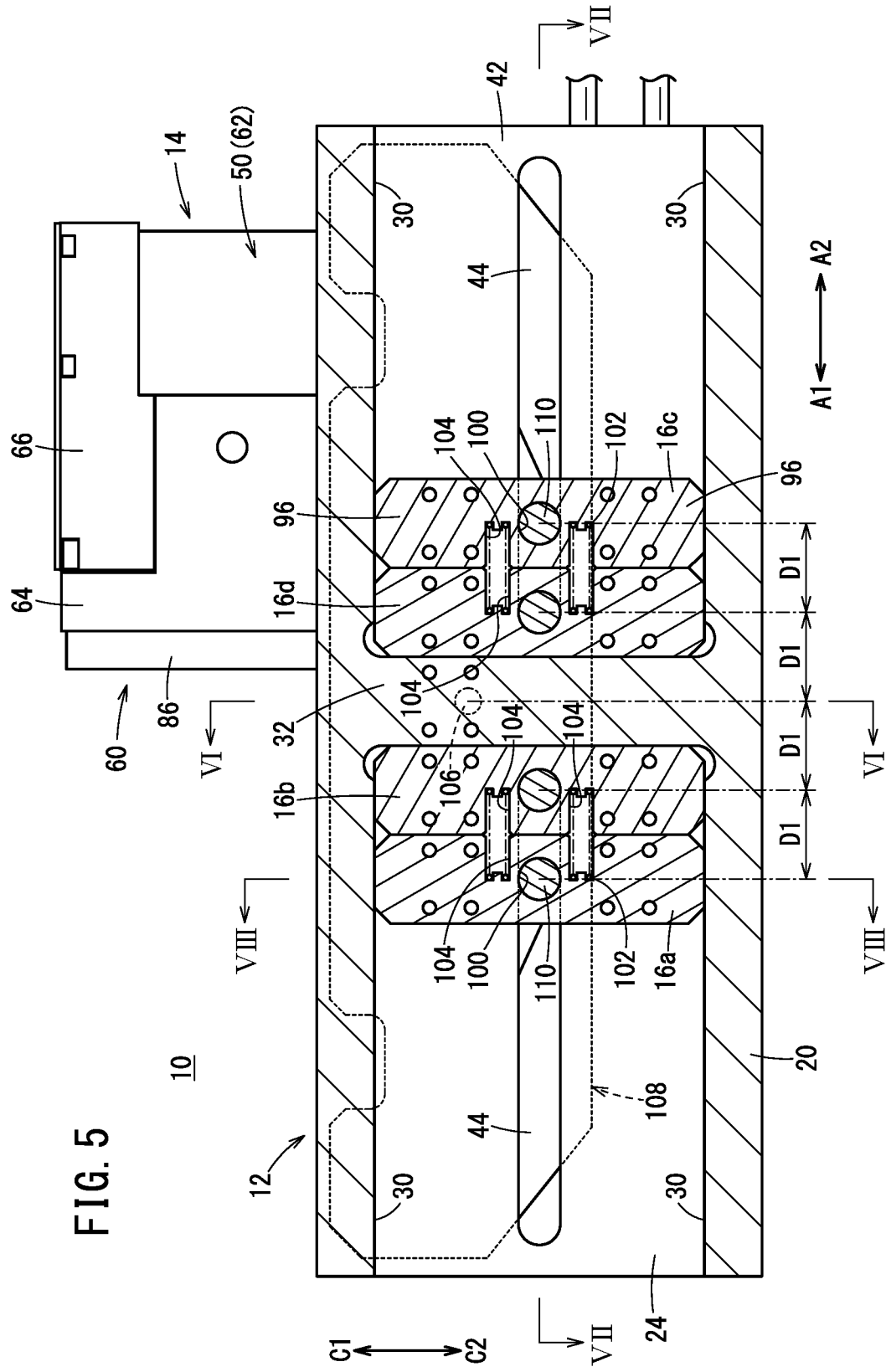
FIG. 5 is a cross-sectional view taken along line V-V of FIG. 1.

Further still, pin holes 100 are formed in the centers of the rear surfaces of the movable fingers 16a to 16d, and the finger pins 110 of the driving force transmission mechanism 18, which will be described later, are press-fitted and fixed in the pin holes 100, respectively. On the other hand, as shown in FIGS. 3 and 5, pairs of spring holes 104 into which springs (elastic member) 102 are inserted are formed respectively at positions above and below the pin holes 100 (in the direction of arrows C1 and C2), in opposing side surfaces of the adjacent movable fingers 16a and 16b and of the movable fingers 16c and 16d.

The spring holes 104 are formed respectively at a predetermined depth along the direction of movement (the direction of arrows A1 and A2) of the movable fingers 16a to 16d, in the side surface of the movable finger 16a (16d) and the side surface of the movable finger 16b (16c) that lie adjacent to each other. In addition, the springs 102 are disposed between the spring holes 104 of the movable finger 16a (16d) and the spring holes 104 of the movable finger 16b (16c). More specifically, the springs 102 are disposed along the direction of movement of the movable fingers 16a to 16d, and namely, along the longitudinal direction (the direction of arrows A1 and A2) of the body 12.

The springs 102 are made up, for example, from coil springs, an elastic force thereof is applied in a direction in which two adjacent movable fingers 16a (16d) and 16b (16c) are separated from each other, and by such an elastic force, rattling is prevented from occurring between the adjacent movable fingers 16a and 16b (16c and 16d), and the movable fingers are maintained in a substantially parallel state at all times.

As shown in FIGS. 2 to 8, the driving force transmission mechanism 18 is equipped with the connecting block 92, which is connected to the end block 60 constituting the drive unit 14 and includes a connecting bolt (connecting member) 106, a cam plate 108 accommodated in the accommodation chamber 26 of the body 12 and connected to the connecting bolt 106, and the finger pins 110 which are inserted through first to fourth cam grooves 122, 124, 126, and 128 of the cam plate 108 and are connected to the movable fingers 16a to 16d.

The connecting block 92 is made up, for example, from a block body having a rectangular cross section, is connected to the side portion 86 of the end block 60, and is disposed so as to protrude from the side portion 86 toward the side (in the direction of the arrow A1) opposite to the housing 50 of the drive unit 14. In addition, the connecting bolt 106 is connected to the center of the connecting block 92 in the height direction, so as to protrude toward the side of the body 12 (in the direction of the arrow B2).

Figure 6:
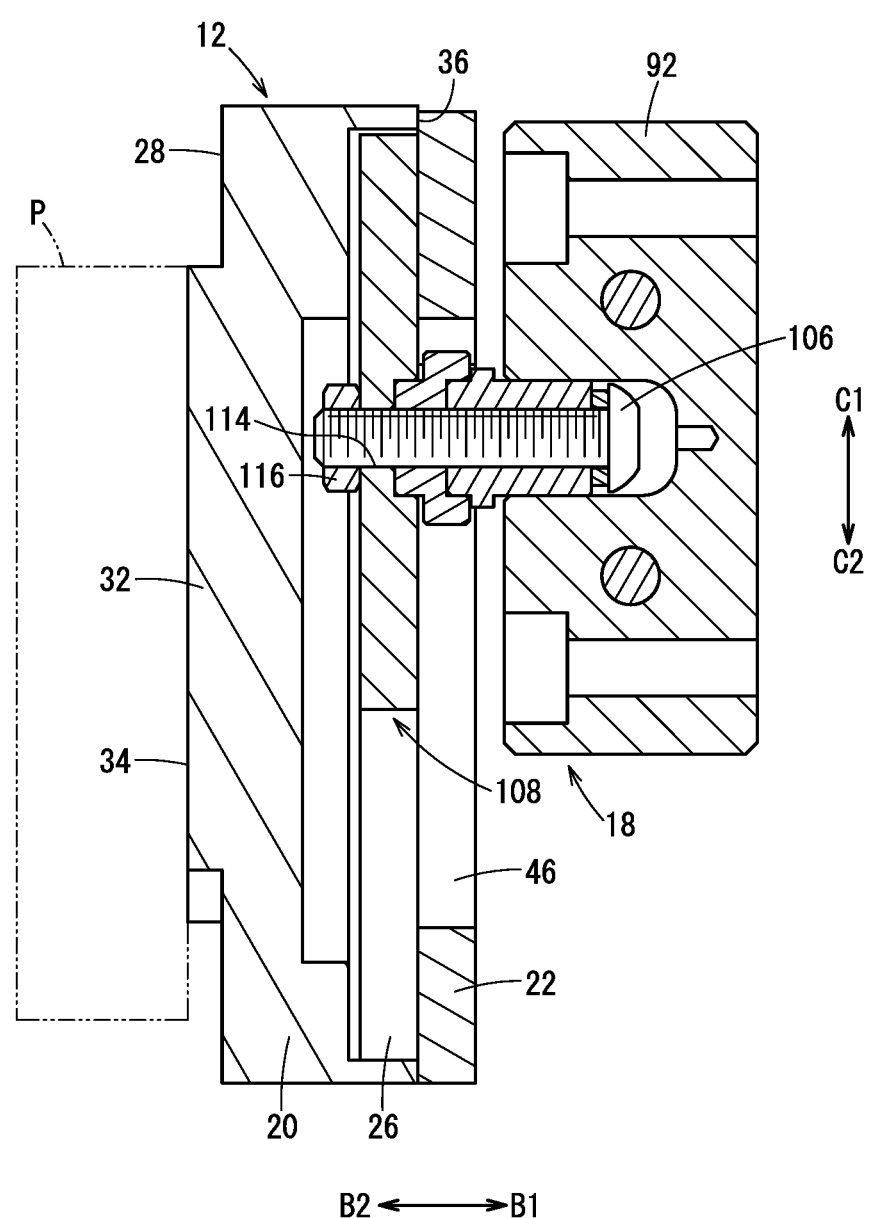
FIG. 6 is a cross-sectional view taken along line VI-VI of FIG. 5.

Further, the connecting block 92 is positioned so as to face toward the hole 46 of the cover member 22, in a state with the drive unit 14 being fixed to the rear surface of the body 12, and the connecting bolt 106 is inserted through the hole 46 and enters inside the accommodation chamber 26 (see FIG. 6).

As shown in FIGS. 3 to 8, the cam plate 108 is made of an elongate plate material extending along the longitudinal direction of the body 12 (in the direction of arrows A1 and A2), and is formed in a shape having substantially the same dimension as the longitudinal dimension of the accommodation chamber 26, and roughly half of the height dimension of the accommodation chamber 26. In addition, the cam plate 108 is accommodated in the accommodation chamber 26 so as to be capable of moving in the vertical direction (in the direction of arrows C1 and C2), and wear rings 112 are provided respectively on side portions of the cam plate 108, such that when the cam plate 108 moves, it is guided in the vertical direction while the wear rings 112 are in contact with inner walls of the accommodation chamber 26.

In the center of the cam plate 108, the connecting bolt 106 is inserted from the rear side through a bolt hole 114 that penetrates in the thickness direction, and a nut 116 (see FIGS. 3 and 6) is screw-engaged on the distal end thereof, whereby the cam plate 108 is connected to the connecting bolt 106.

Further, as shown in FIG. 4, a pair of recesses 118 into which the convex portions 38 of the body 12 can be inserted are formed at the upper end of the cam plate 108 so as to be recessed downward (in the direction of the arrow C2), and notched portions 120 that are notched diagonally are formed on lower ends of both ends thereof in the longitudinal direction.

Furthermore, the cam plate 108 is provided with four first to fourth cam grooves 122, 124, 126, and 128, which extend radially from the vicinity of the lower end toward the upper end side thereof. Two first and second cam grooves 122 and 124 are formed on one side in the longitudinal direction (in the direction of the arrow A1) with the hole 46 at the center in the longitudinal direction being sandwiched therebetween, and two third and fourth cam grooves 126 and 128 are formed on the other side in the longitudinal direction (in the direction of the arrow A2) with the hole 46 being sandwiched therebetween.

Further, the first and third cam grooves 122 and 126 on both end sides of the cam plate 108 in the longitudinal direction are formed so as to be inclined respectively at a first angle of inclination $\theta 1$ with respect to a virtual line L passing through the center of the hole 46 in the vertical direction (the direction of arrows C1 and C2), and are formed so as to have a symmetrical shape with respect to the virtual line L. In addition, the upper ends of the first and third cam grooves 122 and 126 extend to the vicinity of the upper end of both ends of the cam plate 108 in the longitudinal direction.

On the other hand, the second and fourth cam grooves 124 and 128 are formed so as to be inclined respectively at a second angle of inclination $\theta 2$, which is smaller than the first angle of inclination $\theta 1$, with respect to the virtual line L ($\theta 2 < \theta 1$), and are formed so as to have a symmetrical shape with respect to the virtual line L. In addition, the upper ends of the second and fourth cam grooves 124 and 128 extend to the vicinity of inner sides of the recesses 118 in the longitudinal direction.

More specifically, the first and second cam grooves 122 and 124 and the third and fourth cam grooves 126 and 128 are formed so as to have a symmetrical shape with respect to the center of the cam plate 108 in the longitudinal direction, and the first and third cam grooves 122 and 126 are formed to be longer than the second and fourth cam grooves 124 and 128.

By being fixed in the pin holes 100 of the movable fingers 16a to 16d, the finger pins 110 protrude toward the rear side (in the direction of the arrow B1) (see FIG. 7), are inserted respectively through the guide holes 44 of the body 12, and are also inserted respectively through the first to fourth cam grooves 122, 124, 126, and 128 in the cam plate 108. Consequently, the finger pins 110 can be moved only in the longitudinal direction (the direction of arrows A1 and A2) of the body 12 by the guide holes 44.

The variable pitch device 10 according to the first embodiment of the present invention is constructed basically as described above. Next, operations and advantages thereof will be described. The closed state in which the four movable fingers 16a to 16d shown in FIGS. 1 and 5 are moved toward the side of the fixed finger 32, which is in the center of the body 12 in the longitudinal direction, and approach one another will be described as an initial state.

In such an initial state, the end portion 84 is placed in close proximity to the other end of the second bore portion 64 (see FIG. 2) by the end block 60 being moved upward (in the direction of the arrow C1) under the driving action of the drive unit 14, and as shown in FIGS. 4 and 6, the cam plate 108 is positioned upwardly (in the direction of the arrow C1) inside the accommodation chamber 26, and the finger pins 110 are positioned at lower ends of the first to fourth cam grooves 122, 124, 126, and 128.

Therefore, as shown in FIG. 4, the respective finger pins 110 are gathered together and approach the center of the body 12 in the longitudinal direction, and a state is brought about in which the movable fingers 16a to 16d to which the respective finger pins 110 are connected are gathered together toward the side of the fixed finger 32 in the center in the longitudinal direction, and are arranged in close proximity to each other at an interval separation D1 (see FIG. 5).

In the aforementioned initial state, by outputting a control signal from a non-illustrated controller to the motor 52 of the drive unit 14, the drive shaft 95 of the motor 52 is rotated, the rotational driving force is transmitted to the drive pulley 70, the timing belt 74, and the driven pulley 72, and the feed screw 54 is rotated in a state of being supported by the bearings 68.

The slider 76 is lowered accompanying rotation of the feed screw 54, and the rod 58 is lowered together with the slider 76, whereby the end portion 84 of the end block 60 moves in a direction to separate away from the housing 50 (in the direction of the arrow C2). In addition, the connecting block 92 is lowered together with the end block 60, whereby the cam plate 108 connected by the connecting bolt 106 is lowered in the accommodation chamber 26 under a guiding action of the wear rings 112.

Figure 11:
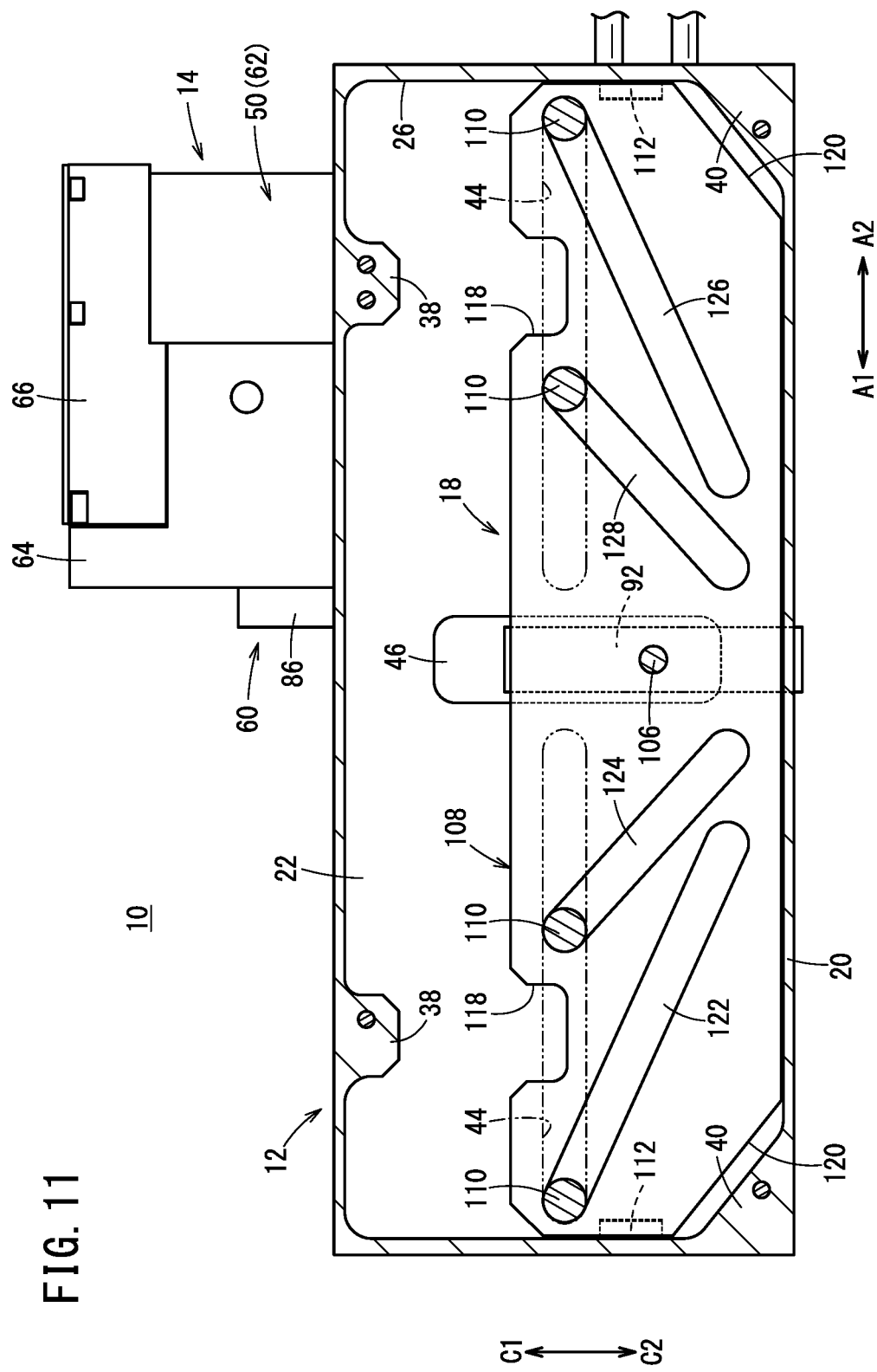
FIG. 11 is a cross-sectional view taken along line XI-XI of FIG. 10.
Figure 12:
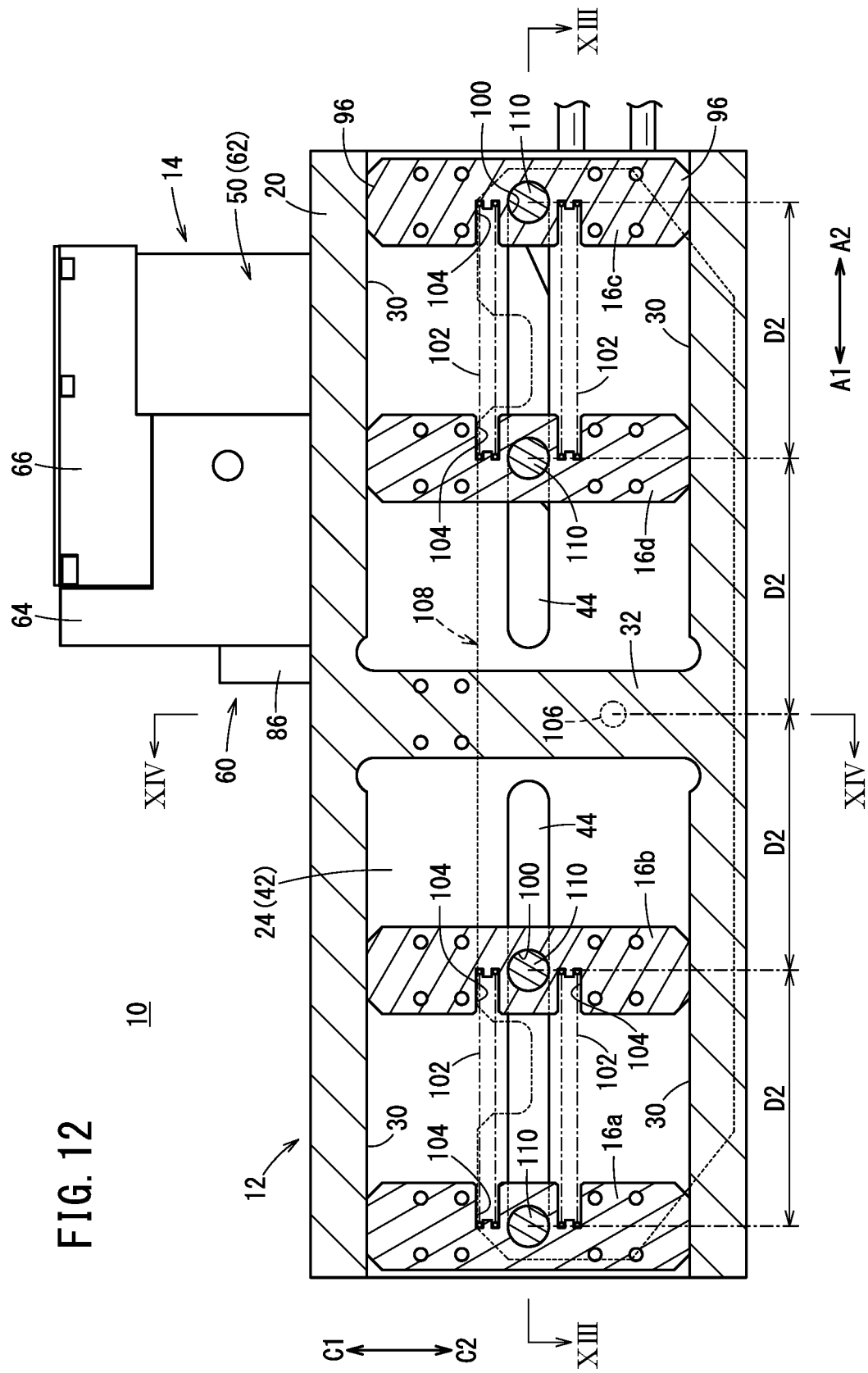
FIG. 12 is a cross-sectional view taken along line XII-XII of FIG. 10.

As shown in FIGS. 11 and 12, accompanying lowering of the cam plate 108, the respective finger pins 110 which are inserted into the guide holes 44 move respectively toward both end sides in the longitudinal direction (the direction of arrows A1 and A2), and separate away from each other in the longitudinal direction by way of the first to fourth cam grooves 122, 124, 126, and 128, respectively.

In greater detail, with respect to the finger pins 110, by the first to fourth cam grooves 122, 124, 126, and 128 moving from the lower end to the upper end, the respective finger pins 110 that are inserted through the first and second cam grooves 122 and 124 move along the guide hole 44 to one side in the longitudinal direction (in the direction of the arrow A1) with respect to the fixed finger 32. At this time, the finger pin 110 inserted through the first cam groove 122 further moves to one side in the longitudinal direction (in the direction of the arrow A1) with respect to the finger pin 110 that is inserted through the second cam groove 124.

On the other hand, the respective finger pins 110 that are inserted through the third and fourth cam grooves 126 and 128 move along the guide hole 44 to the other side in the longitudinal direction (in the direction of the arrow A2) with respect to the fixed finger 32. The finger pin 110 inserted through the third cam groove 126 further moves to the other side in the longitudinal direction (in the direction of the arrow A2) with respect to the finger pin 110 that is inserted through the fourth cam groove 128.

At this time, since the first and second cam grooves 122 and 124 and the third and fourth cam grooves 126 and 128 are formed so as to have a symmetrical shape with respect to the direction of movement of the cam plate 108 (in the direction of arrows C1 and C2), the movement speed and the movement distance of the respective finger pins 110 to both end sides in the longitudinal direction (the direction of arrows A1 and A2) are equivalent to each other, respectively.

In addition, accompanying movement of the finger pins 110, in a similar manner, the movable fingers 16a to 16d connected to the finger pins 110 move toward both end sides in the longitudinal direction so as to separate away from the fixed finger 32, while maintaining a state of being evenly spaced from each other in the finger accommodating section 24.

Figure 13:
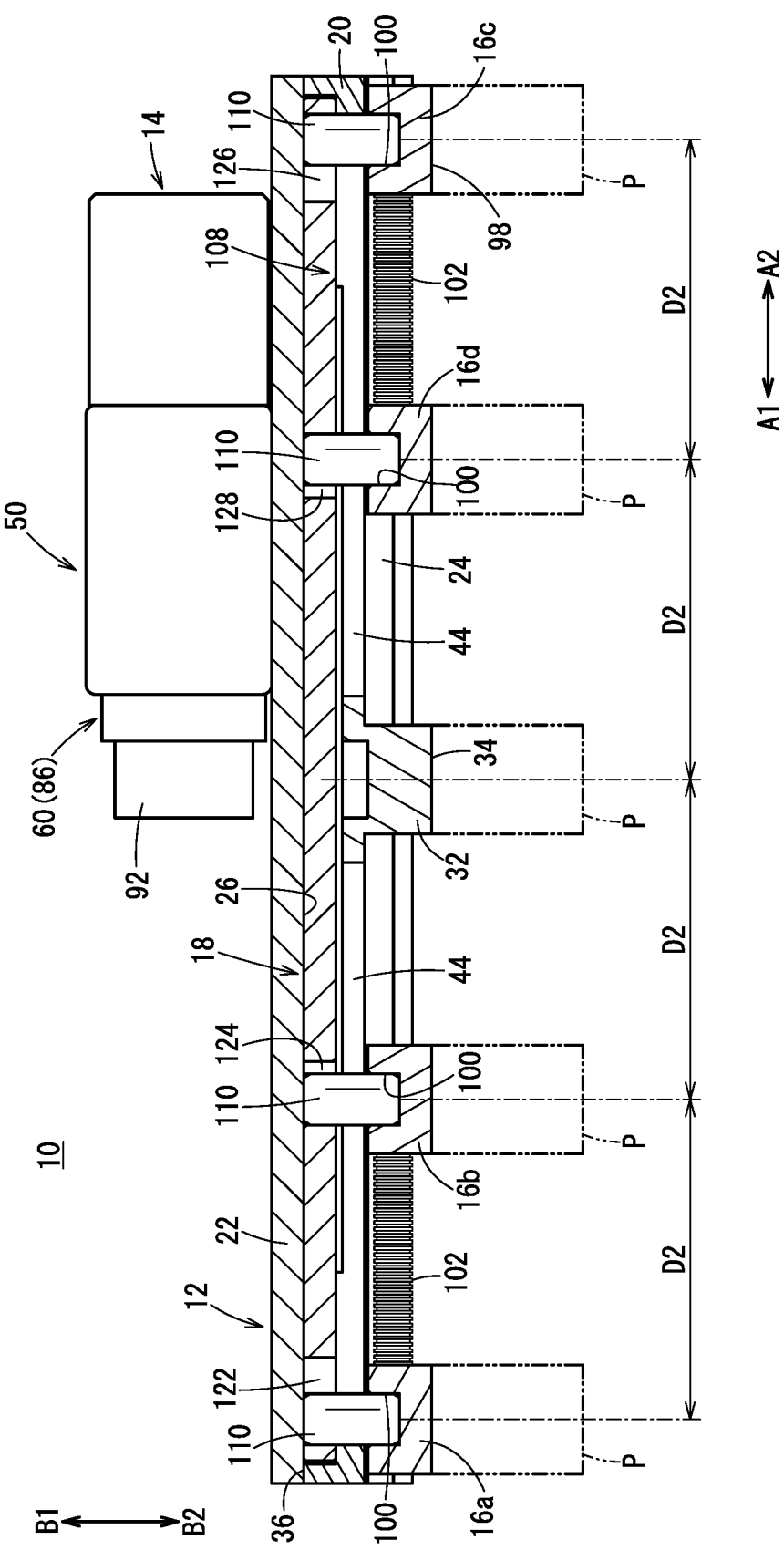
FIG. 13 is a cross-sectional view taken along line XIII-XIII of FIG. 12.
Figure 14:
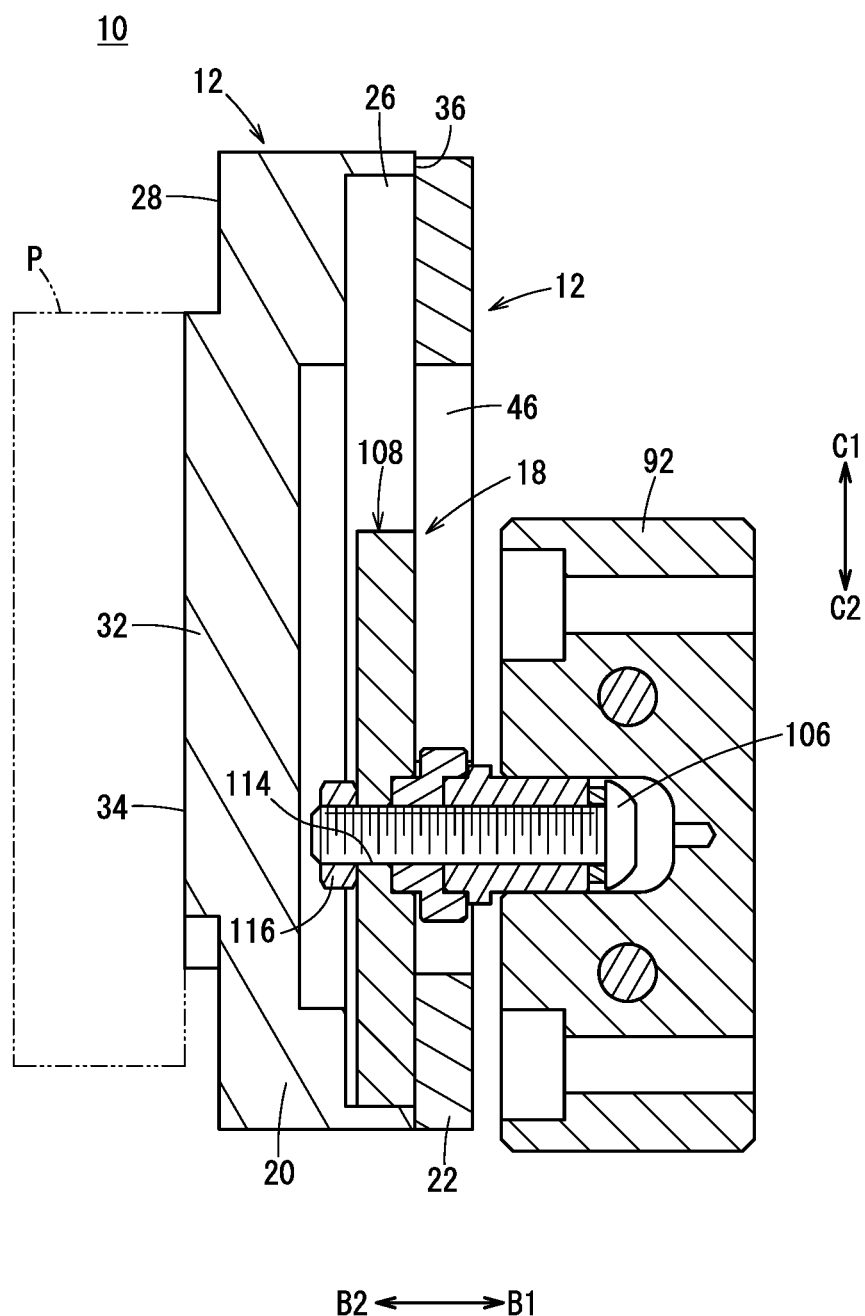
FIG. 14 is a cross-sectional view taken along line XIV-XIV of FIG. 12.

Finally, as shown in FIGS. 11, 12, and 14, the cam plate 108 moves to the lower end in the accommodation chamber 26 under the driving action of the drive unit 14, and the notched portions 120 thereof are placed in positions facing toward the respective corner portions 40. Consequently, as shown in FIGS. 10, 12, and 13, in the longitudinal direction of the body 12, the movable fingers 16a to 16d and the fixed finger 32 are arranged at an equal interval separation D2 in the open state.

Figure 10:
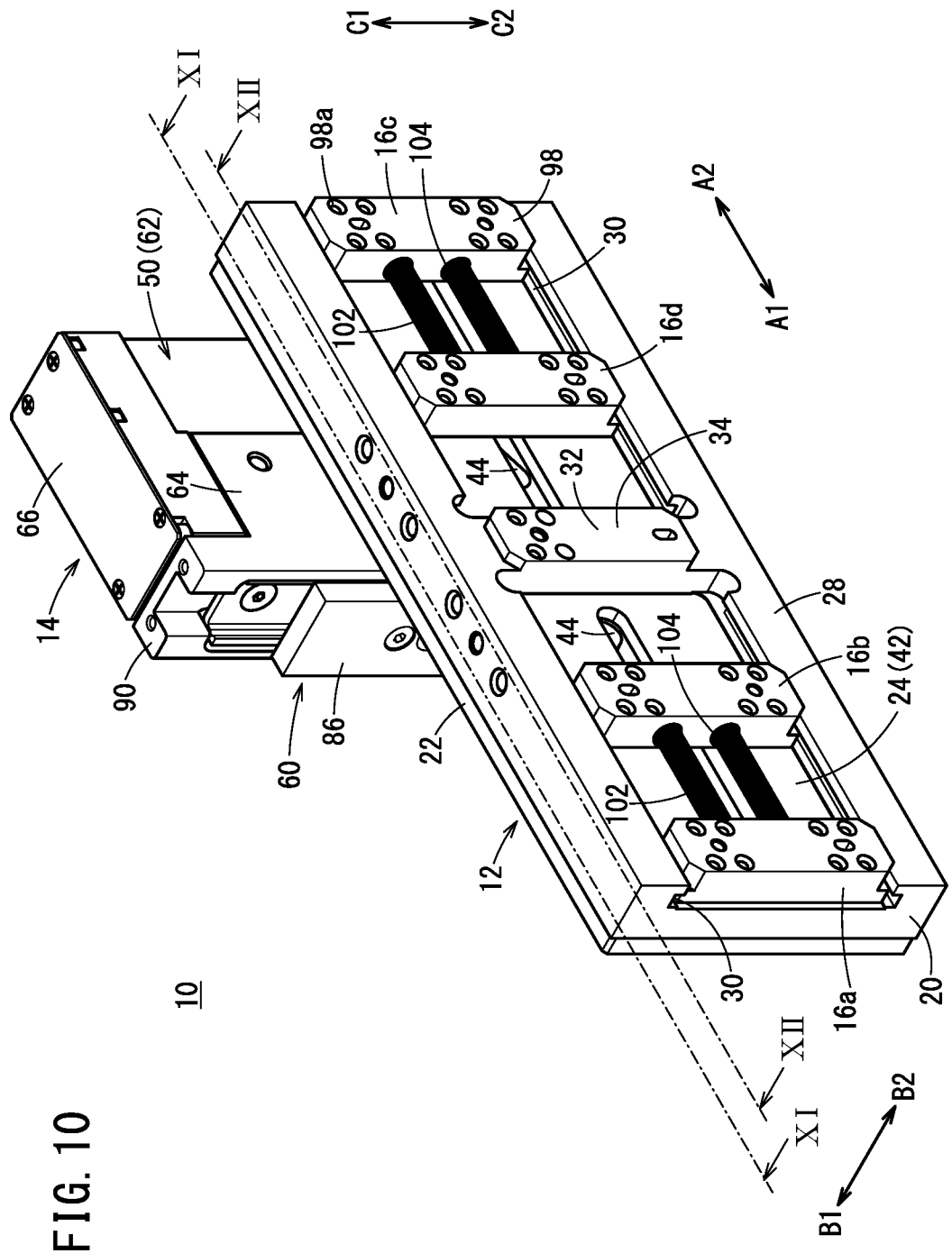
FIG. 10 is an external perspective view showing an open state in which movable fingers are opened in the variable pitch device shown in FIG. 1.

On the other hand, in the case that the aforementioned movable fingers 16a to 16d shown in FIG. 10 are restored from the open state to the closed state, the motor 52 of the drive unit 14 is rotated in an opposite direction by a control signal from the non-illustrated controller, whereby the feed screw 54 is rotated in the opposite direction via the drive pulley 70 and the driven pulley 72, and the rod 58 is moved so as to be drawn into the second bore portion 64. Consequently, the end block 60 and the connecting block 92 move upward (in the direction of the arrow C1) along the housing 50, and along with such movement, the cam plate 108 moves upward inside the accommodation chamber 26.

In addition, accompanying rising of the cam plate 108, the respective finger pins 110 inserted into the guide holes 44 move respectively toward the side of the fixed finger 32 by way of the first to fourth cam grooves 122, 124, 126, and 128. Then, as shown in FIG. 5, the movable fingers 16a to 16d which are connected to the finger pins 110 approach one another, and are placed in the closed state with the interval separation D1 therebetween. More specifically, in the above-described variable pitch device 10, the direction of movement of the rod 58 in the drive unit 14 (the output direction, the direction of arrows C1 and C2) and the direction of movement of the movable fingers 16a to 16d (the direction of arrows A1 and A2) are perpendicular to each other.

Next, a description will be given concerning a case in which the above-described variable pitch device 10 is attached to the distal end of an arm in a non-illustrated transport device, and a plurality of workpieces are transported by respective suction units P that are attached to the fixed finger 32 and the movable fingers 16a to 16d.

Figure 7:
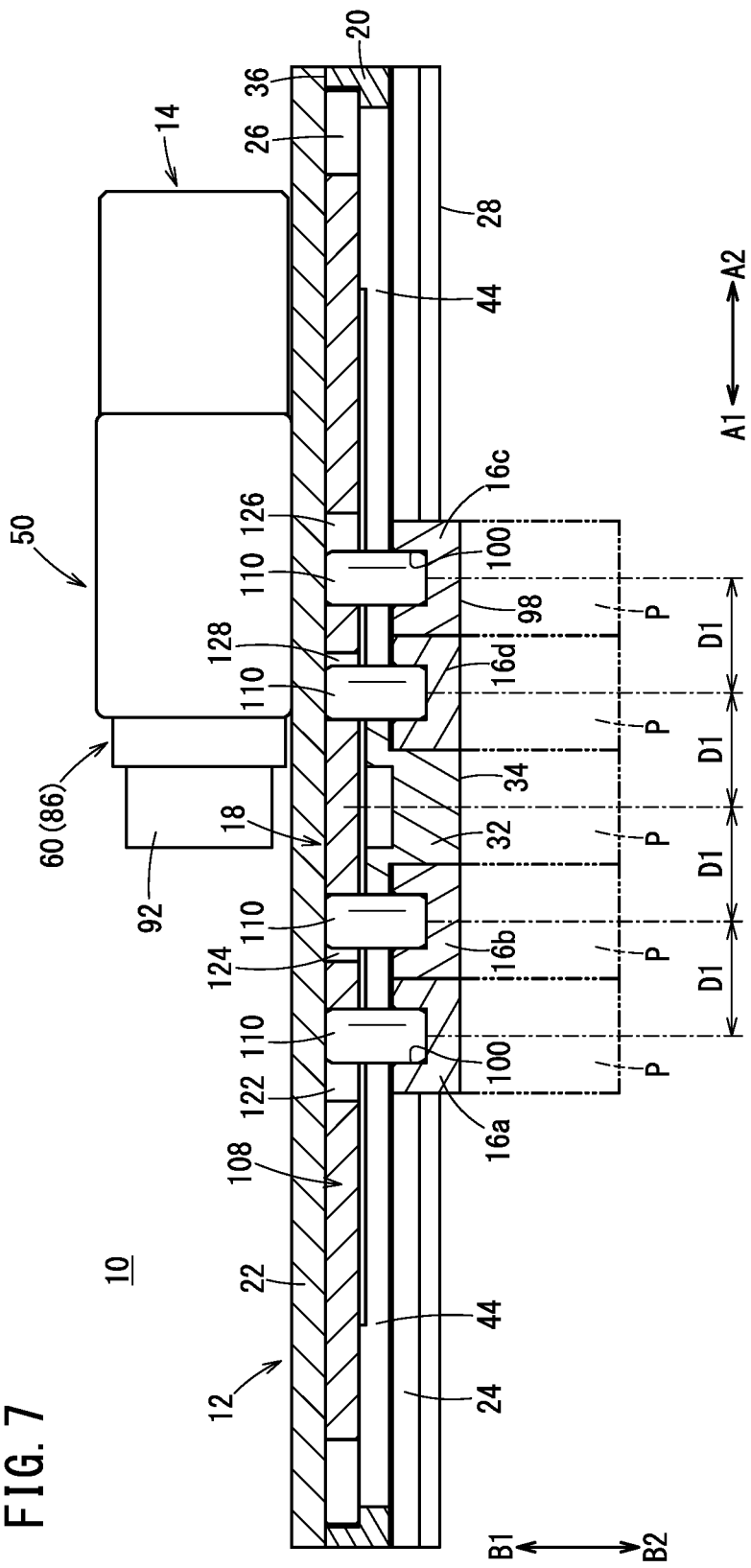
FIG. 7 is a cross-sectional view taken along line VII-VII of FIG. 5.

At first, in the closed state, which is the initial state of the variable pitch device 10 shown in FIGS. 1 and 7, five workpieces that are placed on the supply source are attracted and gripped by the suction units P which are provided on the fixed finger 32 and the movable fingers 16a to 16d. At this time, the interval separation between the respective workpieces corresponds to the interval separation D1 of the fixed finger 32 and the movable fingers 16a to 16d in the closed state.

Next, during transport of the workpieces from the supply source to the supply destination for the workpieces, under the driving action of the drive unit 14, the four movable fingers 16a to 16d are moved toward both ends of the body 12 in the longitudinal direction with respect to the fixed finger 32, whereby the interval separation is increased in a manner so that the five workpieces which are gripped by the suction units P are separated from each other. In addition, by movement of the cam plate 108 of the variable pitch device 10 to the lower end, as shown in FIGS. 10, 12, and 13, the fixed finger 32 and the four movable fingers 16a to 16d are placed in the open state of being separated at the maximum interval separation D2, and the five workpieces are also placed in a state of being separated at the interval separation D2.

After the five workpieces, which are separated from each other at the maximum interval separation by operation of the variable pitch device 10, have been transported to the supply destination by the transport device, the state of being attracted by the suction units P is released, whereby the five workpieces are supplied to the supply destination at an interval separation that differs from that at the supply source.

As described above, in the first embodiment, the cam plate 108 which is capable of moving in the vertical direction (in the direction of arrows C1 and C2) under the driving action of the drive unit 14 is provided in the interior of the accommodation chamber 26 in the body 12, and the first to fourth cam grooves 122, 124, 126, and 128 that are inclined at predetermined angles with respect to the direction of movement thereof (in the vertical direction) are included in the cam plate 108. Further, the four finger pins 110, which are inserted through the guide holes 44 that extend in the longitudinal direction (the direction of arrows A1 and A2) of the body 12, are inserted respectively through the first to fourth cam grooves 122, 124, 126, and 128. In addition, the finger pins 110 are connected to the four movable fingers 16a to 16d which are disposed so as to be capable of moving in the longitudinal direction along the finger accommodating section 24 of the body 12.

As a result, in the variable pitch device 10, with a simple configuration in which the cam plate 108 and the finger pins 110 that transmit the driving force from the drive unit 14 to the plurality of movable fingers 16a to 16d are provided between the movable fingers 16a to 16d and the drive unit 14, it becomes possible to make the size of the device smaller in the thickness direction (the direction of arrows B1 and B2), and to reduce manufacturing costs, in comparison with a conventional variable pitch device in which the driving force of the motor is transmitted to slide blocks via a plate cam and two levers.

Further, between each two of the movable fingers 16a to 16d that are adjacent to each other, the springs 102, which bias the adjacent movable fingers 16a to 16d in directions away from each other (in the directions of arrows A1 and A2), are provided. Therefore, rattling is prevented from occurring between each two of the movable fingers 16a to 16d that are adjacent to each other, and the adjacent movable fingers 16a and 16b (16c and 16d) are suitably maintained in a substantially parallel state at all times.

Furthermore, since the wear rings 112, which can slidably contact the inner walls of the accommodation chamber 26, are provided on the side portions of the cam plate 108, the cam plate 108 is prevented from coming into direct contact with the body 12, and in addition, the cam plate 108 is suitably guided when moving in the vertical direction (in the direction of arrows C1 and C2) inside the accommodation chamber 26.

Next, a variable pitch device 150 according to a second embodiment is shown in FIGS. 15 to 21. The same reference numerals are used to indicate the same constituent elements as those of the above-described variable pitch device 10 according to the first embodiment, and detailed description of such features is omitted.

The variable pitch device 150 according to the second embodiment differs from the variable pitch device 10 according to the first embodiment, in that it comprises a pair of guide rods (guide members) 156a and 156b for guiding a plurality of movable fingers 152a to 152d along the longitudinal direction (the direction of arrows A1 and A2) of a body 154, and a pair of spring rods 160a and 160b for guiding springs (elastic members) 158.

Figure 15:
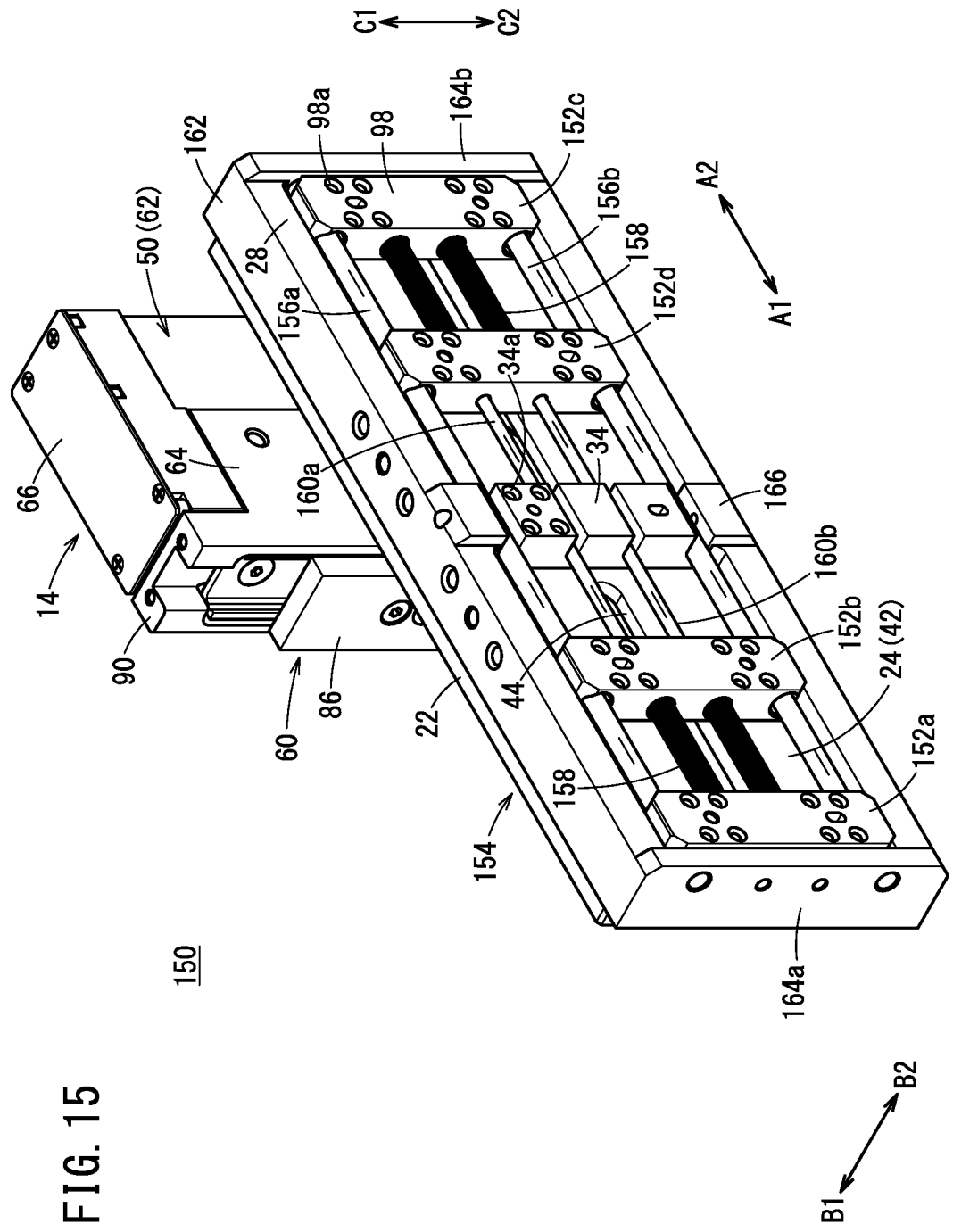
FIG. 15 is an external perspective view of a variable pitch device according to a second embodiment of the present invention.
Figure 16:
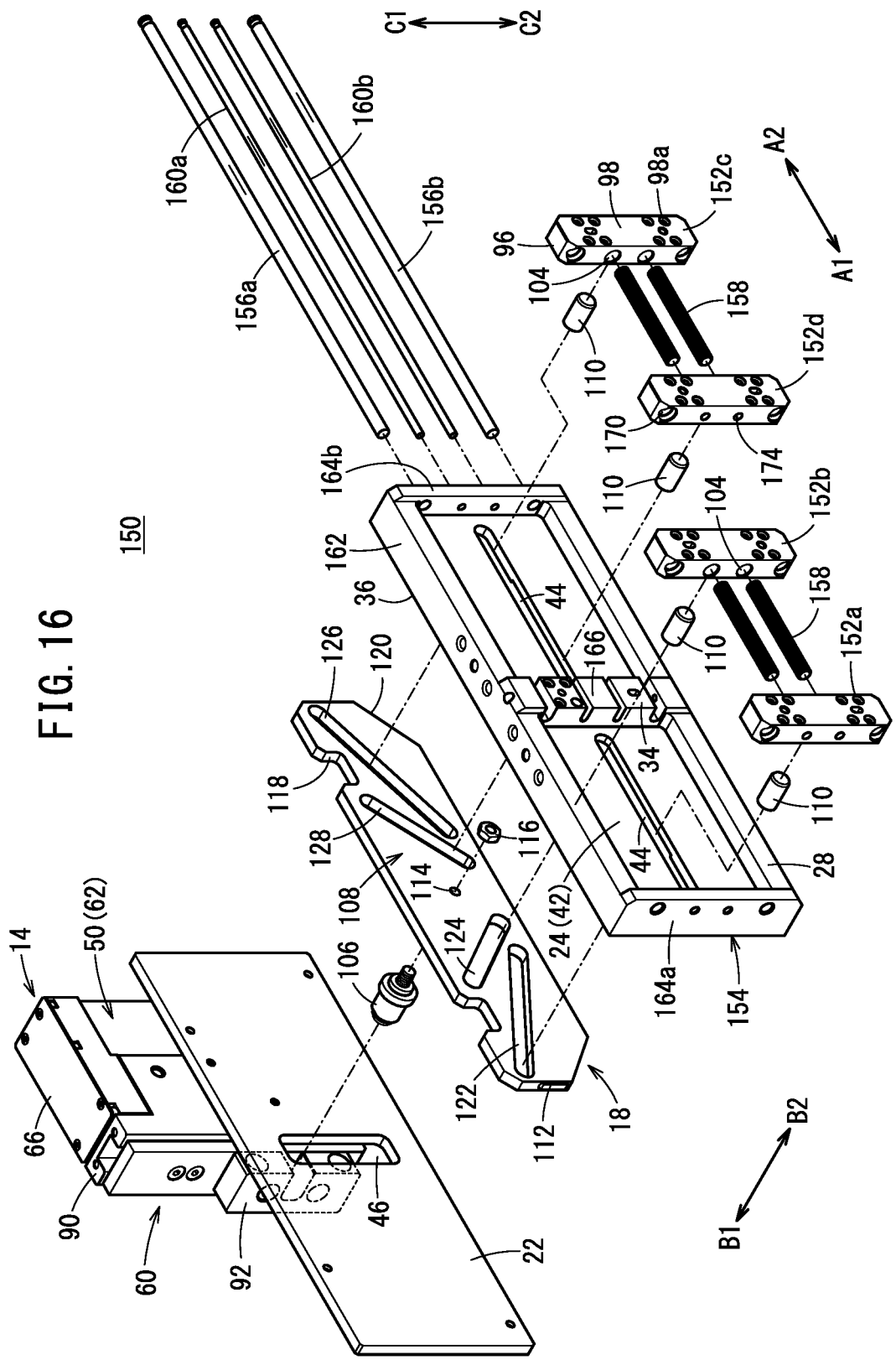
FIG. 16 is an exploded perspective view of the variable pitch device shown in FIG. 15.
Figure 17:
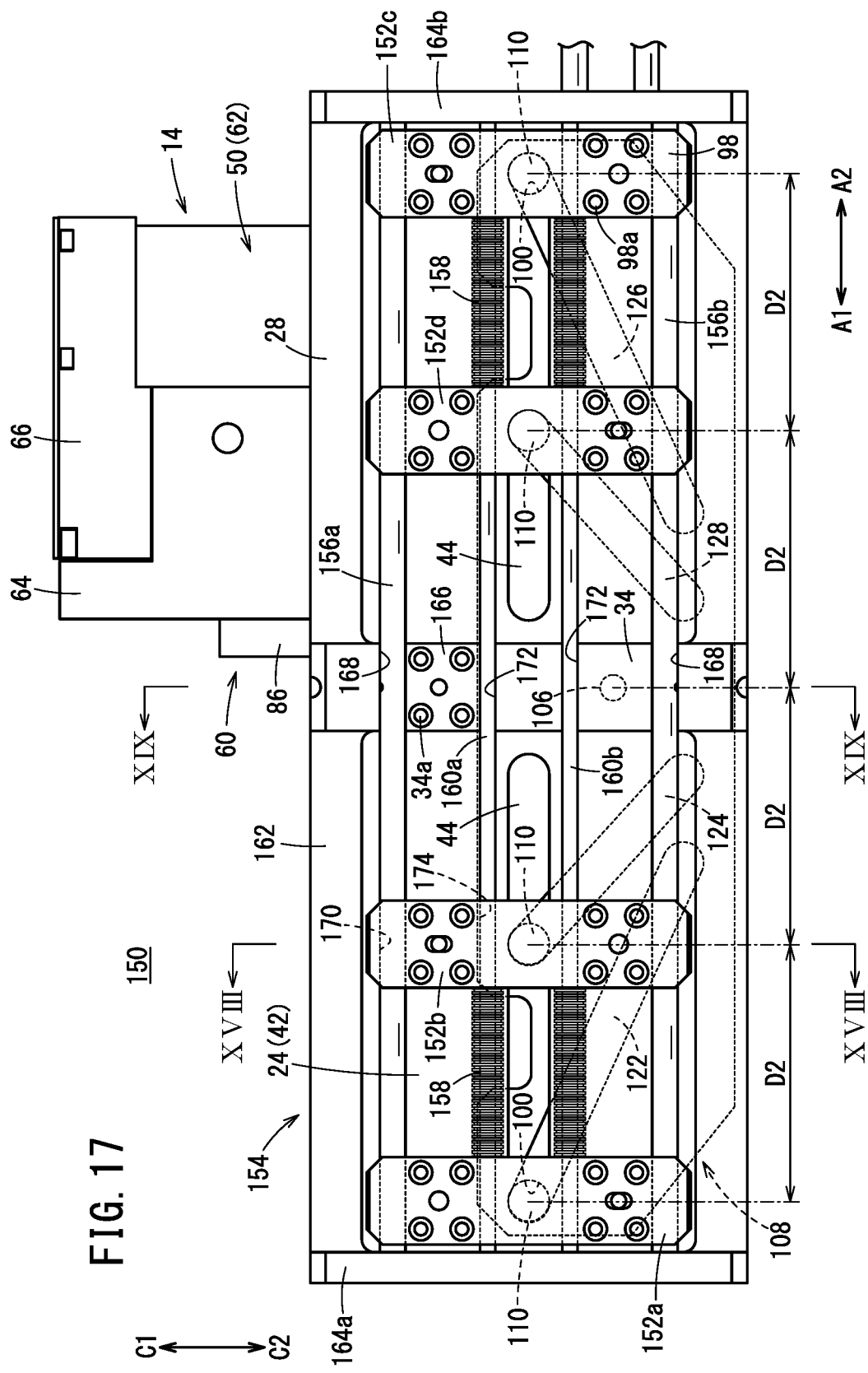
FIG. 17 is an overall front surface view of the variable pitch device shown in FIG. 15.
Figure 18:
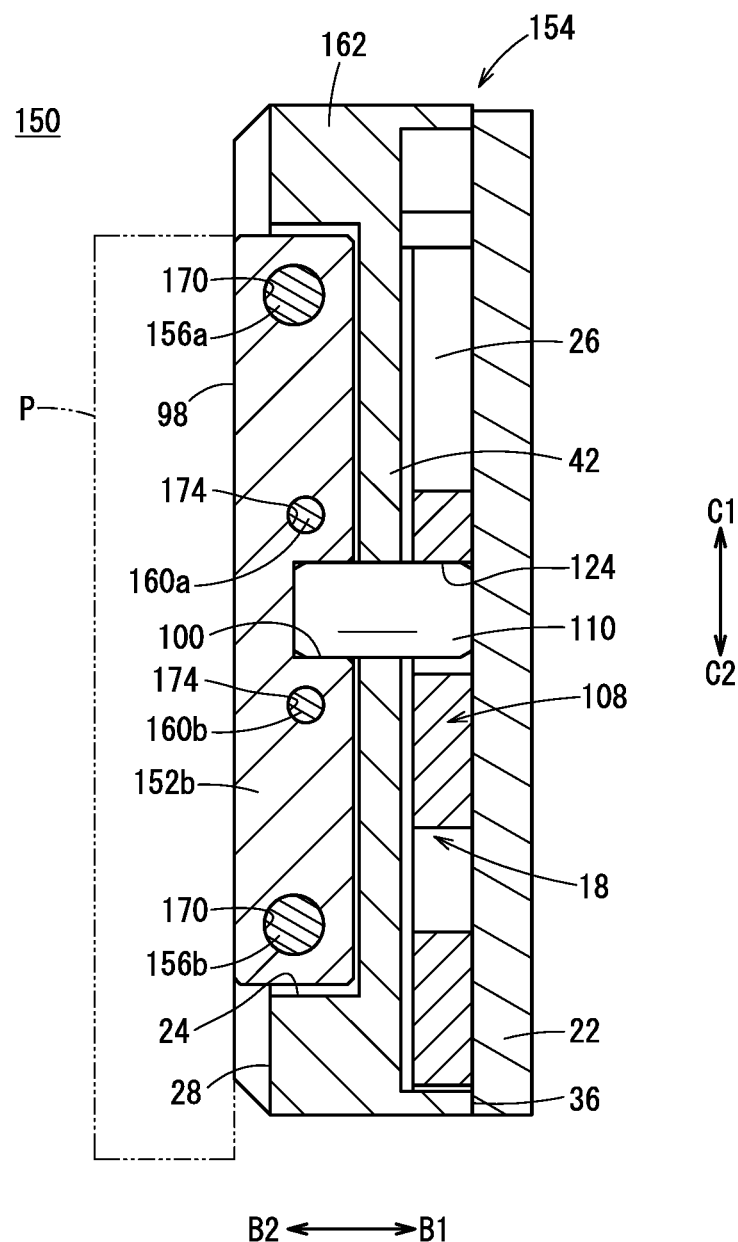
FIG. 18 is a cross-sectional view taken along line XVIII-XVIII of FIG. 17.
Figure 19:
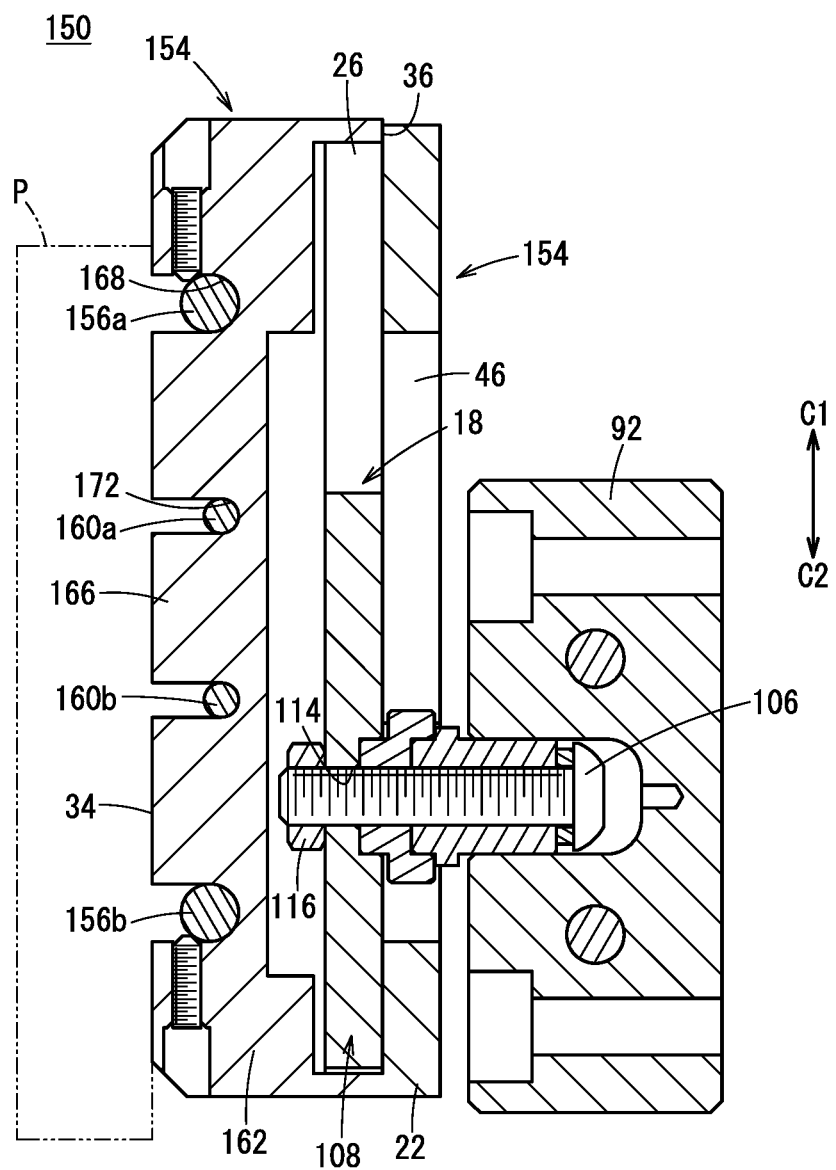
FIG. 19 is a cross-sectional view taken along line XIX-XIX of FIG. 17.

As shown in FIGS. 15 to 17, the variable pitch device 150 is equipped with end walls 164a and 164b provided respectively on both ends, in the longitudinal direction, of a main body portion 162 constituting the body 154, and the pair of guide rods 156a and 156b and the spring rods 160a and 160b are disposed, respectively, substantially in parallel with each other in the finger accommodating section 24.

The guide rods 156a and 156b are disposed on upper and lower sides in the finger accommodating section 24, and are disposed along the longitudinal direction (the direction of arrows A1 and A2) of the body 154, one end thereof being retained by the end wall 164a, and the other end thereof being retained by the end wall 164b.

Further, the guide rods 156a and 156b are inserted through first rod grooves 168, which are recessed with respect to the first mounting surface 34 of a fixed finger 166, and are inserted through first rod holes 170, which are formed in the plurality of movable fingers 152a to 152d. The first rod holes 170 are formed to penetrate along the direction of movement of the movable fingers 152a to 152d, and more specifically, along the longitudinal direction (the direction of arrows A1 and A2) of the body 154, and in the vicinity of the upper ends and the lower ends, respectively, of the movable fingers 152a to 152d.

In addition, when the plurality of movable fingers 152a to 152d move in the finger accommodating section 24 of the body 154, they are guided highly accurately in the longitudinal direction (the direction of arrows A1 and A2) along the pair of guide rods 156a and 156b that are inserted through the first rod holes 170.

The spring rods 160a and 160b are disposed in the finger accommodating section 24 closer to a central side in the height direction than the guide rods 156a and 156b, and are disposed along the longitudinal direction (the direction of arrows A1 and A2) of the body 154, one end thereof being retained by the end wall 164a, and the other end thereof being retained by the end wall 164b.

Further, the spring rods 160a and 160b are inserted through second rod grooves 172 of the fixed finger 166, which are recessed with respect to the first mounting surface 34, and are inserted through second rod holes 174, which are formed in the plurality of movable fingers 152a to 152d.

The second rod holes 174 are formed to penetrate along the direction of movement of the movable fingers 152a to 152d, and more specifically, along the longitudinal direction (the direction of arrows A1 and A2) of the body 154, at positions closer to the side of the pin holes 100 than the first rod holes 170, and at symmetrical positions with respect to the heightwise center of the movable fingers 152a to 152d having the pin holes 100. Further, the second rod holes 174 are formed coaxially with the spring holes 104 into which the springs 158 are inserted.

In addition, between the two adjacent movable fingers 152a and 152b (152c and 152d), the springs 158 are inserted onto outer circumferential sides of the spring rods 160a and 160b, and both ends of the springs 158 are inserted respectively into the spring holes 104 (see FIG. 16). More specifically, the spring rods 160a and 160b are used as a guide unit that retains, in the longitudinal direction of the body 154, the springs 158 interposed between the movable fingers 152a and 152b (152c and 152d).

The variable pitch device 150 according to the second embodiment of the present invention is constructed basically as described above. Next, operations and advantages thereof will be described. Moreover, concerning operations that are the same as those of the variable pitch device 10 according to the first embodiment, detailed description of such features will be omitted.

Figure 20:
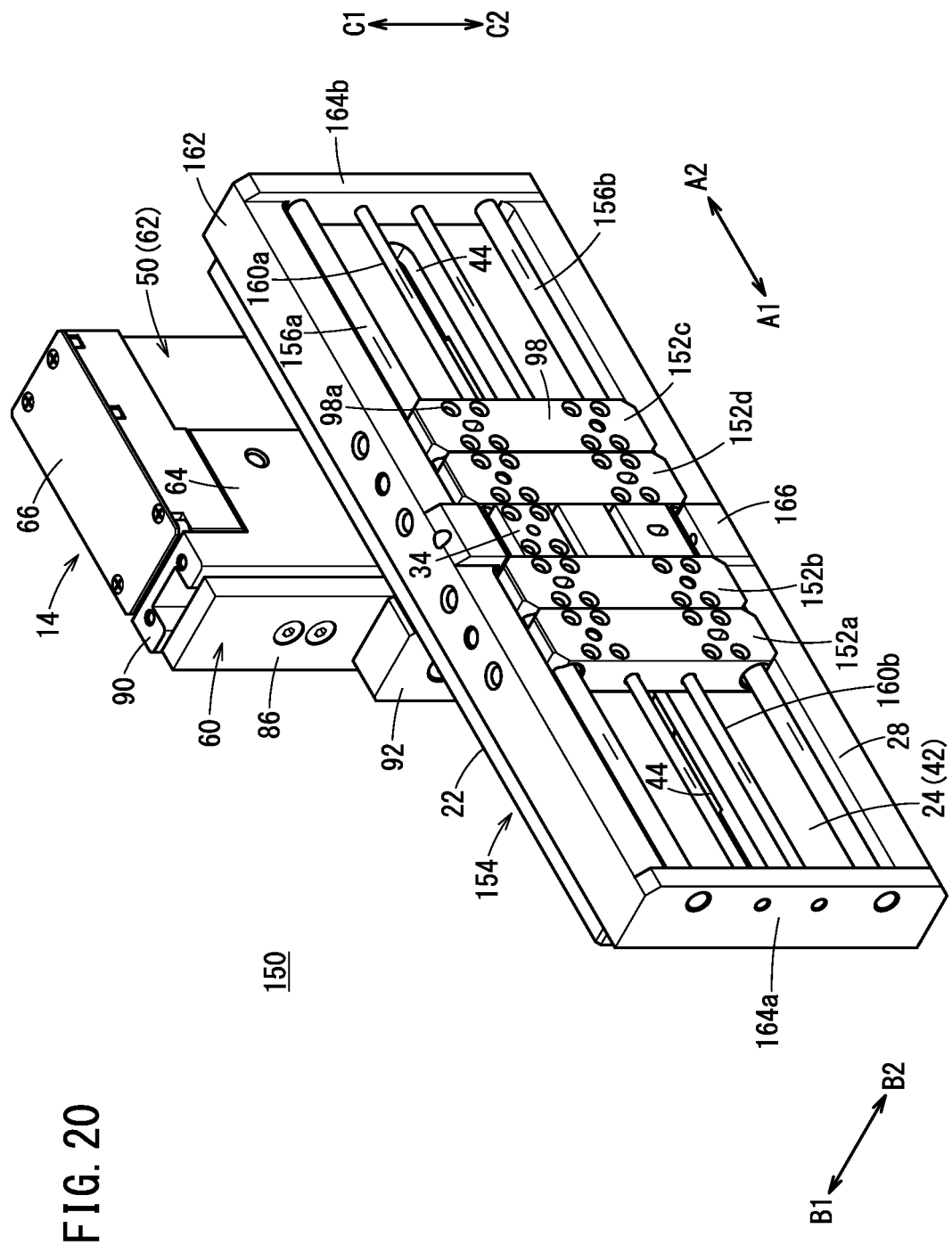
FIG. 20 is an external perspective view showing a closed state in which the movable fingers of the variable pitch device shown in FIG. 15 approach one another.
Figure 21:
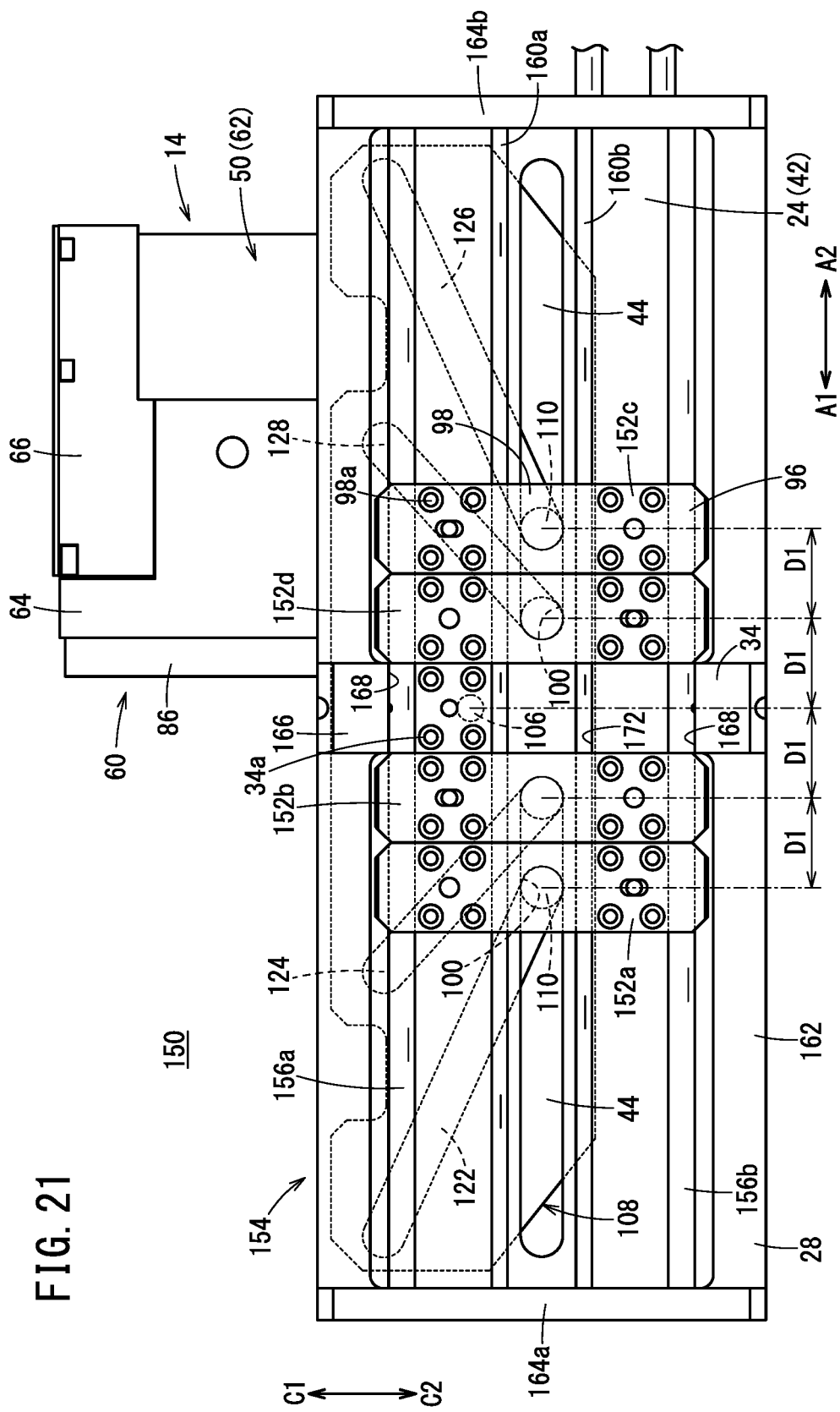
FIG. 21 is an overall front surface view of the variable pitch device shown in FIG. 20.

First, in the closed state shown in FIGS. 20 and 21, the cam plate 108 is positioned upwardly (in the direction of the arrow C1) inside the body 154, and against the elastic force of the springs 158 provided between the movable fingers 152a to 152d, the four movable fingers 152a to 152d are in a state of being moved and placed in close proximity to the side of the fixed finger 166, which is located in the center in the longitudinal direction of the body 154. Moreover, the aforementioned springs 158 are accommodated respectively inside the spring holes 104 in the movable fingers 152a to 152d.

Next, the cam plate 108 is lowered inside the body 154 under a driving action of the drive unit 14, whereby the finger pins 110 start to move toward both end sides (in the directions of arrows A1 and A2) in the longitudinal direction of the body 154 by way of the first to fourth cam grooves 122, 124, 126, and 128, and accordingly, as shown in FIGS. 15 and 17, the respective movable fingers 152a to 152d move toward both end sides in the longitudinal direction so as to be separated from the fixed finger 166.

At this time, the movable fingers 152a to 152d are guided smoothly and with high accuracy along the longitudinal direction of the body 154 by the pair of guide rods 156a and 156b. Further, by the springs 158 provided between the adjacent movable fingers 152a and 152b (152c and 152d), rattling is prevented from occurring between the movable fingers 152a and 152b (152c and 152d), and since the springs 158 are arranged symmetrically with respect to the heightwise center of the movable fingers 152a to 152d, the adjacent movable fingers 152a to 152d are maintained in a substantially parallel state at all times.

In addition, as shown in FIG. 17, the cam plate 108 moves to the lower end inside the accommodation chamber 26 under the driving action of the drive unit 14, whereby in the longitudinal direction of the body 154, the respective movable fingers 152a to 152d and the fixed finger 166 are arranged respectively at an equal interval separation D2 in the open state.

As described above, in the second embodiment, the cam plate 108 which is capable of moving in the vertical direction (in the direction of arrows C1 and C2) under the driving action of the drive unit 14 is provided in the interior of the body 154, and the first to fourth cam grooves 122, 124, 126, and 128 that are inclined at predetermined angles with respect to the direction of movement thereof (in the vertical direction) are included in the cam plate 108. Further, the four finger pins 110, which are inserted through the guide holes 44 that extend in the longitudinal direction (the direction of arrows A1 and A2) of the body 154, are inserted respectively through the first to fourth cam grooves 122, 124, 126, and 128. In addition, the finger pins 110 are connected to the four movable fingers 152a to 152d which are disposed so as to be capable of moving in the longitudinal direction along the finger accommodating section 24 of the body 154.

As a result, in the variable pitch device 150, with a simple configuration in which the cam plate 108 and the finger pins 110 that transmit the driving force from the drive unit 14 to the movable fingers 152a to 152d are provided between the plurality of movable fingers 152a to 152d and the drive unit 14, it becomes possible to make the size of the device smaller in the thickness direction (the direction of arrows B1 and B2), and to reduce manufacturing costs, in comparison with a conventional variable pitch device in which the driving force of the motor is transmitted to slide blocks via a plate cam and two levers.

Further, in the finger accommodating section 24 of the body 154, the pair of guide rods 156a and 156b which extend along the longitudinal direction are provided, and the guide rods 156a and 156b are inserted through the first rod holes 170 of the movable fingers 152a to 152d. Consequently, when the movable fingers 152a to 152d move along the longitudinal direction (the direction of arrows A1 and A2) of the body 154 under the driving action of the drive unit 14, they can be guided in the longitudinal direction by the guide rods 156a and 156b, whereby it becomes possible for the plurality of movable fingers 152a to 152d to be operated smoothly and with high accuracy.

Furthermore, in the finger accommodating section 24 of the body 154, by providing the spring rods 160a and 160b for guiding the springs 158 along the longitudinal direction, the elastic force of the springs 158 can be applied in the longitudinal direction with respect to the movable fingers 152a to 152d. Therefore, the adjacent movable fingers 152a to 152d can be maintained in parallel at all times, and the distance between the movable fingers 152a to 152d can be managed in a highly accurate manner.

Next, a variable pitch device 200 according to a third embodiment is shown in FIGS. 22 to 31. The same reference numerals are used to indicate the same constituent elements as those of the above-described variable pitch device 150 according to the second embodiment, and detailed description of such features is omitted.

The variable pitch device 200 according to the third embodiment differs from the variable pitch device 150 according to the second embodiment, in that a drive unit 202 is arranged substantially in parallel along the longitudinal direction (the direction of arrows A1 and A2) of a body 204, and a sub-cam plate (conversion member) 208 connected to the drive unit 202 and constituting a driving force transmission mechanism 206 is provided.

As shown in FIGS. 22 to 27, the variable pitch device 200 includes the body 204, the drive unit 202 mounted on a rear surface of the body 204, a plurality of movable fingers 152a to 152d which are disposed so as to be capable of moving along the longitudinal direction (the direction of arrows A1 and A2) of the body 204, and the driving force transmission mechanism 206 that transmits the driving force of the drive unit 202 to the movable fingers 152a to 152d.

The body 204 is formed in an elongate shape along the longitudinal direction (the direction of arrows A1 and A2), and is equipped with the main body portion 162 that retains the movable fingers 152a to 152d in a movable manner, the cover member 22 that is mounted on a rear side (in the direction of the arrow B1) of the main body portion 162, and a box-shaped casing 210 that covers the rear side of the main body portion 162 together with the cover member 22.

As shown in FIGS. 23, 24, 26, and 27, the drive unit 202 is made up from an electric actuator that can be driven under an energizing action, and the housing 50 is connected to the rear surface of the cover member 22 so as to extend along the longitudinal direction (the direction of arrows A1 and A2) of the body 204. In addition, in the drive unit 202, the rod 58 moves forward and rearward along the longitudinal direction of the body 204 under the energizing action.

Moreover, the main structure of the drive unit 202 is substantially the same as that of the drive unit 14 used in the variable pitch devices 10 and 150 according to the first and second embodiments, and one end side thereof on which the pulley cover 66 is provided is fixed so as to be on one side in the longitudinal direction (in the direction of the arrow A1) of the body 204.

Figure 23:
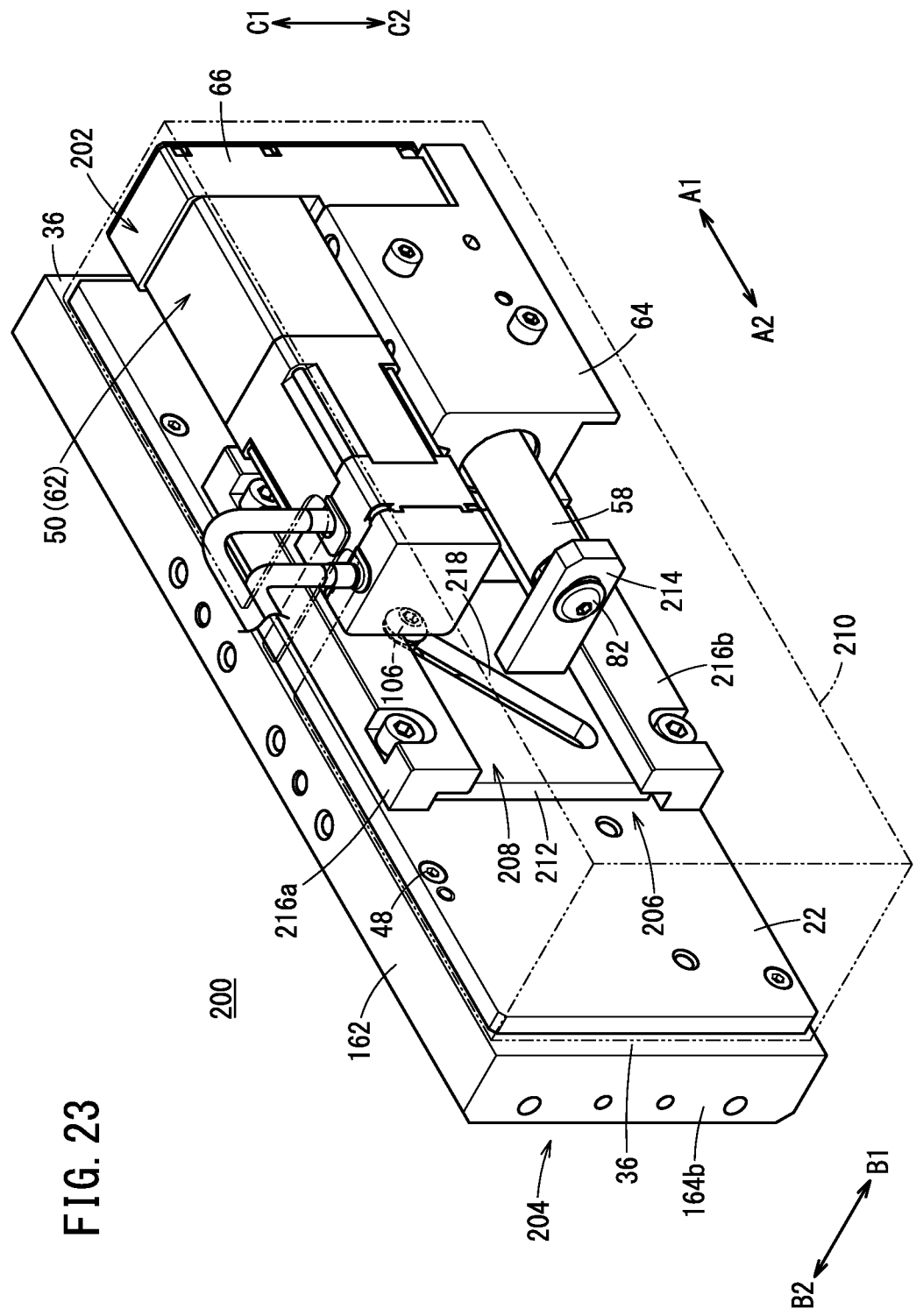
FIG. 23 is a partially omitted external perspective view of the variable pitch device of FIG. 22 as viewed from another (rear side) direction.
Figure 24:
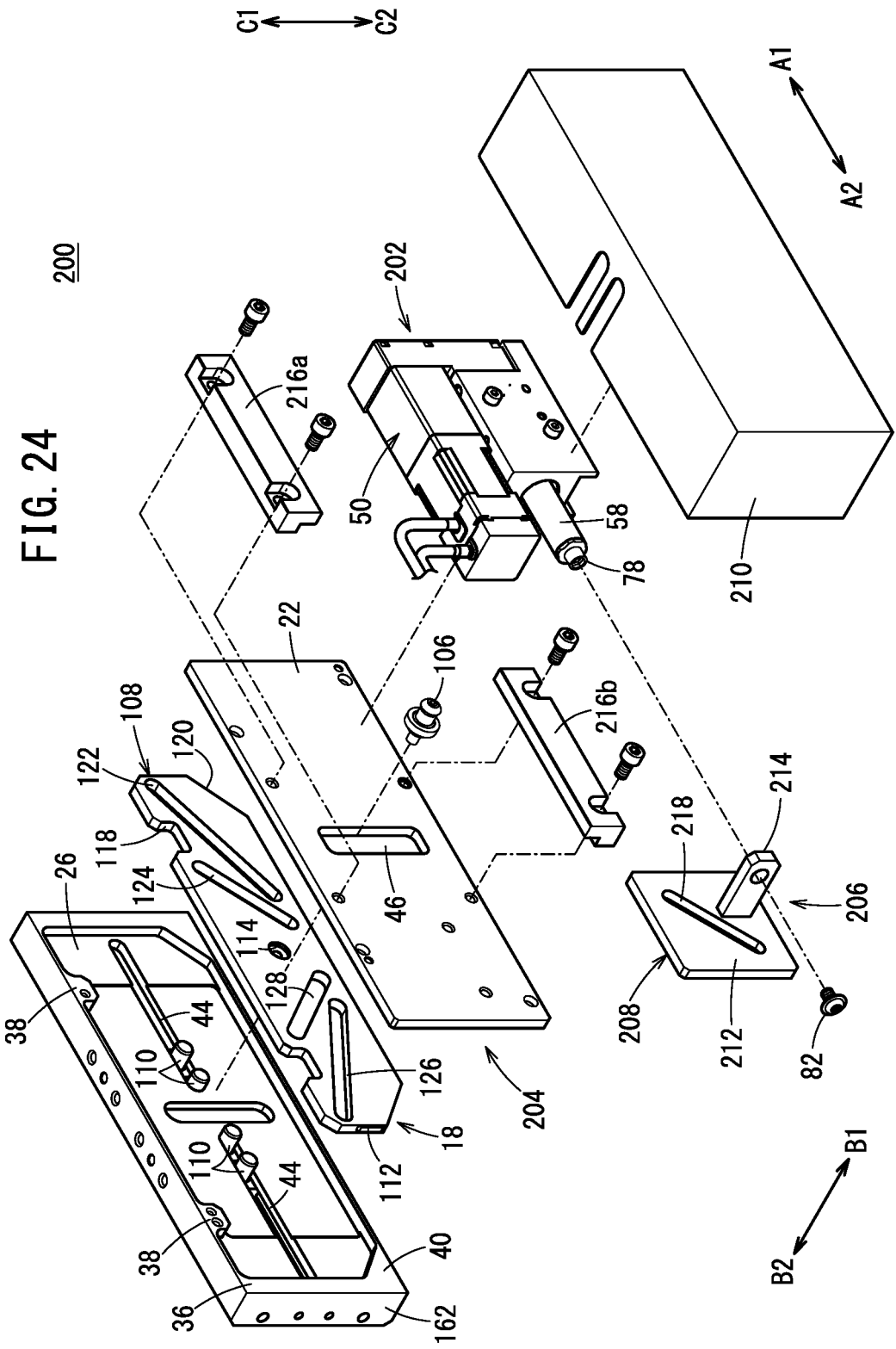
FIG. 24 is an exploded perspective view of the variable pitch device shown in FIG. 23.
Figure 26:
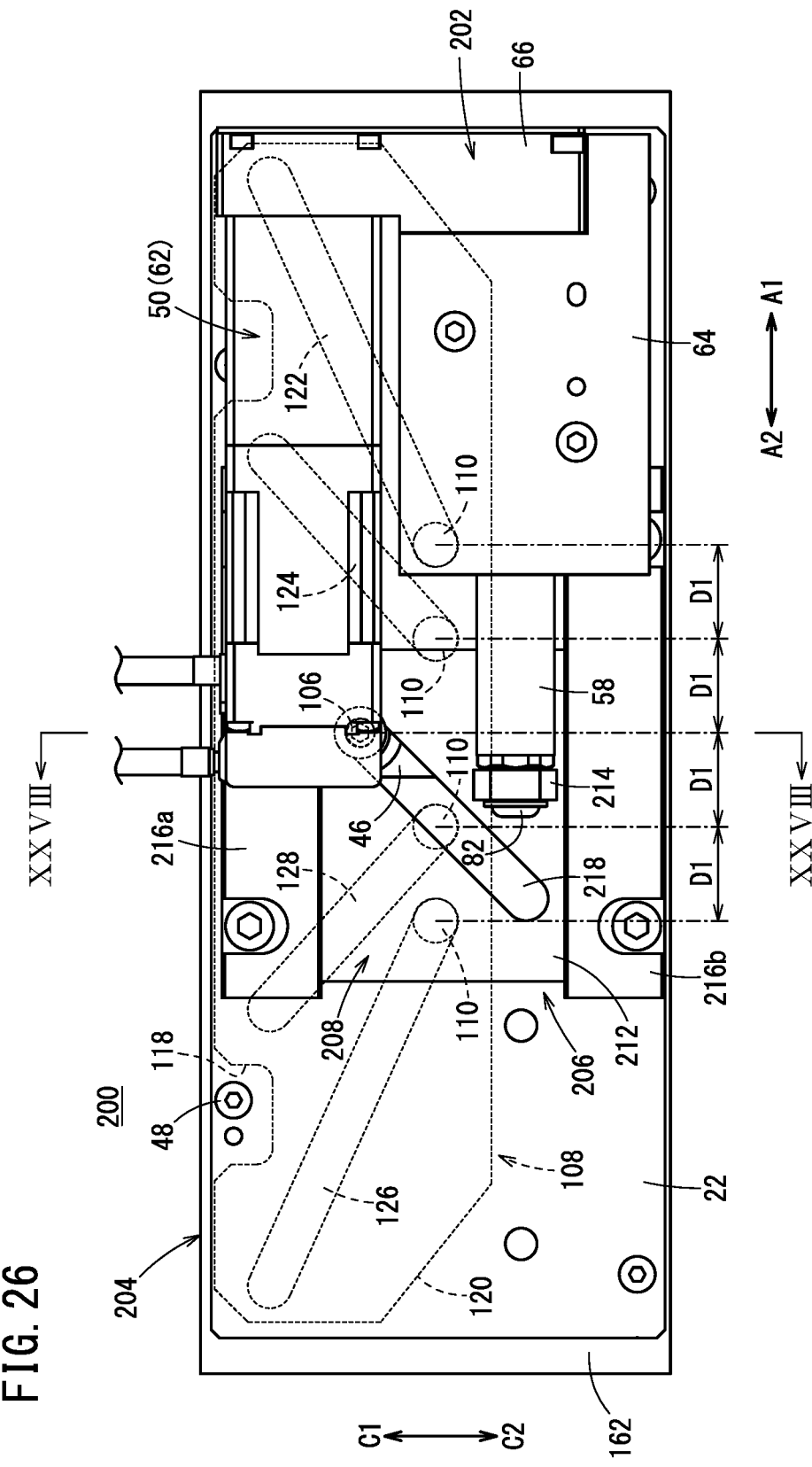
FIG. 26 is an overall rear surface view of the variable pitch device shown in FIG. 22.

Further, as shown in FIGS. 23 and 26, the sub-cam plate 208 that constitutes the driving force transmission mechanism 206 is movably provided on the rear side of the cover member 22. The sub-cam plate 208 includes a base portion 212 formed in a rectangular plate-like shape, and a connecting piece 214 that is erected from the base portion 212. In addition, the sub-cam plate 208 is disposed in a manner so that the base portion 212 is in contact with the rear surface of the cover member 22, and the upper end and the lower end thereof are retained movably in the longitudinal direction (the direction of arrows A1 and A2) by a pair of guide pieces 216a and 216b which are provided in the vicinity of the upper end and the lower end of the cover member 22.

A sub-cam groove (second cam groove) 218 is formed in the base portion 212 between the upper end and the lower end which are retained by the pair of guide pieces 216a and 216b. The sub-cam groove 218 is formed in an inclined manner at a predetermined angle with respect to the direction of movement (the direction of arrows A1 and A2) of the sub-cam plate 208 such that, with respect to the central lower end on which the connecting piece 214 is provided, the upper end thereof is formed on the side of the drive unit 202 (in the direction of the arrow A1), and the lower end thereof is formed on the opposite side (in the direction of the arrow A2) from the drive unit 202. In addition, the connecting bolt 106 which is connected to the cam plate 108 is movably inserted through the sub-cam groove 218.

Figure 27:
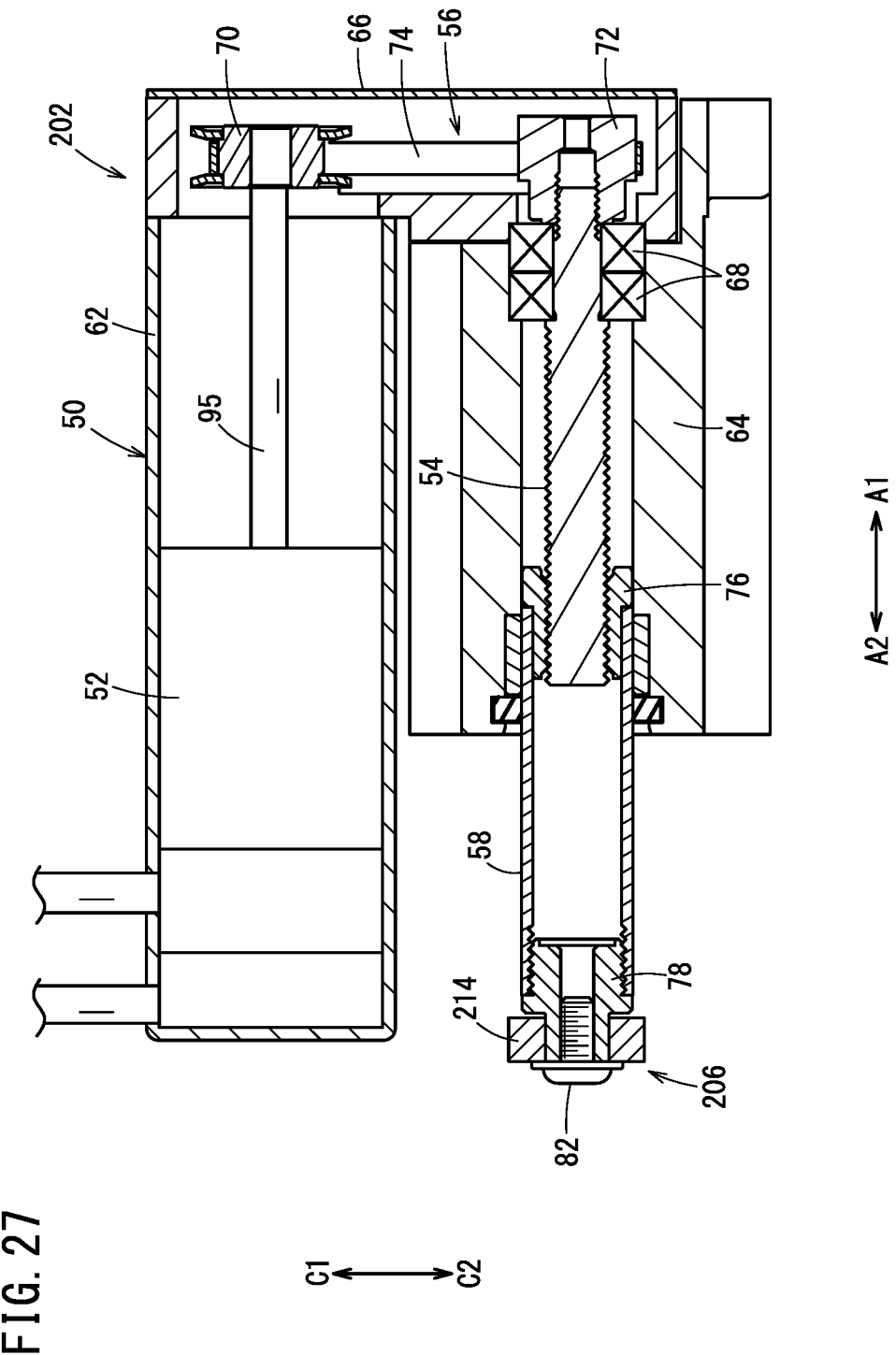
FIG. 27 is an overall cross-sectional view showing a drive unit that constitutes the variable pitch device shown in FIG. 23.

The connecting piece 214 protrudes in a direction away from the cover member 22 (in the direction of the arrow B1 in FIGS. 23 and 28) substantially perpendicular to the base portion 212, and the other end of the rod 58 in the drive unit 202 is connected thereto via the socket 78 and the fixing bolt 82 (see FIG. 27).

In addition, by the rod 58 moving forward and rearward in the axial direction under a driving action of the drive unit 202, the sub-cam plate 208 moves along the longitudinal direction (in the direction of arrows A1 and A2) of the body 204 in a state of being retained by the pair of guide pieces 216a and 216b.

Further, the drive unit 202 and the sub-cam plate 208 described above are covered by the casing 210 which is mounted on the rear side of the main body portion 162 (see FIG. 23).

The variable pitch device 200 according to the third embodiment of the present invention is constructed basically as described above. Next, operations and advantages thereof will be described.

Figure 22:
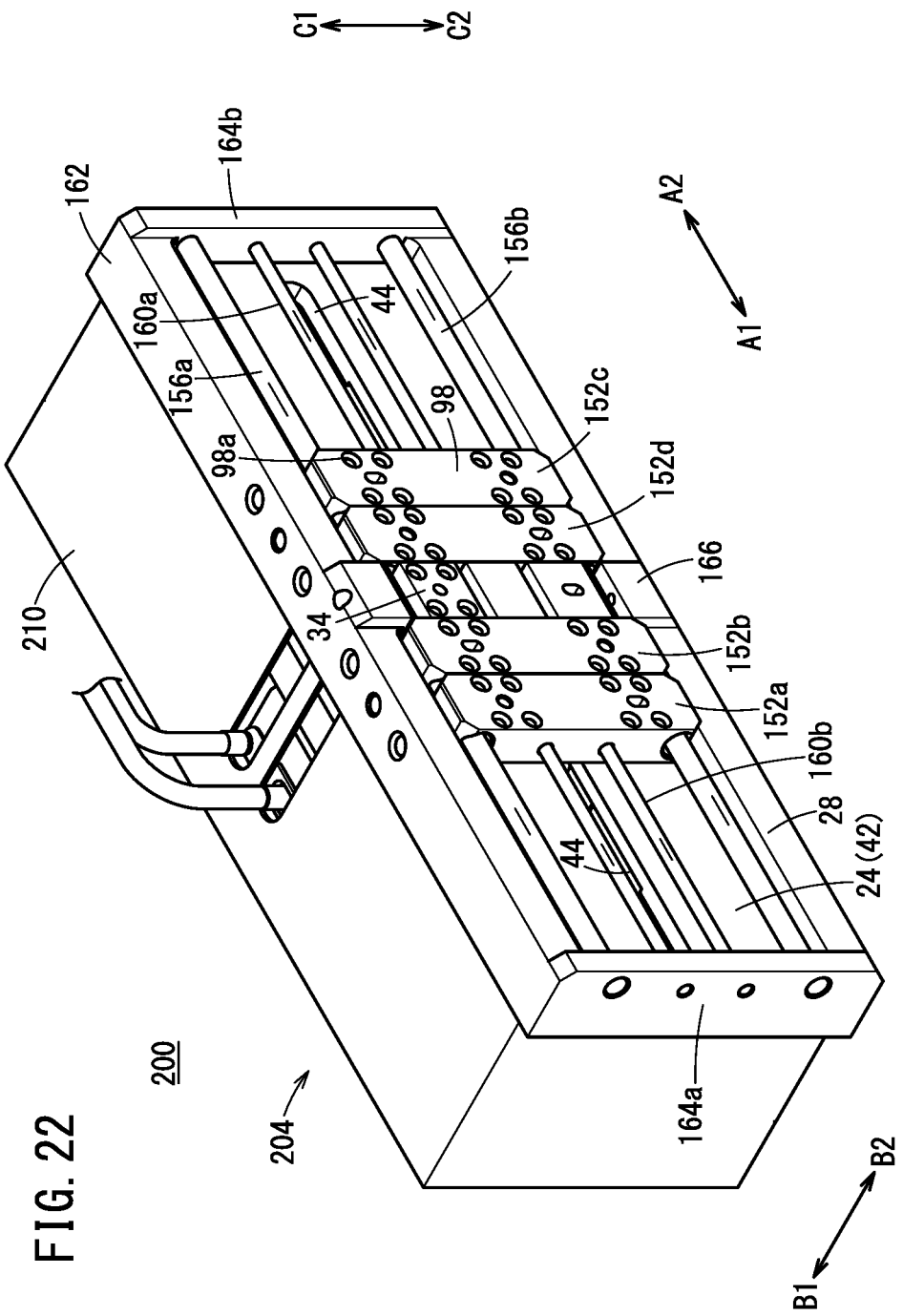
FIG. 22 is an external perspective view of a variable pitch device according to a third embodiment of the present invention.
Figure 25:
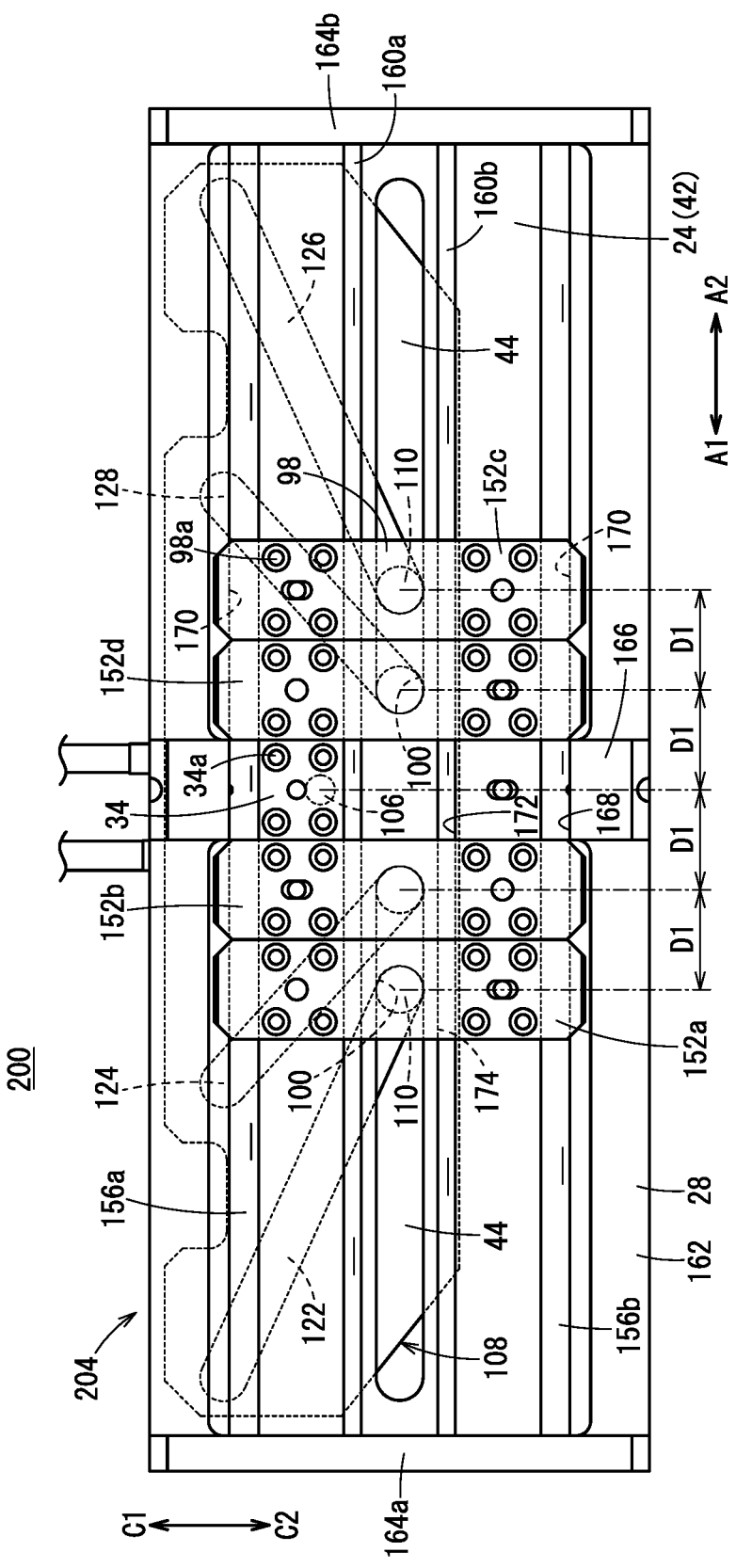
FIG. 25 is an overall front surface view of the variable pitch device shown in FIG. 22.
Figure 28:
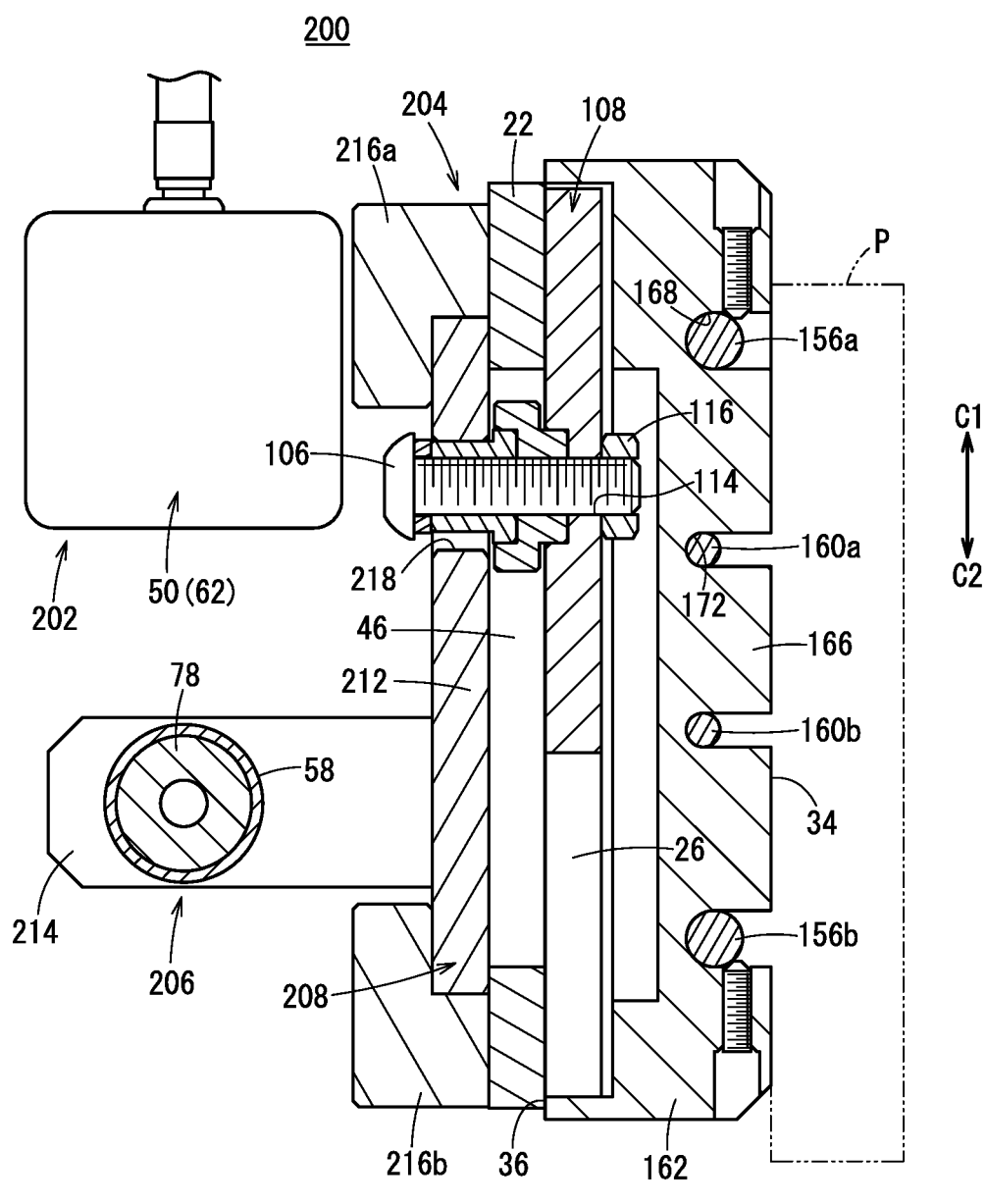
FIG. 28 is a cross-sectional view taken along line XXVIII-XXVIII of FIG. 26.

First, in the closed state shown in FIGS. 22 and 25, in the drive unit 202, the other end of the rod 58 is pushed out to the other side in the longitudinal direction (in the direction of the arrow A2), and along therewith, the sub-cam plate 208 is moved to the other side in the longitudinal direction as shown in FIGS. 23 and 26, and the connecting bolt 106 is positioned at the upper end in the sub-cam groove 218 (see FIG. 28). Therefore, the cam plate 108 connected to the connecting bolt 106 is positioned upwardly (in the direction of the arrow C1) inside the body 204, and against the elastic force of the springs 158, the four movable fingers 152a to 152d are in a state of being moved and placed in close proximity to the side of the fixed finger 166, which is located in the center in the longitudinal direction of the body 204.

In the aforementioned initial state, by inputting a control signal from a non-illustrated controller to the drive unit 202, the rod 58 moves in the axial direction (in the direction of the arrow A1) and is drawn into the housing 50 under a rotating action of the motor 52. In addition, accompanying movement of the rod 58, the sub-cam plate 208 moves to one side in the longitudinal direction (in the direction of the arrow A1) of the body 204 under a guiding action of the guide pieces 216a and 216b.

By movement of the sub-cam plate 208, the connecting bolt 106, which is inserted through the sub-cam groove 218, is lowered, and the cam plate 108 connected thereto is lowered inside the accommodation chamber 26. In addition, as shown in FIGS. 29 and 30, accompanying lowering of the cam plate 108, the respective finger pins 110 which are inserted into the guide holes 44 move respectively toward both end sides in the longitudinal direction (the direction of arrows A1 and A2), and separate away from each other in the longitudinal direction by way of the first to fourth cam grooves 122, 124, 126, and 128, respectively.

Accompanying movement of the finger pins 110, in a similar manner, the movable fingers 152a to 152d connected to the finger pins 110 move toward both end sides in the longitudinal direction so as to separate away from the fixed finger 166 in the finger accommodating section 24 of the body 204.

Figure 29:
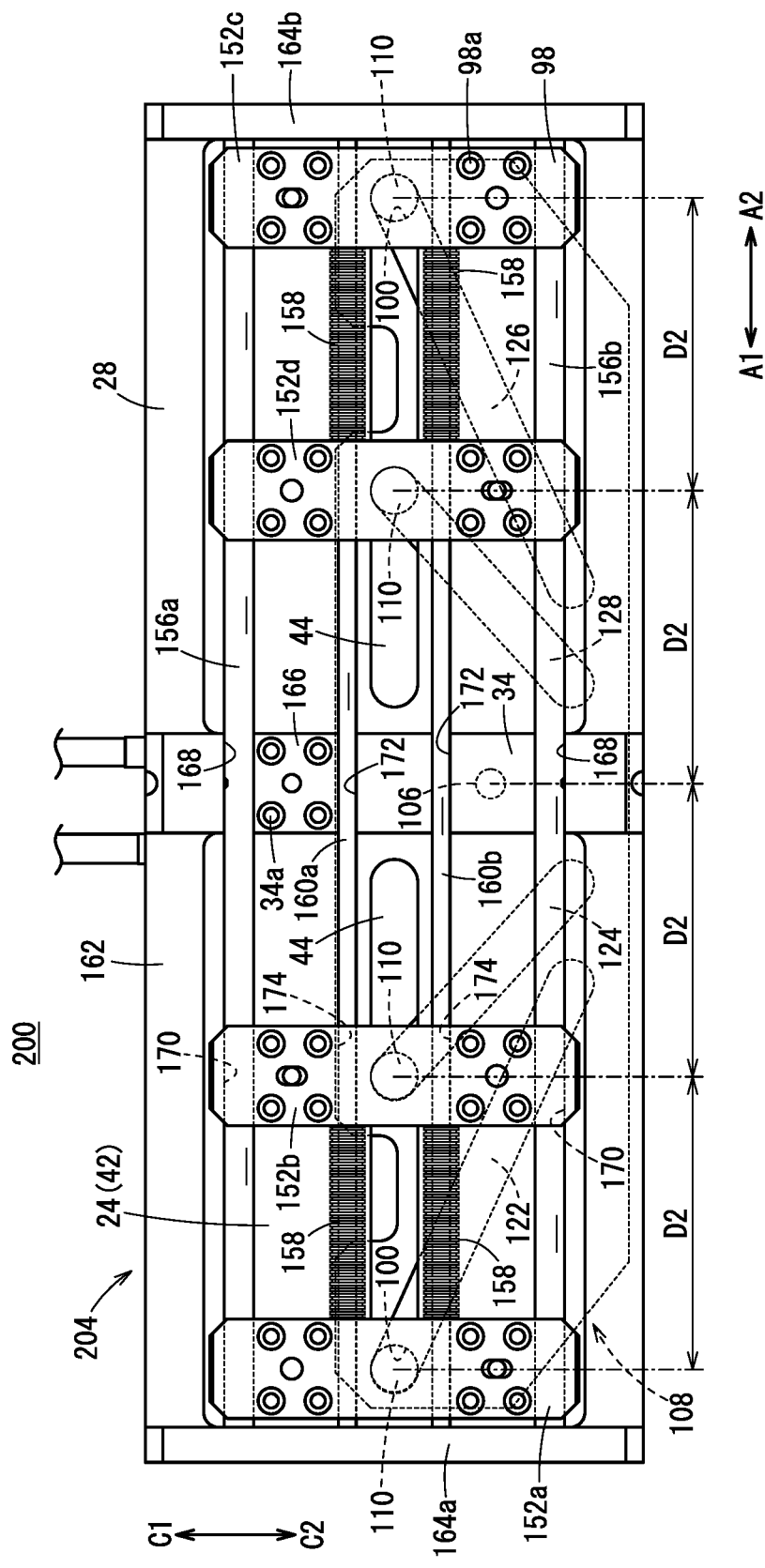
FIG. 29 is an overall front surface view showing an open state in which movable fingers are opened in the variable pitch device shown in FIG. 25.
Figure 30:
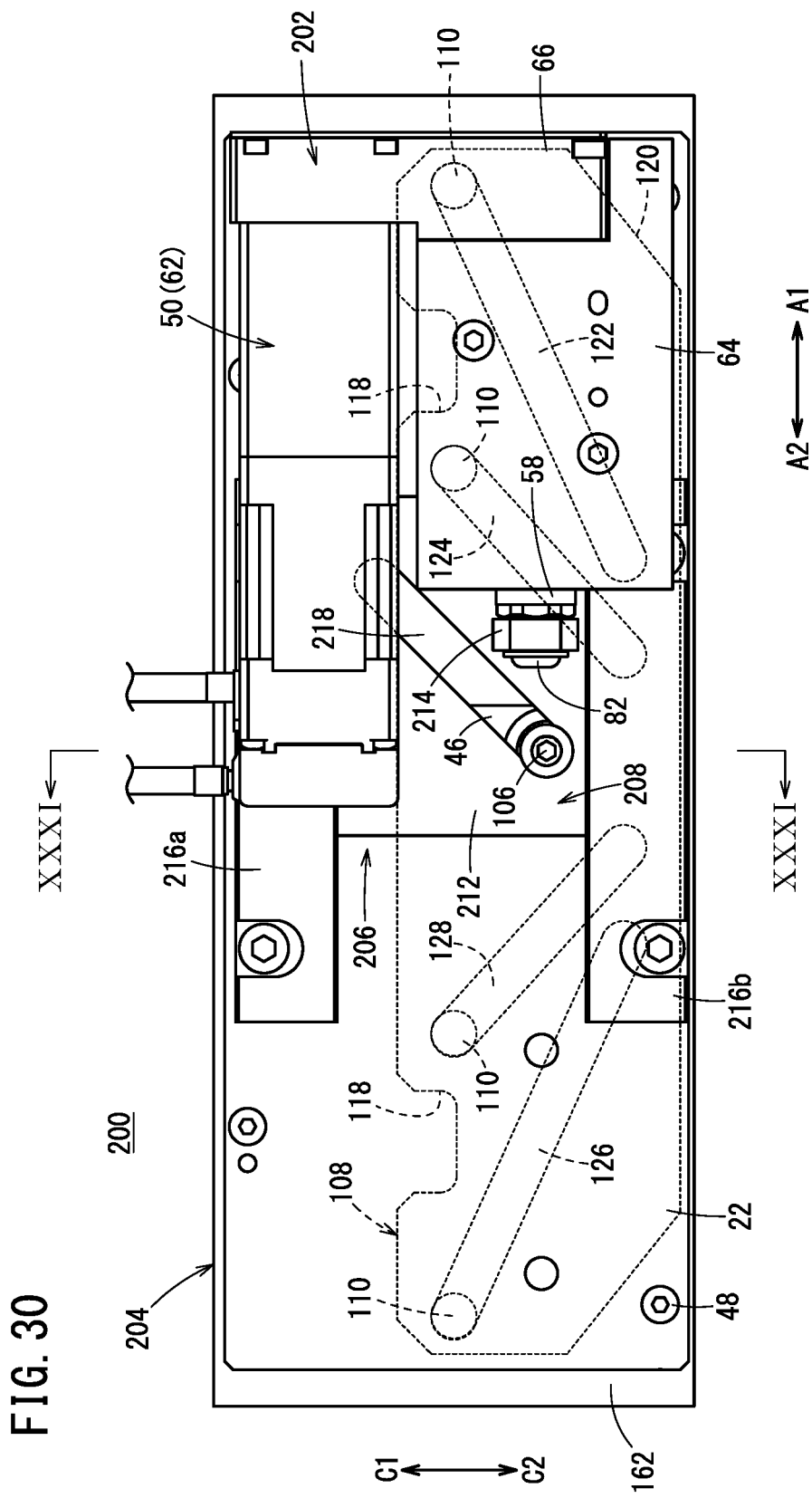
FIG. 30 is an overall rear surface view of the variable pitch device shown in FIG. 29.
Figure 31:
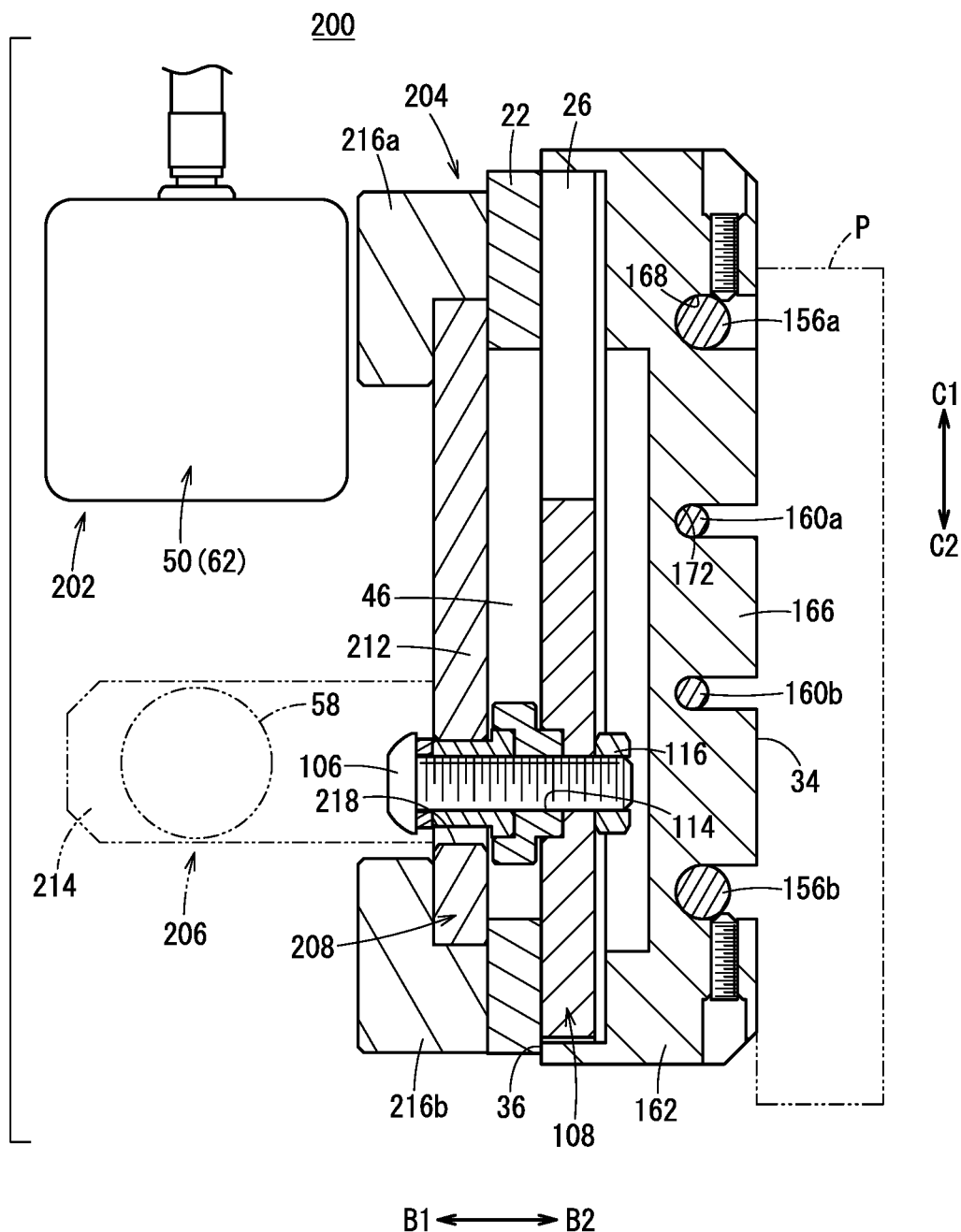
FIG. 31 is a cross-sectional view taken along line XXXI-XXXI of FIG. 30.
Figure 32:
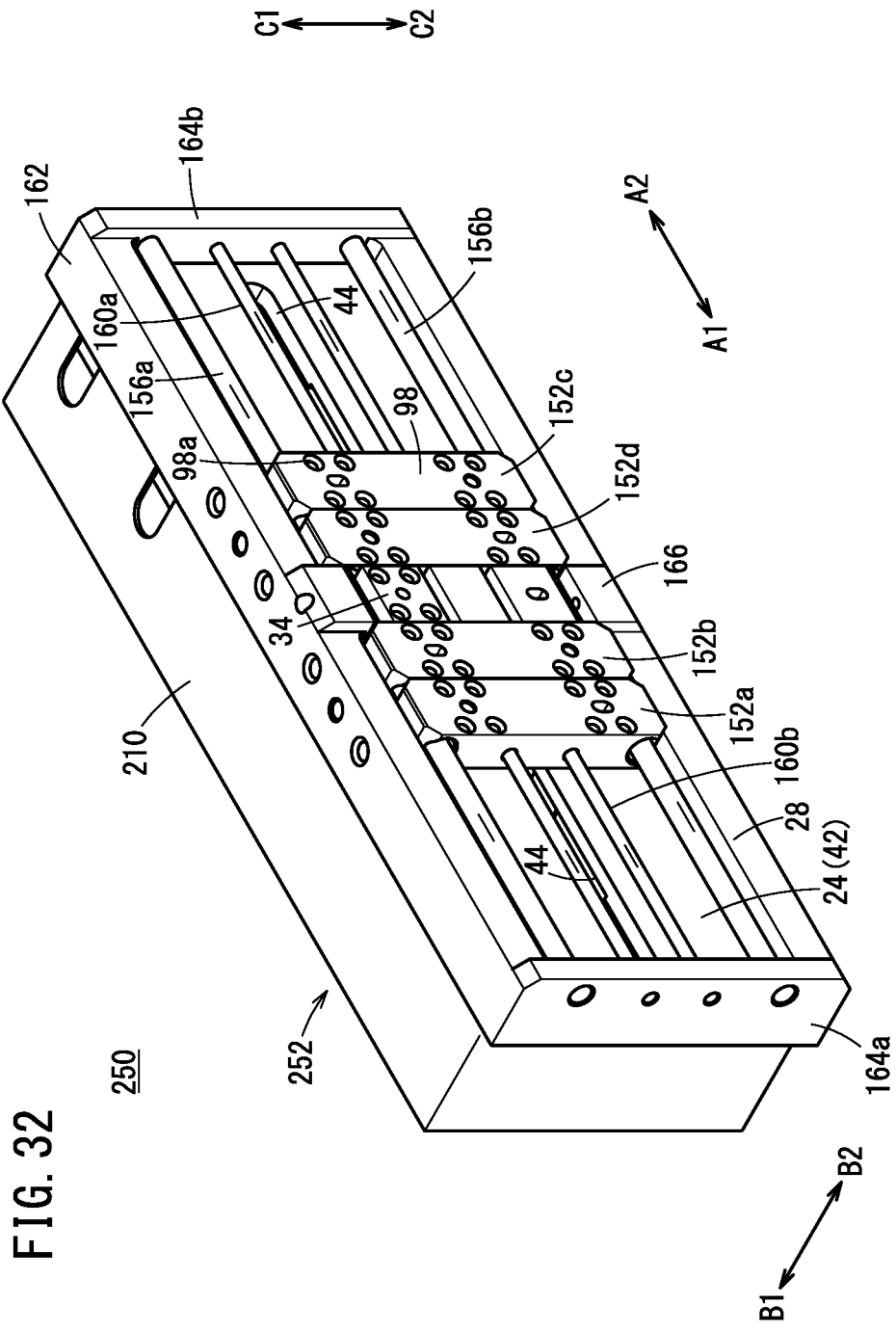
FIG. 32 is an external perspective view of a variable pitch device according to a fourth embodiment of the present invention.
Figure 33:
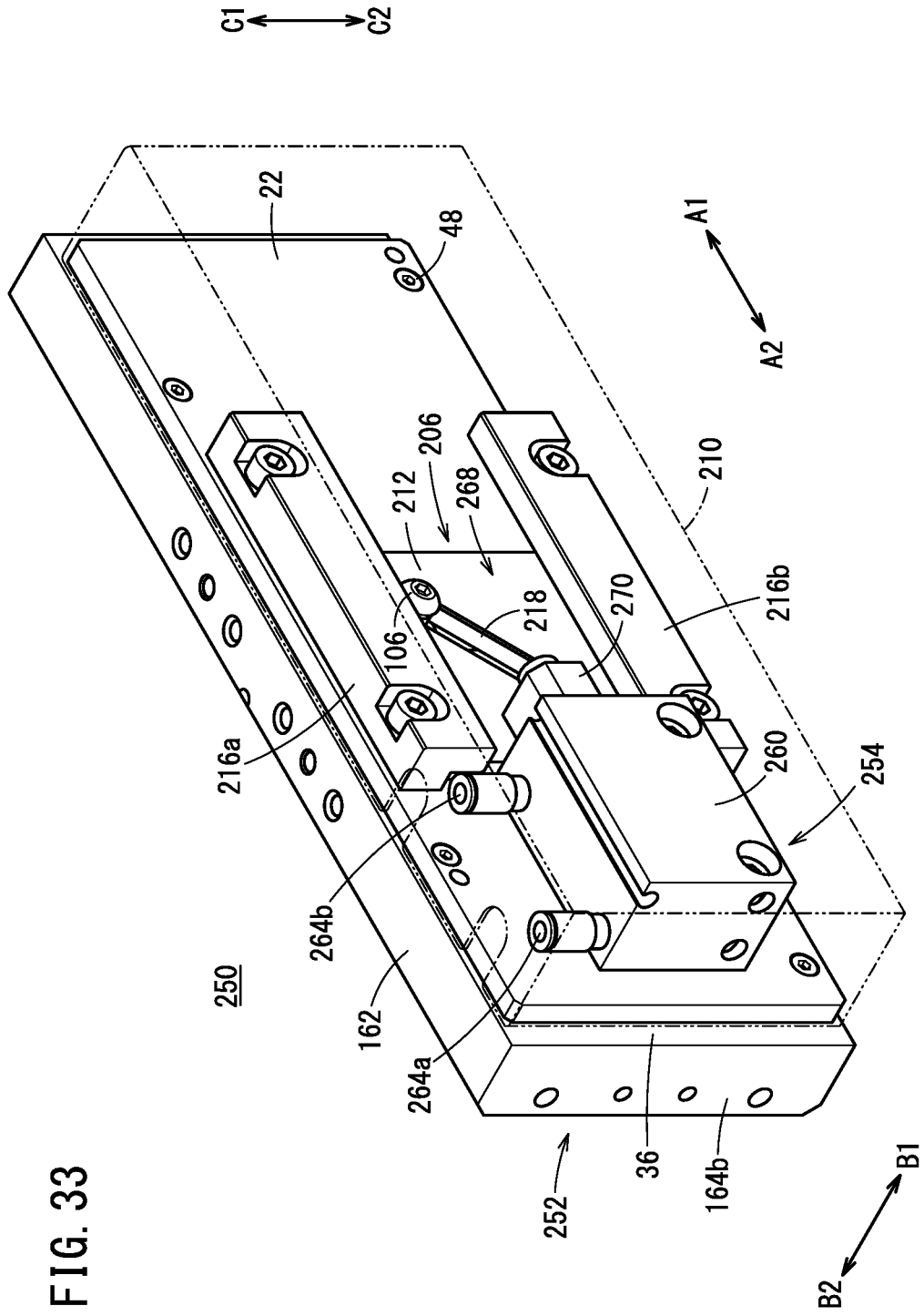
FIG. 33 is a partially omitted external perspective view of the variable pitch device of FIG. 32 as viewed from another (rear side) direction.
Figure 34:
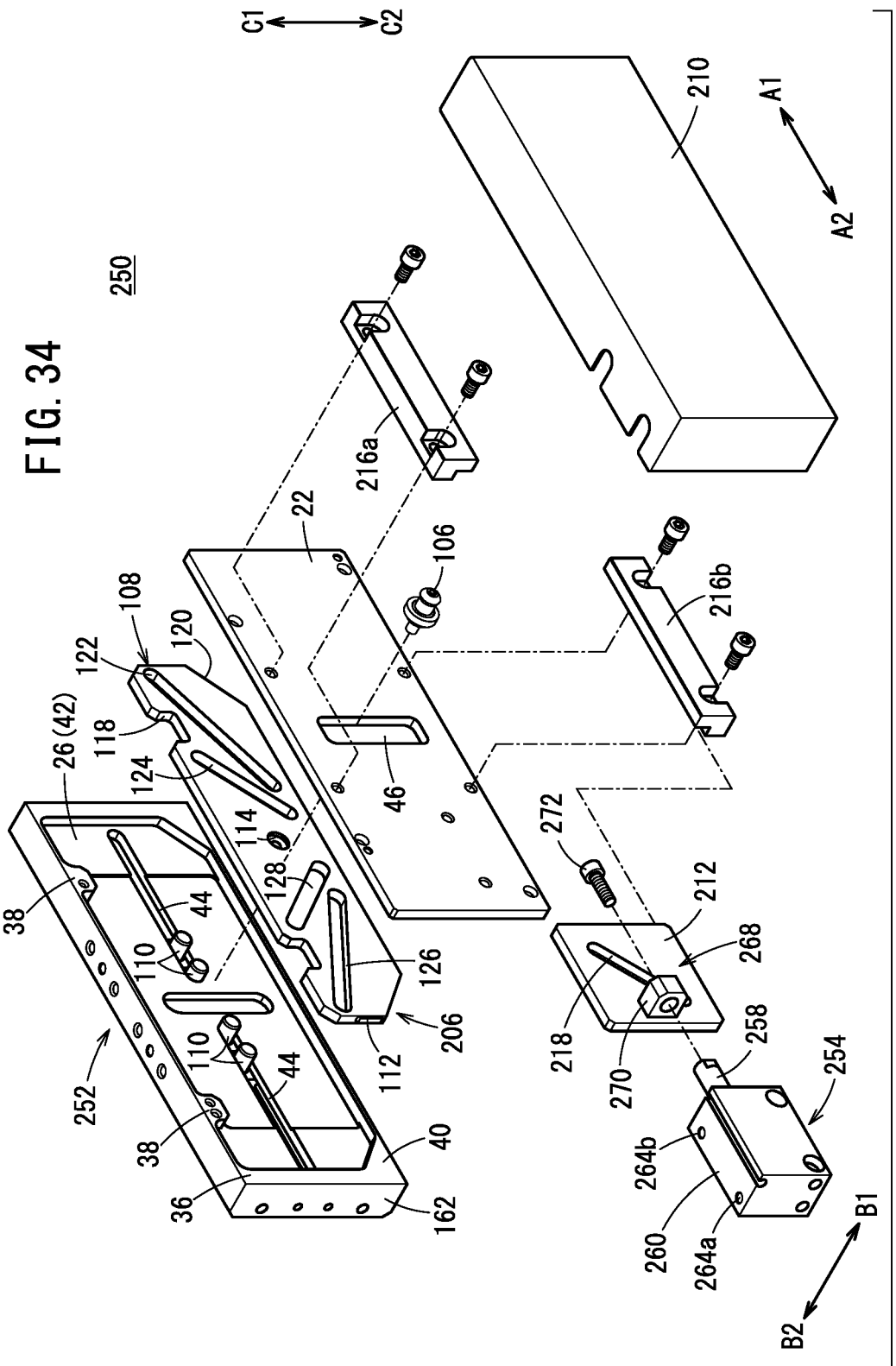
FIG. 34 is an exploded perspective view of the variable pitch device shown in FIG. 33.

Finally, as shown in FIGS. 29 to 31, the cam plate 108 moves to the lower end inside the accommodation chamber 26 under the driving action of the drive unit 202, whereby in the longitudinal direction of the body 204, the respective movable fingers 152a to 152d and the fixed finger 166 are arranged at an equal interval separation D2 (see FIG. 39) in the open state. Moreover, the above-described variable pitch device 200 is configured in a manner so that the direction of movement of the rod 58 in the drive unit 202 (the output direction, the direction of arrows A1 and A2) and the direction of movement of the movable fingers 152a to 152d (the direction of arrows A1 and A2) are in parallel with each other.

More specifically, the aforementioned sub-cam plate 208 functions as an output conversion unit for converting the output along the longitudinal direction from the rod 58 of the drive unit 202 into the vertical direction (the direction of arrows C1 and C2), and transmitting the converted output to the cam plate 108.

As described above, in the third embodiment, the cam plate 108 which is capable of moving in the vertical direction (in the direction of arrows C1 and C2) via the sub-cam plate 208 under the driving action of the drive unit 202 is provided, and the first to fourth cam grooves 122, 124, 126, and 128 that are inclined at predetermined angles with respect to the direction of movement thereof (in the vertical direction) are included in the cam plate 108. Further, the four finger pins 110, which are inserted through the guide holes 44 that extend in the longitudinal direction (the direction of arrows A1 and A2) of the body 204, are inserted respectively through the first to fourth cam grooves 122, 124, 126, and 128. In addition, the finger pins 110 are connected to the four movable fingers 152a to 152d which are disposed so as to be capable of moving in the longitudinal direction along the finger accommodating section 24 of the body 204.

As a result, in the variable pitch device 200, with a simple configuration in which the cam plate 108, the sub-cam plate 208, and the finger pins 110 that transmit the driving force from the drive unit 202 to the movable fingers 152a to 152d are provided between the plurality of movable fingers 152a to 152d and the drive unit 202, it becomes possible to make the device smaller in size and to reduce manufacturing costs by eliminating the need for a swinging member, in comparison with a conventional variable pitch device provided with two levers that swing with respect to a base plate.

Further, by arranging the drive unit 202, which is made up from an electric actuator, along the longitudinal direction (the direction of arrows A1 and A2) of the body 204, the drive unit 202 does not protrude in the height direction (the direction of arrows C1 and C2) from the body 204. Thus, it becomes possible to reduce the height of the variable pitch device 200. Therefore, the variable pitch device 200 is suitable for a case in which there is a restriction in the height direction, for example, when the variable pitch device 200 is attached to a non-illustrated transport device.

Next, a variable pitch device 250 according to a fourth embodiment is shown in FIGS. 32 to 41. The same reference numerals are used to indicate the same constituent elements as those of the above-described variable pitch device 200 according to the third embodiment, and detailed description of such features is omitted.

The variable pitch device 250 according to the fourth embodiment differs from the variable pitch device 200 according to the third embodiment, in that a fluid pressure cylinder is used as a drive unit 254 instead of an electric actuator.

As shown in FIGS. 32 to 41, in the variable pitch device 250, the drive unit 254 is mounted on the rear surface of the cover member 22 that constitutes a body 252, along the longitudinal direction (the direction of arrows A1 and A2) of the body 252, and the drive unit 254 is made up, for example, from a fluid pressure cylinder in which a piston 256 and a piston rod (output shaft) 258 move forward and rearward in the axial direction under a fluid supplying action.

Figure 36:
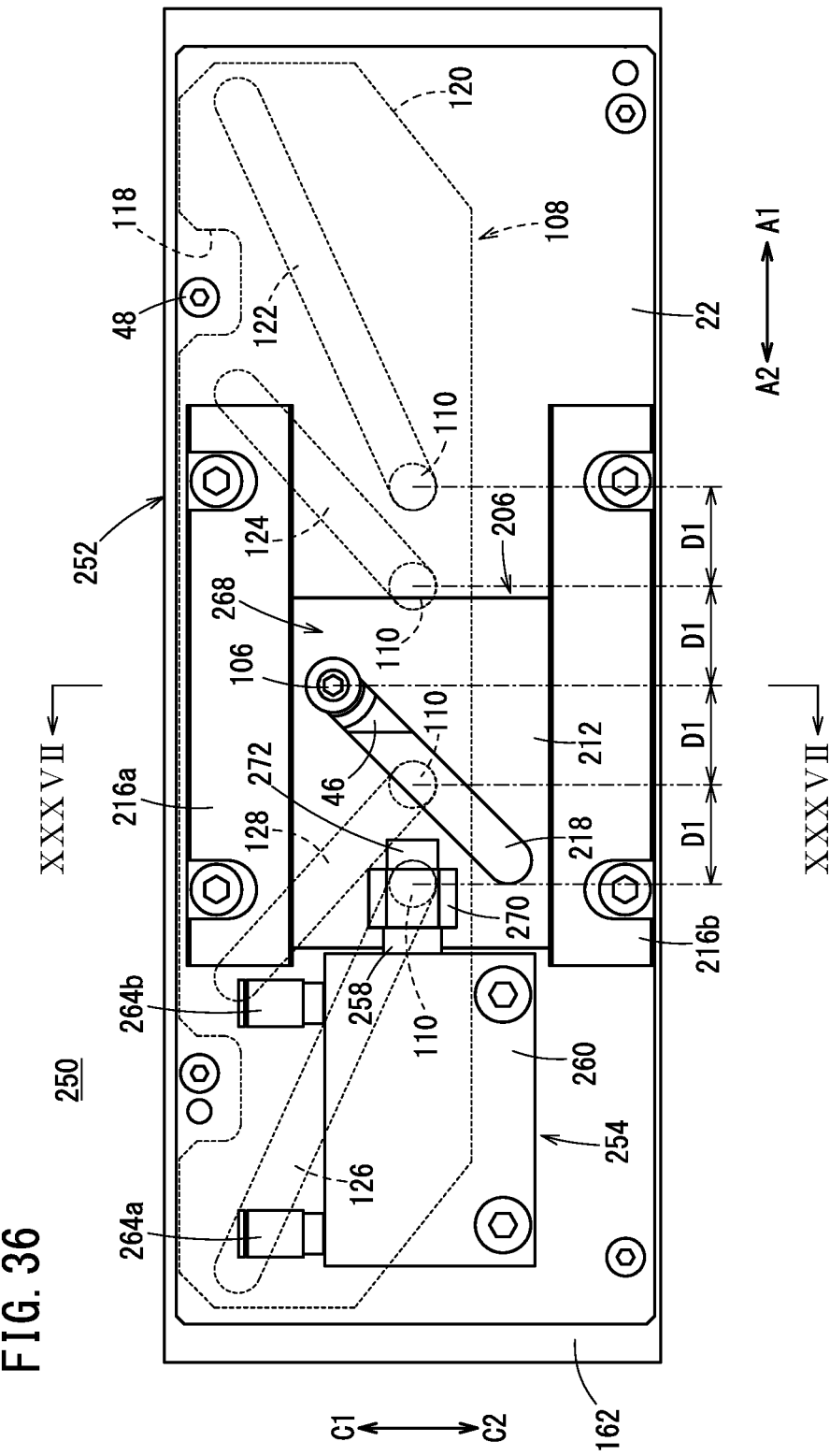
FIG. 36 is an overall rear surface view of the variable pitch device shown in FIG. 32.
Figure 37:
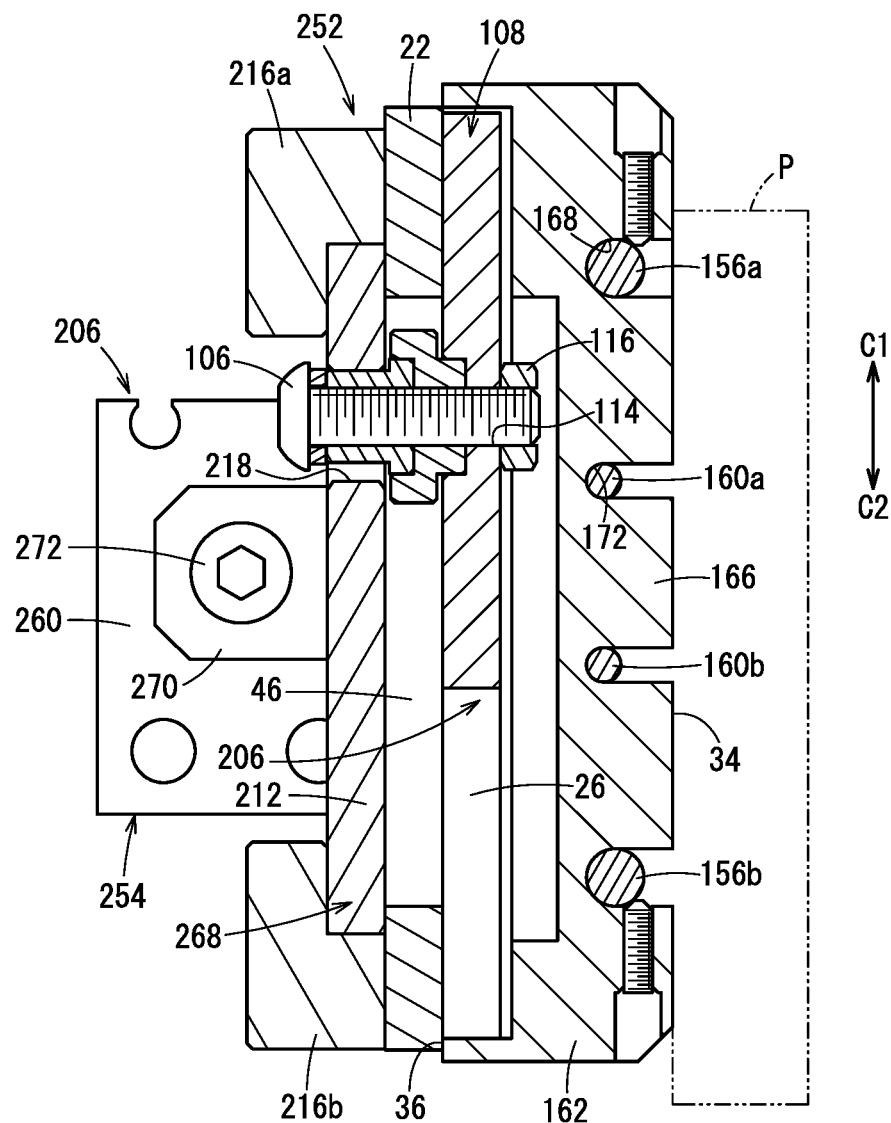
FIG. 37 is a cross-sectional view taken along line XXXVII-XXXVII of FIG. 36.
Figure 38:
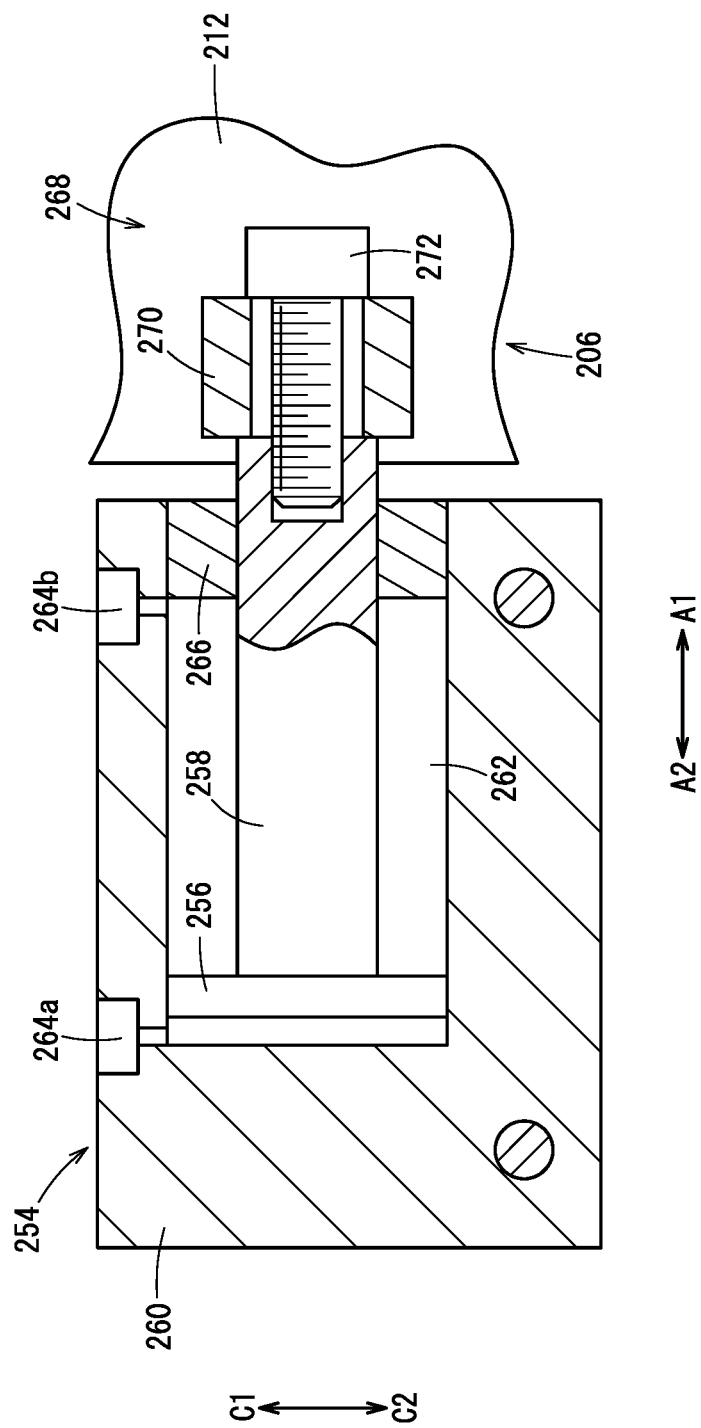
FIG. 38 is an overall cross-sectional view showing a drive unit that constitutes the variable pitch device shown in FIG. 33.

As shown in FIGS. 36 and 38, the drive unit 254 comprises a cylindrical cylinder tube 260 fixed to the cover member 22, the piston 256 displaceably provided along a cylinder chamber 262 of the cylinder tube 260, and a piston rod 258 extending in the axial direction (the direction of arrows A1 and A2) from the center of one end of the piston 256, and a pair of ports 264a and 264b formed in the cylinder tube 260 communicate with the cylinder chamber 262 which is divided by the piston 256. In addition, the drive unit 254 is fixed in a manner so that the axial direction of the piston 256 and the piston rod 258 lie along the longitudinal direction (the direction of arrows A1 and A2) of the body 252.

Further, a rod cover 266 is attached to an open end of the cylinder tube 260 and closes the cylinder tube 260, and a distal end of the piston rod 258 which is inserted through the center of the rod cover 266 is exposed to the exterior, and connected to a connecting piece 270 of a sub-cam plate (conversion member) 268 via a bolt 272. The connecting piece 270 is disposed in the vicinity of an end portion of the sub-cam plate 268 on the side of the drive unit 254 (in the direction of the arrow A2) (see FIG. 36).

In addition, by the fluid being supplied to the cylinder chamber 262 of the cylinder tube 260 through either one of the ports 264a and 264b, the piston 256 and the piston rod 258 move in the axial direction (the direction of arrows A1 and A2), and the sub-cam plate 268 moves integrally along the longitudinal direction of the body 252.

The variable pitch device 250 according to the fourth embodiment of the present invention is constructed basically as described above. Next, operations and advantages thereof will be described.

First, in the closed state shown in FIGS. 32 and 35 to 37, in the drive unit 254, the piston rod 258 is drawn into the interior of the cylinder tube 260, and along therewith, the sub-cam plate 268 is moved to the other side in the longitudinal direction (in the direction of the arrow A2), and the connecting bolt 106 is positioned at the upper end in the sub-cam groove 218 (see FIG. 36).

Figure 35:
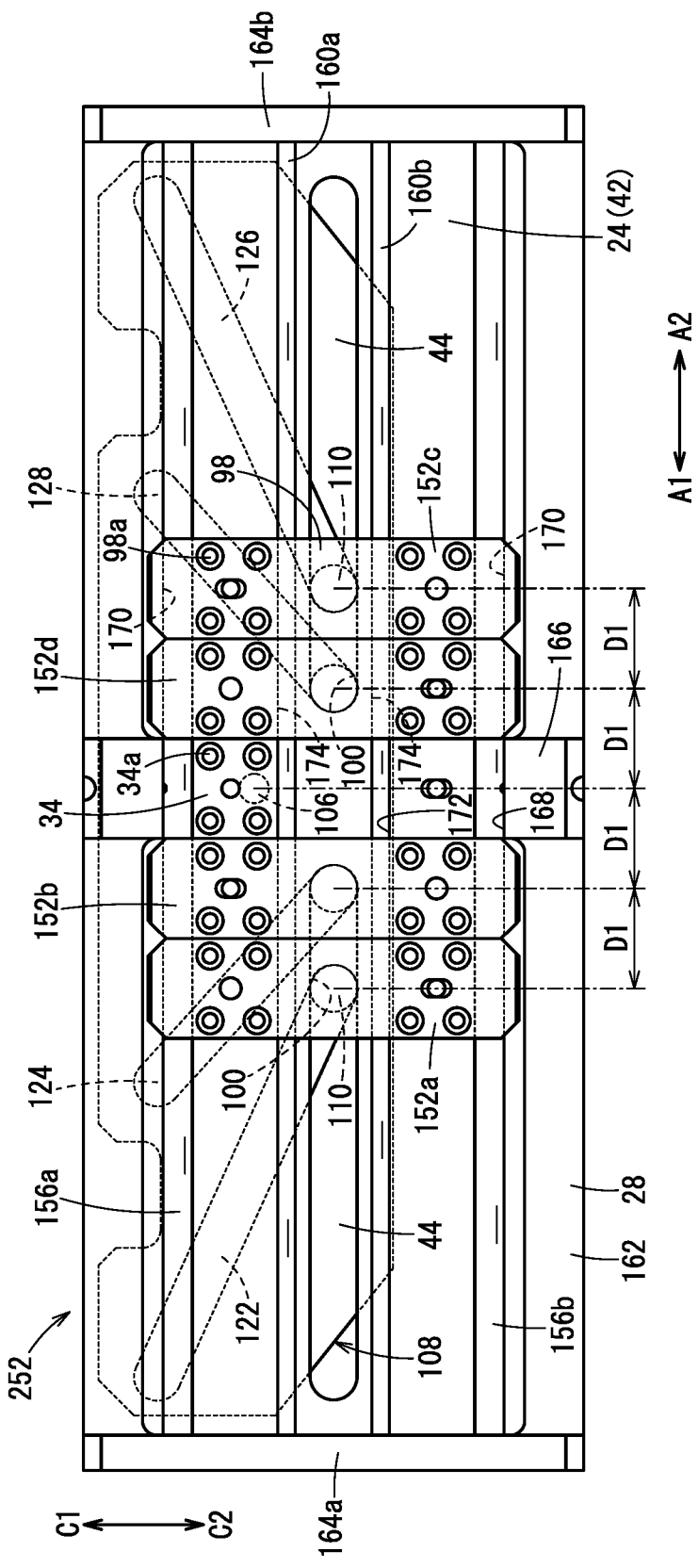
FIG. 35 is an overall front surface view of the variable pitch device shown in FIG. 32.

Therefore, the cam plate 108 connected to the connecting bolt 106 is positioned upwardly (in the direction of the arrow C1) inside the body 252, and as shown in FIG. 35, against the elastic force of the springs 158, the four movable fingers 152a to 152d are in a state of being moved and placed in close proximity to the side of the fixed finger 166, which is located in the center in the longitudinal direction of the body 252.

In the above-described initial state, by supplying a fluid from the non-illustrated fluid source to the cylinder chamber 262 through the port 264a, the piston 256 is biased toward the side of the rod cover 266 (to one side in the longitudinal direction), and by the piston rod 258 moving integrally therewith, the sub-cam plate 268 moves to the one side in the longitudinal direction (the direction of the arrow A1) of the body 252 under a guiding action of the guide pieces 216a and 216b.

By movement of the sub-cam plate 268, the connecting bolt 106, which is inserted through the sub-cam groove 218, is lowered along the hole 46, and the cam plate 108 connected thereto is lowered inside the accommodation chamber 26. In addition, accompanying lowering of the cam plate 108, the respective finger pins 110 which are inserted into the guide holes 44 move respectively toward both end sides in the longitudinal direction (the direction of arrows A1 and A2), and separate away from each other in the longitudinal direction by way of the first to fourth cam grooves 122, 124, 126, and 128, respectively.

Figure 39:
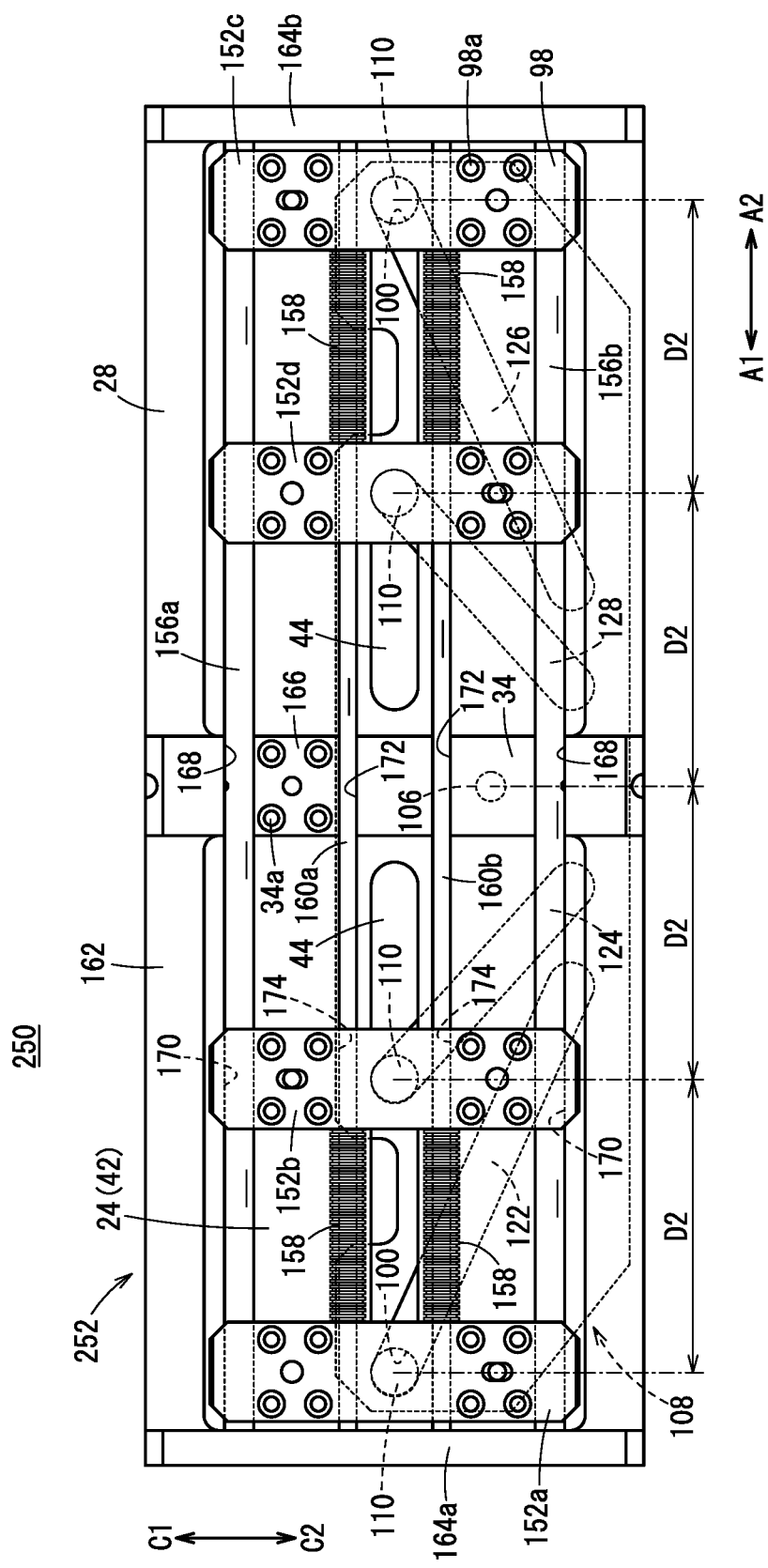
FIG. 39 is an overall front surface view showing an open state in which movable fingers are opened in the variable pitch device shown in FIG. 35.
Figure 40:
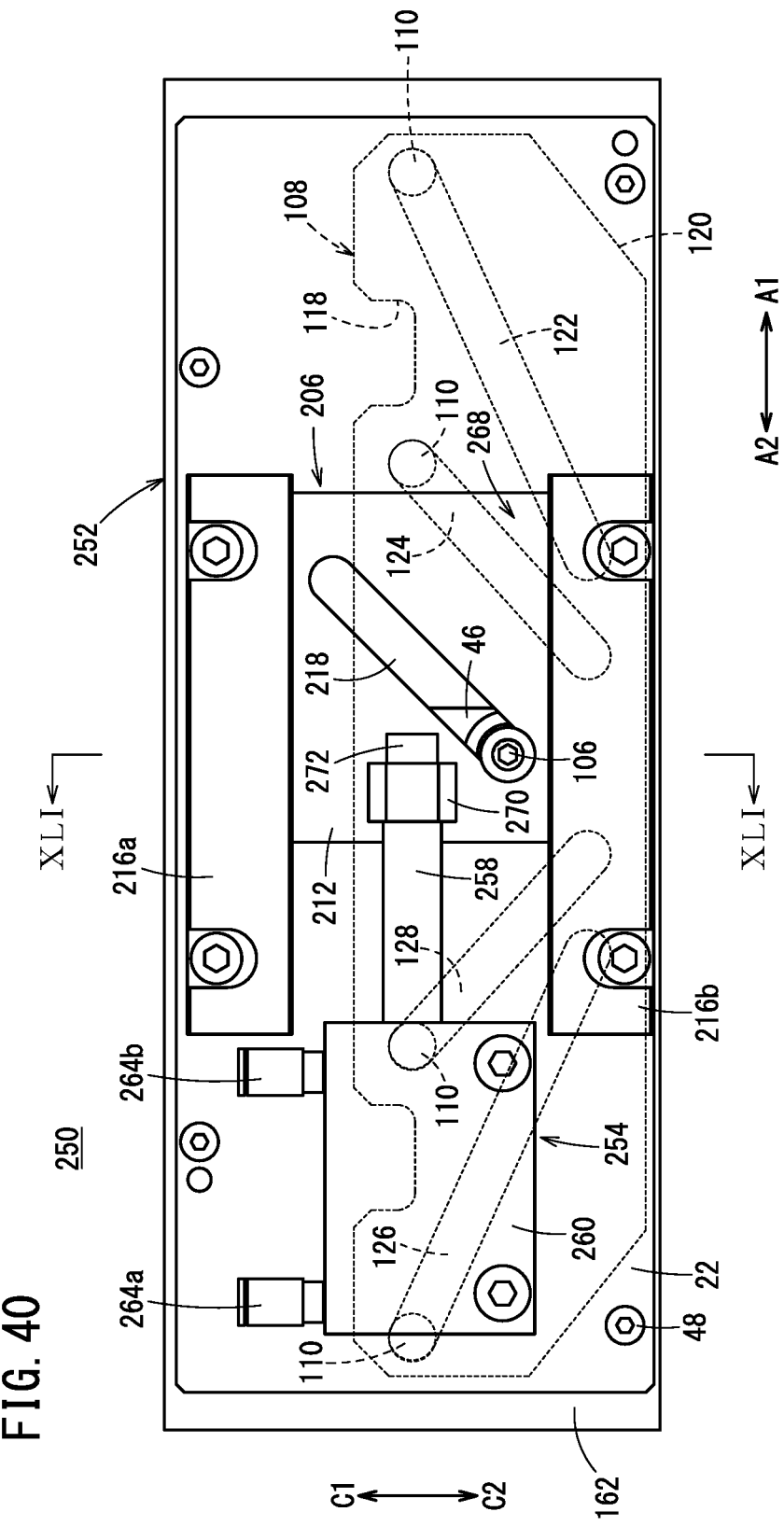
FIG. 40 is an overall rear surface view of the variable pitch device shown in FIG. 39.

In addition, accompanying movement of the finger pins 110, in a similar manner, the movable fingers 152a to 152d connected to the finger pins 110 move toward both end sides in the longitudinal direction (the direction of arrows A1 and A2) so as to separate away from the fixed finger 166 in the finger accommodating section 24 of the body 252, as shown in FIGS. 39 and 40.

Figure 41:
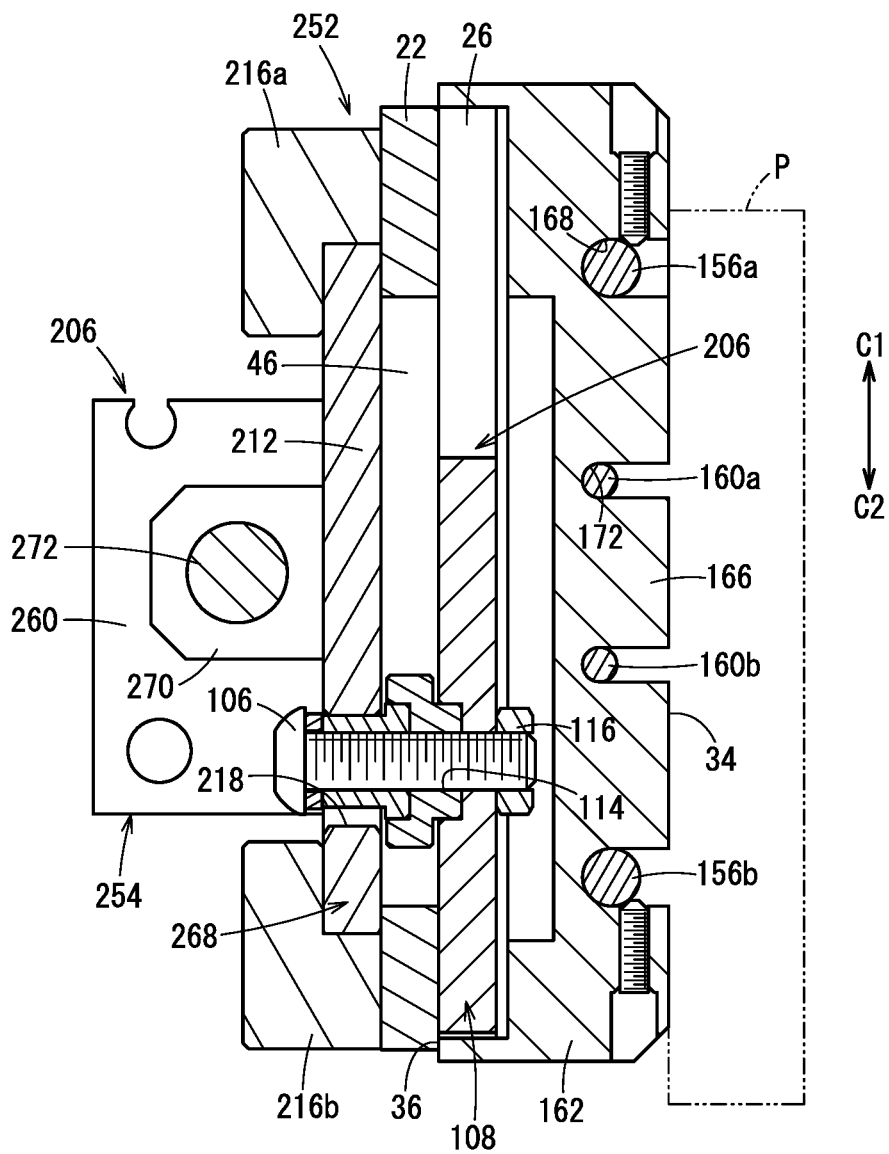
FIG. 41 is a cross-sectional view taken along line XLI-XLI of FIG. 40.

Finally, as shown in FIGS. 39 and 41, the cam plate 108 moves to the lower end inside the accommodation chamber 26 under the driving action of the drive unit 254, whereby in the longitudinal direction of the body 252, the respective movable fingers 152a to 152d and the fixed finger 166 are arranged at an equal interval separation D2 (see FIG. 29) in the open state.

On the other hand, in the case that the movable fingers 152a to 152d are restored from the aforementioned open state to the closed state, the fluid is supplied to the port 264b, which is opposite to the port 264a, with respect to the drive unit 254. Consequently, the piston 256 and the piston rod 258 move toward the other side in the longitudinal direction (in the direction of the arrow A2) of the body 252, and are drawn into the interior of the cylinder tube 260, and along therewith, the sub-cam plate 268 is moved to the other side in the longitudinal direction (in the direction of the arrow A2) along the body 252. Along therewith, the connecting bolt 106 that is inserted through the sub-cam groove 218 rises, and the cam plate 108 moves upward (in the direction of the arrow C1) inside the accommodation chamber 26.

In addition, accompanying rising of the cam plate 108, the respective finger pins 110 inserted into the guide holes 44 move respectively toward the side of the fixed finger 166 by way of the first to fourth cam grooves 122, 124, 126, and 128, respectively, and as shown in FIG. 35, they approach one another and are placed in the closed state with the interval separation D1 therebetween. More specifically, the above-described variable pitch device 250 is configured in a manner so that the direction of movement of the piston rod 258 in the drive unit 254 (the output direction, the direction of arrows A1 and A2) and the direction of movement of the movable fingers 152a to 152d (the direction of arrows A1 and A2) are in parallel with each other.

Moreover, the aforementioned sub-cam plate 268 functions as an output conversion unit for converting the output along the longitudinal direction from the piston rod 258 of the drive unit 254 into the vertical direction (the direction of arrows C1 and C2), and transmitting the converted output to the cam plate 108.

As described above, in the fourth embodiment, the cam plate 108 which is capable of moving in the vertical direction (in the direction of arrows C1 and C2) via the sub-cam plate 268 under the driving action of the drive unit 254 is provided, and the first to fourth cam grooves 122, 124, 126, and 128 that are inclined at predetermined angles with respect to the direction of movement thereof (in the vertical direction) are included in the cam plate 108. Further, the four finger pins 110, which are inserted through the guide holes 44 that extend in the longitudinal direction (the direction of arrows A1 and A2) of the body 252, are inserted respectively through the first to fourth cam grooves 122, 124, 126, and 128. In addition, the finger pins 110 are connected to the four movable fingers 152a to 152d which are disposed so as to be capable of moving in the longitudinal direction along the finger accommodating section 24 of the body 252.

As a result, in the variable pitch device 250, with a simple configuration in which the cam plate 108, the sub-cam plate 268, and the finger pins 110 that transmit the driving force from the drive unit 254 to the movable fingers 152a to 152d are provided between the plurality of movable fingers 152a to 152d and the drive unit 254, it becomes possible to make the device smaller in size and to reduce manufacturing costs by eliminating the need for a swinging member, in comparison with a conventional variable pitch device provided with two levers that swing with respect to a base plate.

Further, by arranging the drive unit 254, which is made up from a fluid pressure cylinder, along the longitudinal direction (the direction of arrows A1 and A2) of the body 252, since the drive unit 254 does not protrude in the height direction (the direction of arrows C1 and C2) from the body 252. Thus, it becomes possible to reduce the height of the variable pitch device 250. Therefore, the variable pitch device 250 is suitable for a case in which there is a restriction in the height direction, for example, when the variable pitch device 250 is attached to a non-illustrated transport device.

Furthermore, by using the fluid pressure cylinder as the drive unit 254, in comparison with the variable pitch device 200 according to the third embodiment in which an electric actuator is used as the drive unit 202, it is possible to make the size of the device smaller in the thickness direction (the direction of arrows B1 and B2).

Next, a description will be given concerning variable pitch devices 280, 300, and 310 equipped with stopper mechanisms which are capable of adjusting the interval separation between the plurality of movable fingers 152a to 152d in the open state. The same reference numerals are used to indicate the same constituent elements as those of the above-described variable pitch device 250 according to the fourth embodiment, and detailed description of such features is omitted.

Figure 42:
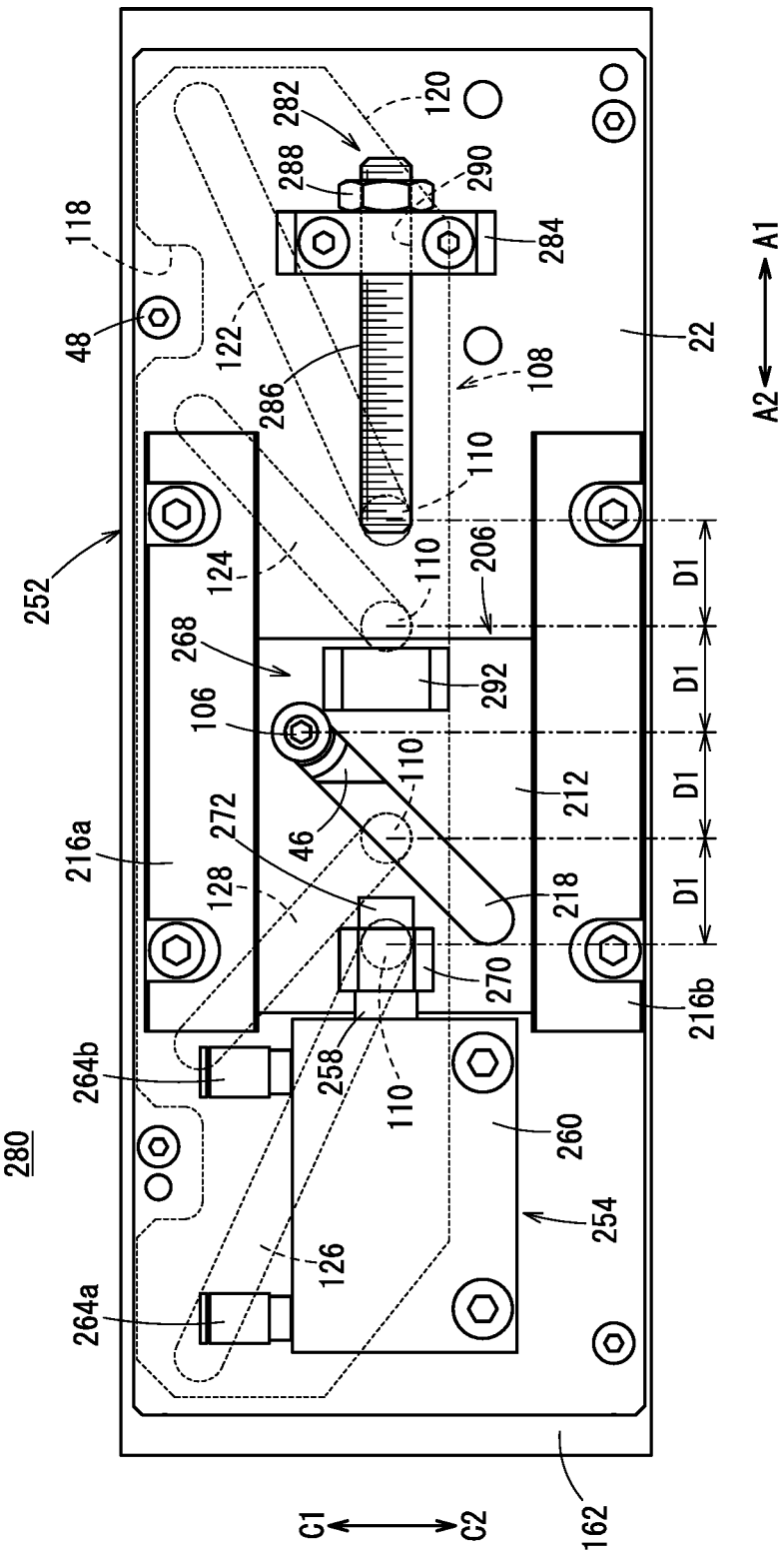
FIG. 42 is an overall rear surface view of a variable pitch device according to a first modification in which a first stopper mechanism is provided in the variable pitch device shown in FIG. 33.
Figure 43:
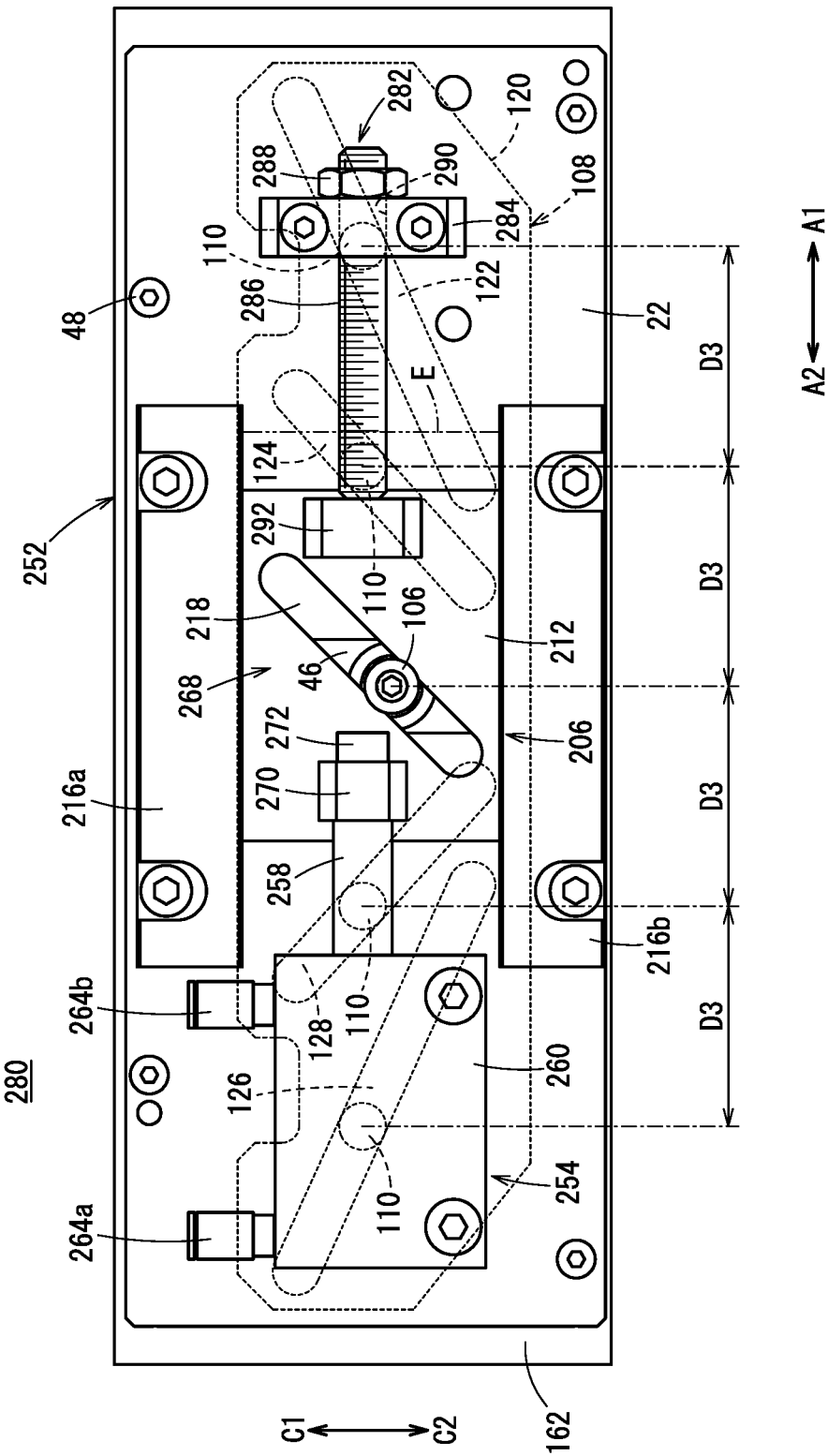
FIG. 43 is an overall rear surface view showing a state in which a sub-cam plate in the variable pitch device of FIG. 42 has been moved and placed in engagement with the first stopper mechanism.

First, as shown in FIGS. 42 and 43, the variable pitch device 280 according to a first modification includes a first stopper mechanism 282 that faces toward the direction of movement (the direction of arrows A1 and A2) of the sub-cam plate 268 on the rear surface of the cover member 22. The first stopper mechanism 282 is provided, for example, on one side in the longitudinal direction (the direction of the arrow A1) of the body 252, and includes a holder 284 fixed to the rear surface of the cover member 22, a stopper pin (stopper member) 286 screw-engaged with the holder 284, and a lock nut 288 that regulates forward and rearward movement of the stopper pin 286.

The holder 284 is disposed substantially at a right angle with respect to the rear surface of the cover member 22, and additionally, is disposed at a position on the axis of the piston rod 258 in the drive unit 254. In addition, a screw hole 290, which penetrates along the longitudinal direction (the direction of arrows A1 and A2) of the body 252, is formed at the center of the holder 284, and the stopper pin 286 is screw-engaged therein.

The stopper pin 286 is made up from a shaft body having a screw thread formed on the outer circumferential surface thereof, is screw-engaged into the screw hole 290 of the holder 284, is provided so as to be movable forward and rearward in the axial direction (the direction of arrows A1 and A2) by being screw-rotated with respect to the holder 284, and is formed coaxially with the piston rod 258 that constitutes the drive unit 254. Stated otherwise, the stopper pin 286 is provided so as to be capable of approaching toward and separating away from the sub-cam plate 268.

The lock nut 288 is screw-engaged with the stopper pin 286, and is provided so as to be on one side in the longitudinal direction (in the direction of the arrow A1) of the body 252 with respect to the holder 284. Further, when the lock nut 288 comes into contact with the side surface of the holder 284, screw-rotation of the stopper pin 286 with respect to the holder 284 is restricted.

On the other hand, a stopper block 292 substantially in parallel with the connecting piece 270 is formed on the sub-cam plate 268. The stopper block 292 is substantially perpendicular to the base portion 212, protrudes in the same direction as the connecting piece 270, and is disposed on one side in the longitudinal direction (in the direction of the arrow A1) of the base portion 212. Further, the stopper block 292 is formed at a position forming a straight line with the connecting piece 270 in the direction of movement of the sub-cam plate 268, and is arranged so as to face toward the distal end of the stopper pin 286 of the first stopper mechanism 282.

Next, a description will be given concerning a case in which the interval separation between the plurality of movable fingers 152a to 152d in the open state is adjusted. First, in the closed state (the initial state) shown in FIG. 42, the stopper pin 286 of the first stopper mechanism 282 is screw-rotated, and the distal end of the stopper pin 286 is moved so as to be placed on the side of the drive unit 254 (in the direction of the arrow A2) beyond the position of the sub-cam plate 268 in the open state of the movable fingers 152a to 152d. In addition, in order to prevent further rotation of the stopper pin 286, the lock nut 288 is screw-rotated and placed in contact with the holder 284.

In a state in which the stopper pin 286 is positioned and fixed in the axial direction as described above, the sub-cam plate 268 moves toward the side of the first stopper mechanism 282 (in the direction of the arrow A1) under the driving action of the drive unit 254, whereby further movement thereof is restricted by the stopper block 292 coming into contact with the distal end of the stopper pin 286. More specifically, the sub-cam plate 268 is stopped at a position that is nearer to the front side (in the direction of the arrow A2) by a predetermined distance than the movement position E (see FIG. 43) at the maximum interval separation in which the movable fingers 152a to 152d are fully opened.

Therefore, as shown in FIG. 43, movement of the sub-cam plate 268 to one side in the longitudinal direction (in the direction of the arrow A1) is restricted, whereby the lowering operation of the cam plate 108 is stopped midway during movement thereof, and the finger pins 110 are also placed in a state of being stopped between the upper end and the lower end of the first to fourth cam grooves 122, 124, 126, and 128 in the cam plate 108.

As a result, the plurality of movable fingers 152a to 152d do not open from the closed state to the fully open state at the maximum interval separation D2, but are placed in the open state at an equal interval separation D3 which is smaller than the interval separation D2 (D3<D2).

In the foregoing manner, the stopper pin 286 of the first stopper mechanism 282 is moved forward and rearward in the axial direction, and the movement distance (movement position) when the sub-cam plate 268 is moved is capable of being adjusted, whereby it is possible to freely adjust the interval separation between the movable fingers 152a to 152d in the open state.

Further, the present invention is not limited to a case, as in the above-described first stopper mechanism 282, in which the stopper mechanism is provided on the rear side of the body 252 and regulates the amount of movement of the sub-cam plate 268. For example, as in the variable pitch device 300 according to a second modification shown in FIGS. 44 and 45, a second stopper mechanism 302 may be provided which is capable of directly regulating the movement of the movable fingers 152a to 152d along the longitudinal direction.

In this variable pitch device 300, for example, a screw hole 304 that penetrates in the longitudinal direction is formed in the end wall 164b on the other side in the longitudinal direction of the main body portion 162 that constitutes the body 252, a stopper pin (stopper member) 306 is screw-engaged in the screw hole 304 while being capable of moving forward and rearward, and a lock nut 308, which is screw-engaged with the stopper pin 306, is disposed so as to be on the outer side (in the direction of the arrow A2) of the end wall 164b.

The stopper pin 306 is disposed in a manner so as to protrude from the end wall 164b toward the side of the finger accommodating section 24 (in the direction of the arrow A1) in which the movable fingers 152a to 152d are accommodated, and is provided movably along the longitudinal direction of the body 252 under a screw-rotating action thereof.

Figure 44:
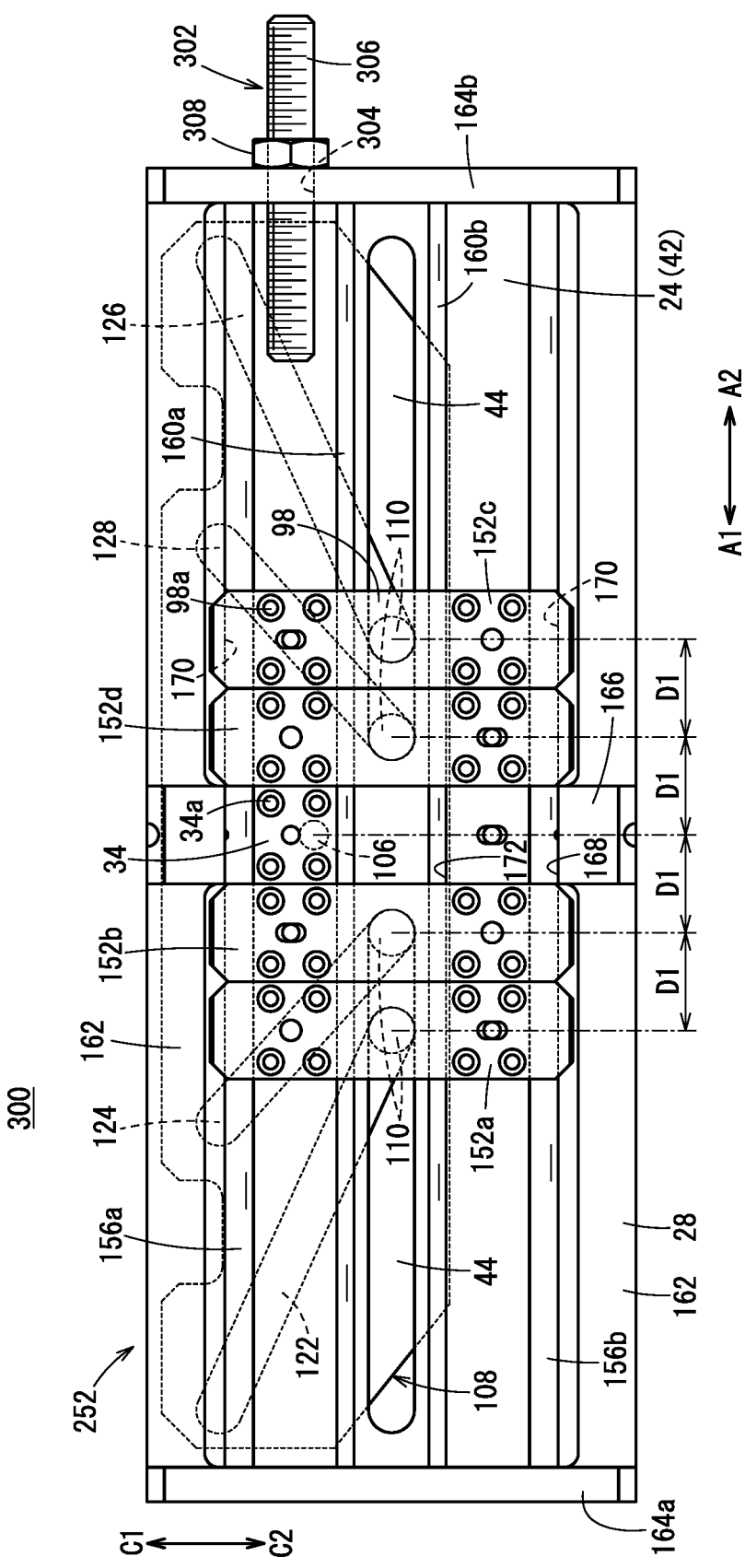
FIG. 44 is an overall rear surface view of a variable pitch device according to a second modification in which a second stopper mechanism is provided in the variable pitch device shown in FIG. 33.
Figure 45:
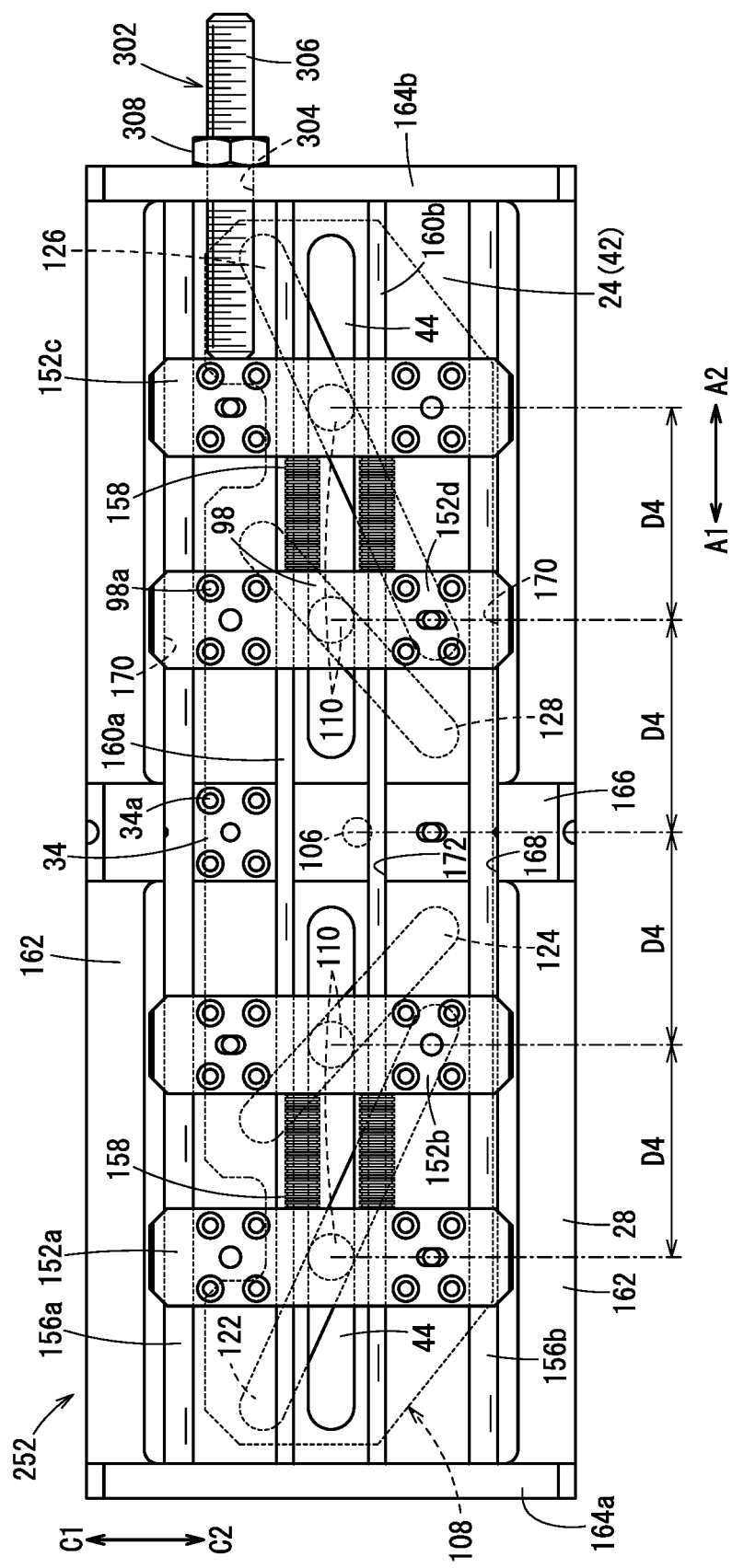
FIG. 45 is an overall rear surface view showing a state in which movable fingers in the variable pitch device of FIG. 44 are engaged by the second stopper mechanism.

In accordance with such a configuration, when the plurality of movable fingers 152a to 152d, which are in the closed state shown in FIG. 44, move toward both end sides in the longitudinal direction under the driving action of the drive unit 254, then as shown in FIG. 45, further movement thereof is restricted due to the movable finger 152c, which faces toward the stopper pin 306 of the second stopper mechanism 302, coming into contact with the distal end of the stopper pin 306. In addition, by the movable finger 152c coming into contact with the stopper pin 306, downward movement of the cam plate 108 through which the movable finger 152c is inserted is also restricted, whereby movement of the three movable fingers 152a, 152b, and 152d other than the movable finger 152c is also regulated and stopped at the same time.

As a result, the plurality of movable fingers 152a to 152d do not open from the closed state to the fully open state at the maximum interval separation D2, but are placed in the open state while being separated from each other by an interval separation D4 which is smaller than the interval separation D2 (D4<D2).

In the foregoing manner, by moving the stopper pin 306 of the second stopper mechanism 302 forward and rearward in the axial direction, and bringing the movable finger 152c into contact with the stopper pin 306, the movement distance (movement position) when the movable fingers 152a to 152d are moved is capable of being adjusted, whereby it is possible to freely adjust the interval separation between the movable fingers 152a to 152d in the open state.

Figure 46:
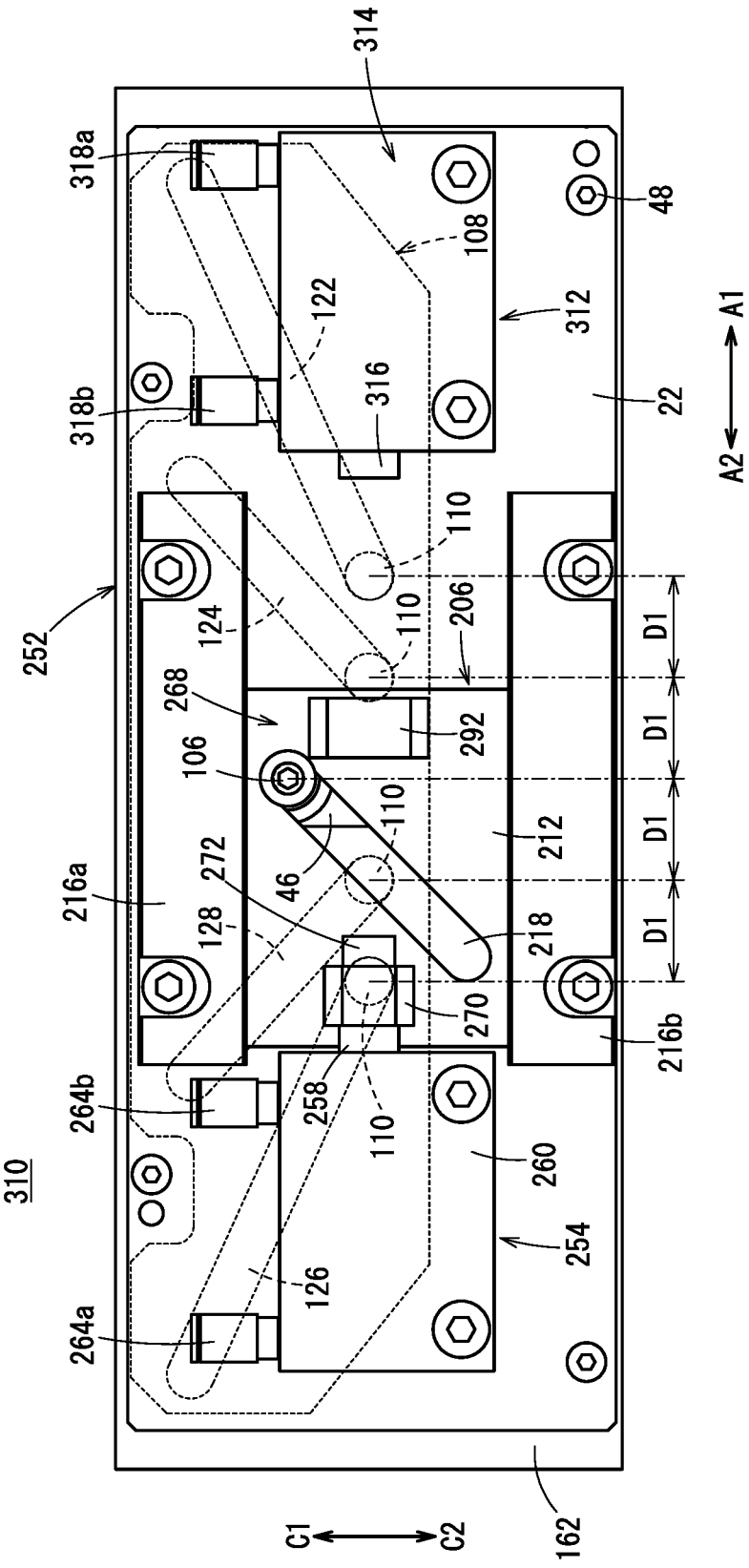
FIG. 46 is an overall rear surface view of a variable pitch device according to a third modification in which a third stopper mechanism is provided in the variable pitch device shown in FIG. 33.
Figure 47:
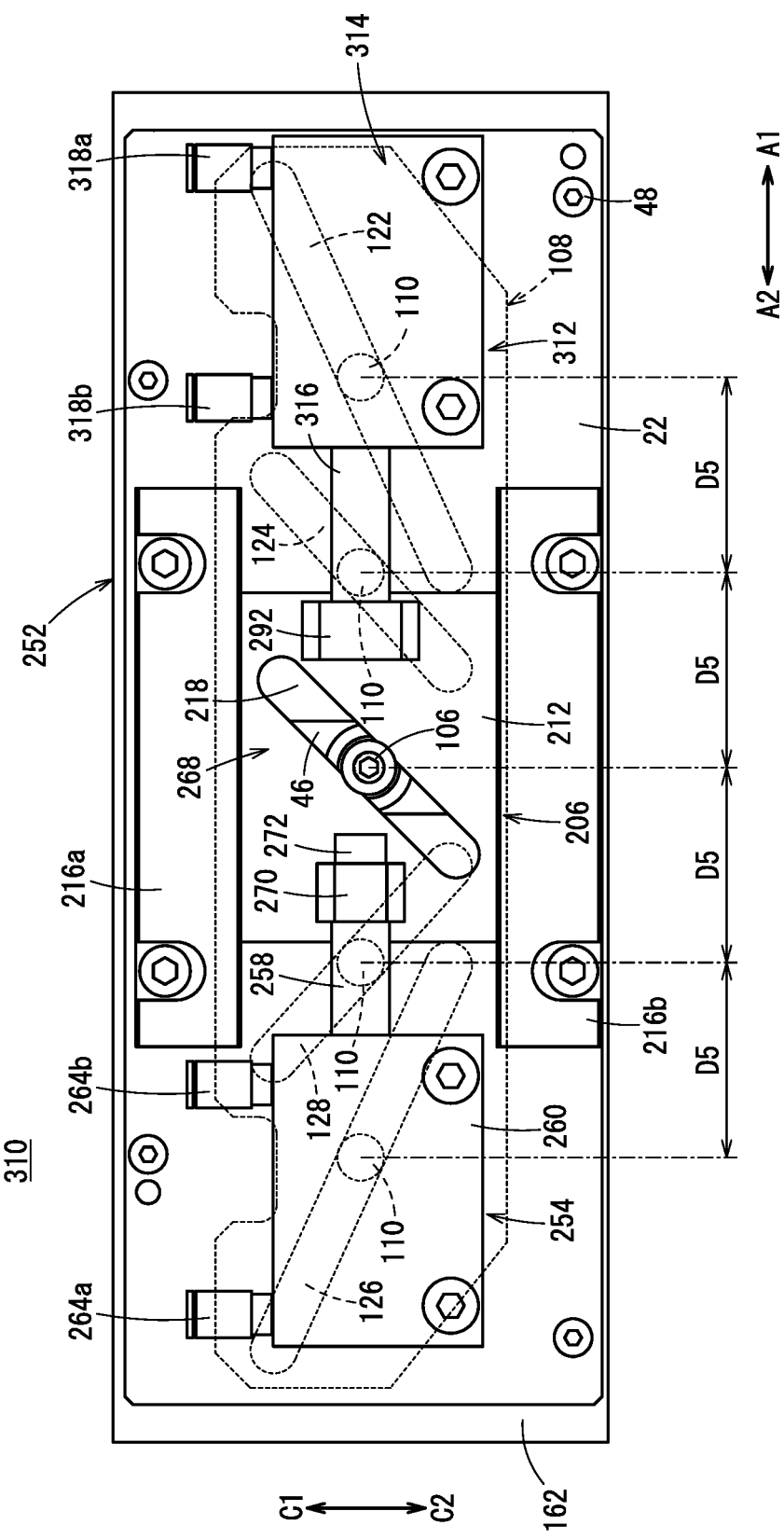
FIG. 47 is an overall rear surface view showing a state in which a sub-cam plate in the variable pitch device of FIG. 46 has been moved and placed in engagement with the third stopper mechanism.
Figure 48:
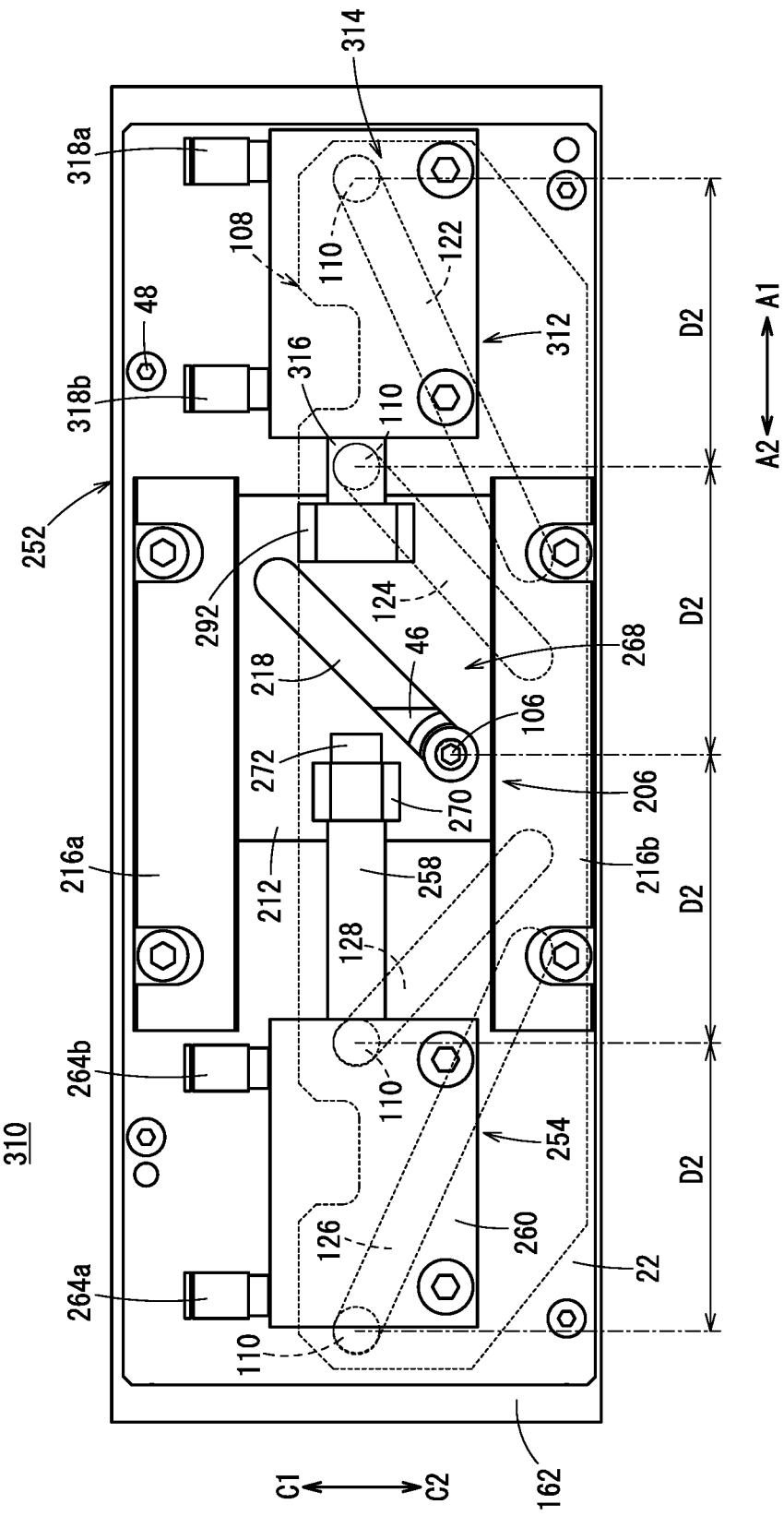
FIG. 48 is an overall rear surface view showing an open state in which movable fingers are opened in the variable pitch device shown in FIG. 46.

Further, a variable pitch device 310 according to a third modification shown in FIGS. 46 to 48 includes a third stopper mechanism 312 that faces toward the direction of movement (the direction of the arrow A1) of the sub-cam plate 268 on the rear surface of the cover member 22, and the third stopper mechanism 312 is constituted from a cylinder device 314 that is driven under a fluid supplying action. Moreover, since the cylinder device 314 that constitutes the third stopper mechanism 312 has the same configuration as that of the drive unit 254 according to the fourth embodiment, detailed description of this feature will be omitted.

The cylinder device 314 constituting the third stopper mechanism 312 faces toward the stopper block 292 of the sub-cam plate 268, and a piston rod (stopper member) 316 thereof is disposed coaxially with the piston rod 258 that constitutes the drive unit 254.

Further, in the drawn-in position in which the piston rod 316 shown in FIG. 46 has been moved to the one side in the longitudinal direction (in the direction of the arrow A1) of the body 252, the cylinder device 314 is arranged so that the distal end of the piston rod 316 does not come into contact with the sub-cam plate 268, whereas in the pushed-out position in which the piston rod 316 shown in FIG. 48 has been moved to the other side in the longitudinal direction (in the direction of the arrow A2), the cylinder device 314 is arranged so that the distal end of the piston rod 316 is capable of contacting the sub-cam plate 268.

In addition, in the case that the distance between the plurality of movable fingers 152a to 152d in the open state is to be adjusted, the fluid is supplied to a port 318a in the cylinder device 314 in the closed state (initial state) shown in FIG. 46, whereby the piston rod 316 is moved to the pushed-out position of being pushed out toward the side of the sub-cam plate 268 (in the direction of the arrow A2) (see FIG. 48).

Consequently, as shown in FIG. 47, when the sub-cam plate 268 is moved to the side of the cylinder device 314 (in the direction of the arrow A1) under the driving action of the drive unit 254, further movement of the sub-cam plate 268 is restricted by the distal end of the piston rod 316 coming into contact therewith. As a result, lowering of the cam plate 108 is stopped midway during movement thereof, and the finger pins 110 are also placed in a state of being stopped between the upper end and the lower end of the first to fourth cam grooves 122, 124, 126, and 128 in the cam plate 108. As a result, the plurality of movable fingers 152a to 152d do not open from the closed state to the fully open state at the maximum interval separation D2, but are placed in the open state while being separated from each other by an interval separation D5 which is smaller than the interval separation D2 (D5<D2).

Further, as shown in FIG. 48, by placing the cylinder device 314 in the drawn-in position under the action of supplying the fluid to a port 318b, the sub-cam plate 268 does not contact with the distal end of the piston rod 316 when moving to the side of the cylinder device 314. Therefore, the sub-cam plate 268 moves to a desired position along the body 252, and along therewith, the cam plate 108 is moved to the lower end of the accommodation chamber 26, whereby the plurality of movable fingers 152a to 152d can be placed in the fully open state of being opened at the maximum interval separation D2.

In the foregoing manner, in the variable pitch device 310 equipped with the third stopper mechanism 312, it is possible to displace the piston rod 316 under the action of supplying the fluid to the cylinder device 314, and to freely switch between the pushed-out position (regulated state) in which movement of the sub-cam plate 268 in the longitudinal direction can be regulated, and the drawn-in position (unregulated state) in which movement of the sub-cam plate 268 is not hindered.

As a result, by the supply of the fluid, the movable fingers 152a to 152d can be switched by the third stopper mechanism 312 between an open state in which the cam plate 108 is moved to the lower end and the movable fingers 152a to 152d are fully opened, and an intermediate open state between the closed state and the open state in which the cam plate 108 is stopped at an intermediate location. Consequently, when a plurality of workpieces are transported using the variable pitch device 310, the workpieces can be supplied to a supply destination at two different intervals D2 and D5.

The variable pitch device according to the present invention is not limited to the embodiments described above, and it goes without saying that various configurations could be adopted therein without deviating from the essence and gist of the present invention.

What is claimed is:

1. A variable pitch device comprising:
   a body;
   a drive unit connected to the body;
   a plurality of movable fingers disposed movably along a longitudinal direction of the body; and
   a driving force transmission mechanism configured to transmit a driving force of the drive unit to the movable fingers,
   the variable pitch device moving the plurality of movable fingers along the longitudinal direction under a driving action of the drive unit, wherein:
   the driving force transmission mechanism includes a cam plate provided on the body, and configured to be movable in a direction perpendicular to a direction of movement of the movable fingers;
   a plurality of cam grooves, which are inclined with respect to the direction of movement, are formed in the cam plate, and finger pins as portions of the movable fingers are inserted through the cam grooves; and
   a fixed finger disposed at a center in the longitudinal direction of the body,
   wherein the driving force transmission mechanism is configured to move the plurality of movable fingers in a manner so that the plurality of movable fingers and the fixed finger are arranged at an equal interval separation in the direction of movement of the plurality of movable fingers,
   the body includes a main body portion formed along the longitudinal direction of the body,
   the main body portion includes: a finger accommodating section formed on a front side perpendicular to the longitudinal direction of the body, and configured to accommodate the plurality of movable fingers; and an accommodation chamber formed on a rear side opposite to the front side, and recessed from the rear side toward the front side,
   the cam plate is accommodated in the accommodation chamber so as to be movable in the direction perpendicular to the direction of movement of the movable fingers,
   the body includes a cover member fixed to the main body portion so as to cover the accommodation chamber,
   the main body portion includes a separating wall that separates the finger accommodating section and the accommodation chamber,
   the separating wall includes a guide hole extending along the longitudinal direction of the body, and
   the finger pins pass through the separating wall and are inserted into the cam grooves.

2. The variable pitch device according to claim 1, wherein the body is equipped with a guide member extending along the longitudinal direction and configured to guide the movable fingers along the direction of movement.

3. The variable pitch device according to claim 1, wherein the drive unit comprises a cylinder device and is configured in a manner that an output shaft of the drive unit moves forward and rearward along an axial direction under a fluid supplying action.

4. The variable pitch device according to claim 1, wherein the body is equipped with a stopper mechanism configured to regulate an amount of movement of the movable fingers in an opening direction in which the movable fingers are separated from each other in the direction of movement.

5. The variable pitch device according to claim 4, wherein the stopper mechanism includes a stopper member disposed so as to be movable forward and rearward along the longitudinal direction of the body, and configured to contact an end portion in the direction of movement of the movable fingers.

6. The variable pitch device according to claim 4, wherein the stopper mechanism is made up from a fluid pressure cylinder equipped with a stopper member disposed so as to be movable forward and rearward along the longitudinal direction of the body under a fluid supplying action, the stopper mechanism being configured to, by changing a position of the stopper member along the longitudinal direction, switch between a regulated state in which the amount of movement of the movable fingers in the opening direction is regulated, and an unregulated state in which movement of the movable fingers in the opening direction is not regulated.

7. A variable pitch device comprising:
   a body:
   a drive unit connected to the body;
   a plurality of movable fingers disposed movably along a longitudinal direction of the body; and
   a driving force transmission mechanism configured to transmit a driving force of the drive unit to the movable fingers,
   the variable pitch device moving the plurality of movable fingers in a manner so that an interval separation between the movable fingers becomes even along the longitudinal direction under a driving action of the drive unit, wherein:
   the driving force transmission mechanism includes a cam plate provided on the body, and configured to be movable in a direction perpendicular to a direction of movement of the movable fingers; and
   a plurality of cam grooves, which are inclined with respect to the direction of movement, are formed in the cam plate, and finger pins as portions of the movable fingers are inserted through the cam grooves,
   wherein the drive unit includes an output shaft configured to output the driving force by being displaced along an axial direction, the axial direction of the output shaft is perpendicular to the direction of movement of the movable fingers, and the output shaft and the cam plate are connected by a connecting member,
   the body includes a main body portion formed along the longitudinal direction of the body,
   the main body portion includes: a finger accommodating section formed on a front side perpendicular to the longitudinal direction of the body, and configured to accommodate the plurality of movable fingers; and an accommodation chamber formed on a rear side opposite to the front side, and recessed from the rear side toward the front side, the cam plate is accommodated in the accommodation chamber so as to be movable in the direction perpendicular to the direction of movement of the movable fingers, the body includes a cover member fixed to the main body portion so as to cover the accommodation chamber, the main body portion includes a separating wall that separates the finger accommodating section and the accommodation chamber, the separating wall includes a guide hole extending along the longitudinal direction of the body, and the finger pins pass through the separating wall and are inserted into the cam grooves.

8. A variable pitch device comprising:
a body;
a drive unit connected to the body;
a plurality of movable fingers disposed movably along a longitudinal direction of the body; and
a driving force transmission mechanism configured to transmit a driving force of the drive unit to the movable fingers,
the variable pitch device moving the plurality of movable fingers in a manner so that an interval separation between the movable fingers becomes even along the longitudinal direction under a driving action of the drive unit, wherein:
the driving force transmission mechanism includes a cam plate provided on the body, and configured to be movable in a direction perpendicular to a direction of movement of the movable fingers; and
a plurality of cam grooves, which are inclined with respect to the direction of movement, are formed in the cam plate, and portions of the movable fingers are inserted through the cam grooves,
wherein the drive unit includes an output shaft configured to output the driving force by being displaced along an axial direction, and the axial direction of the output shaft is parallel to the direction of movement of the movable fingers.

9. The variable pitch device according to claim 8, wherein the driving force transmission mechanism includes an output conversion unit configured to convert an output direction of the driving force into the direction perpendicular to the direction of movement of the movable fingers, and to transmit the driving force to the cam plate.

10. The variable pitch device according to claim 9, wherein the output conversion unit is a conversion member that is disposed movably in the longitudinal direction of the body, is connected to the output shaft, and includes a second cam groove through which a connecting member connected to the cam plate is inserted.

11. A variable pitch device comprising:
a body;
a drive unit connected to the body;
a plurality of movable fingers disposed movably along a longitudinal direction of the body; and
a driving force transmission mechanism configured to transmit a driving force of the drive unit to the movable fingers,
the variable pitch device moving the plurality of movable fingers in a manner so that an interval separation between the movable fingers becomes even along the longitudinal direction under a driving action of the drive unit, wherein:
the driving force transmission mechanism includes a cam plate provided on the body, and configured to be movable in a direction perpendicular to a direction of movement of the movable fingers; and
a plurality of cam grooves, which are inclined with respect to the direction of movement, are formed in the cam plate, and finger pins as portions of the movable fingers are inserted through the cam grooves,
wherein the movable fingers are arranged in a quantity that allows the movable fingers to be symmetrical in the longitudinal direction with respect to a fixed finger disposed at a center in the longitudinal direction of the body,
the body includes a main body portion formed along the longitudinal direction of the body,
the main body portion includes: a finger accommodating section formed on a front side perpendicular to the longitudinal direction of the body, and configured to accommodate the plurality of movable fingers; and an accommodation chamber formed on a rear side opposite to the front side, and recessed from the rear side toward the front side,
the cam plate is accommodated in the accommodation chamber so as to be movable in the direction perpendicular to the direction of movement of the movable fingers,
the body includes a cover member fixed to the main body portion so as to cover the accommodation chamber,
the main body portion includes a separating wall that separates the finger accommodating section and the accommodation chamber,
the separating, wall includes a guide hole extending along the longitudinal direction of the body, and
the finger pins pass through the separating wall and are inserted into the cam grooves.

12. A variable pitch device comprising:
a body;
a drive unit connected to the body;
a plurality of movable fingers disposed movably along a longitudinal direction of the body; and
a driving force transmission mechanism configured to transmit a driving force of the drive unit to the movable fingers,
the variable pitch device moving the plurality of movable fingers in a manner so that an interval separation between the movable fingers becomes even along the longitudinal direction under a driving action of the drive unit, wherein:
the driving force transmission mechanism includes a cam plate provided on the body, and configured to be movable in a direction perpendicular to a direction of movement of the movable fingers; and
a plurality of cam grooves, which are inclined with respect to the direction of movement, are formed in the cam plate, and portions of the movable fingers are inserted through the cam grooves,
wherein, between one of the movable fingers and another of the movable fingers that are adjacent to each other, an elastic member configured to bias the movable fingers in the direction of movement is provided.

13. A variable pitch device comprising:
a body;
a drive unit connected to the body;
a plurality of movable fingers disposed movably along a longitudinal direction of the body; and
a driving force transmission mechanism configured to transmit a driving force of the drive unit to the movable fingers, the variable pitch device moving the plurality of movable fingers in a manner so that an interval separation between the movable fingers becomes even along the longitudinal direction under a driving action of the drive unit, wherein:
the driving force transmission mechanism includes a cam plate provided on the body, and configured to be movable in a direction perpendicular to a direction of movement of the movable fingers; and
a plurality of earn grooves, which are inclined with respect to the direction of movement, are formed in the cam plate, and portions of the movable fingers are inserted through the cam grooves,
wherein the drive unit comprises an electric actuator and is configured in a manner that an output shaft of the drive unit moves forward and rearward along an axial direction under an energizing action.

\* \* \* \* \*